(12) United States Patent
Katsuda et al.

(10) Patent No.: US 7,573,540 B2
(45) Date of Patent: Aug. 11, 2009

(54) LIQUID CRYSTAL DISPLAY WITH REPLACEABLE BACKLIGHT

(75) Inventors: Yasutoshi Katsuda, Nara (JP); Masato Onoue, Nara (JP); Takayuki Iwai, Mie (JP); Tatsuya Kudari, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 413 days.

(21) Appl. No.: 11/030,655

(22) Filed: Jan. 6, 2005

(65) Prior Publication Data

US 2005/0151894 A1 Jul. 14, 2005

(30) Foreign Application Priority Data

Jan. 14, 2004 (JP) ............................. 2004-006797

(51) Int. Cl.
*G02F 1/1333* (2006.01)
(52) U.S. Cl. .......................................... 349/58; 349/61
(58) Field of Classification Search ................... 349/58, 349/61; 362/632–634
See application file for complete search history.

(56) References Cited

U.S. PATENT DOCUMENTS

| | | | | |
|---|---|---|---|---|
| 5,729,310 | A * | 3/1998 | Horiuchi et al. | 349/62 |
| 6,559,908 | B2 | 5/2003 | Hiratsuka et al. | |
| 6,979,114 | B2 * | 12/2005 | Kao | 362/633 |
| 2003/0098840 | A1 | 5/2003 | Nagatani | |
| 2004/0183957 | A1 * | 9/2004 | Han | 349/58 |
| 2004/0227870 | A1 * | 11/2004 | Jang | 349/64 |

FOREIGN PATENT DOCUMENTS

| | | |
|---|---|---|
| CN | 1421731 A | 6/2003 |
| JP | 4-336527 A | 11/1992 |
| JP | 07-056164 | 3/1995 |
| JP | 2001-021869 | 1/2001 |
| JP | 2003-162901 A | 6/2003 |
| JP | 2004-029662 | 1/2004 |
| JP | 2004-029663 | 1/2004 |
| KR | 2003-0043570 A | 6/2003 |

OTHER PUBLICATIONS

Official communication issued in the counterpart Korean Application No. 10-2005-0003080, mailed on Jun. 16, 2006.
Official communication issued in the counterpart Chinese Application No. 2005100021935, mailed on Mar. 30, 2007.

\* cited by examiner

*Primary Examiner*—David Nelms
*Assistant Examiner*—Nathanael R Briggs
(74) *Attorney, Agent, or Firm*—Keating & Bennett, LLP

(57) ABSTRACT

A liquid crystal display comprises a liquid crystal panel (22), a group of optical sheets (32) disposed rearward from the liquid crystal panel (22), a light source (28) disposed rearward from the group of the optical sheets (32), a frame-shaped front frame (21, 23) disposed forward from at least the group of the optical sheets (32), a back chassis (31) disposed rearward from the light source (28) and fixedly connected to the front frame (21, 23) directly or indirectly, and a holding member (27) integrally holding the group of the optical sheets (32) to keep the group of the optical sheets (32) held in position integrally, when the back chassis (31) and the front frame (21, 23) are unfixed from each other.

30 Claims, 33 Drawing Sheets

LIQUID CRYSTAL DISPLAY WITH REPLACEABLE BACKLIGHT

This nonprovisional application claims priority under 35 U.S.C. § 119(a) on Patent Application No(s). 2004-006797 filed in Japan on Jan. 14, 2004, the entire contents of which are hereby incorporated by reference.

BACKGROUND OF THE INVENTION

1. Field of the Invention

The present invention relates to a liquid crystal display in which a light source is disposed at a rear side of a liquid crystal panel.

2. Description of the Related Art

In the liquid crystal display, a back light which is a flat light source is disposed at the rear side of the liquid crystal panel thereof. The "vertical" type and the "edge light" type are known as the type of the back light. In the former type, a plurality of light sources is disposed at the rear side of the liquid crystal panel. In the latter type, a light source is disposed on the side surface of the liquid crystal panel so that a light guide plate emits light flatly. The back light of the vertical type is thick but has a high light utilization efficiency. Thus the back light of the vertical type is used for a monitor, a liquid crystal television, and the like that require brightness.

The life of the liquid crystal display almost depends on the life of the light source of the back light. The liquid crystal display can be used semi-permanently by performing maintenance of replacing the light source when it has failed with a new one.

The following two light source-replacing methods are known. In one method, the liquid crystal display is disassembled. In this method, the liquid crystal panel and the layered optical sheets are removed one by one. Therefore the optical sheets interposed between the liquid crystal panel and the light source are separated from each other. Consequently there is a fear that after the light source-replacing operation finishes, dust enters the gap between the optical sheets and that the liquid crystal display deteriorates in its display quality.

Therefore this method necessitates the light source-replacing operation to be performed in a particular environment such as a clean room, when the liquid crystal display has failed. Thus a service man and a user cannot perform the light source-replacing operation easily.

In the other method, the entire back light unit is replaced. This method has a disadvantage that almost all unfailed component parts are replaced. Thus this method costs high.

When the light source-replacing operation is performed by using the above-described two methods, a secondary damage may occur. More specifically, because the liquid crystal panel is opened in the light source-replacing operation, there easily occurs a defective connection or a disconnection in a driver called a tape-shaped TCP (Tape Carrier Package) which is a member for sending image information to the liquid crystal panel and very weak to an external force applied thereto and a driver called an SOF (System On Film). Consequently the above-described methods cause replacement of even the unfailed liquid crystal panel which is expensive.

As shown in FIG. 32, in the liquid crystal display disclosed in Japanese Patent Application Laid-Open No. 2001-21869, the liquid crystal panel 2, the back light 3, and the circuit substrate 4 layered one upon another are accommodated in the casing 5. The metal frame 1 is placed on the liquid crystal panel 2. The hook 5a of the casing 5 is locked to the locking groove 1a of the metal frame 1 to fix the metal frame 1 to the casing 5. In this construction, the hook 5a is unlocked from the locking groove 1a to replace the back light 3 with a new one when the back light 3 has failed. As a result, all the members are disassembled and dust attaches to the back light 3 and the liquid crystal panel 2.

As shown in FIG. 33, in the liquid crystal display disclosed in Japanese Patent Application Laid-Open No. 7-56164, the liquid crystal panel 8 is interposed between the upper casing 6 and the panel-fixing plate 7. The diffusing plate 9 is disposed under the panel-fixing plate 7. The back light 11 fixed to the supporting member 10 is disposed under the diffusing plate 9. The back light 11 is fixed to the upper casing 6 with the screw 13, and the lower casing 12 is closed. However, neither the method of fixing the back light 11 and the supporting member 10 to each other nor the method of fixing the diffusing plate 9 is disclosed. When the screw 13 is removed in the back light-replacing operation, there is a fear that dust attaches to the diffusing plate 9 and the like.

Patent document 1: Japanese Patent Application Laid-Open No. 2001-21869

Patent document 2: Japanese Patent Application Laid-Open No. 7-56164

SUMMARY OF THE INVENTION

The present invention has been made in view of the above-described problems. Therefore it is an object of the present invention to prevent dust from attaching to a group of optical sheets when an operation of removing a failed light source is performed in maintenance of replacing the failed light source of a back light of a liquid crystal display. It is another object of the present invention to replace the failed light source easily without damaging unfailed members in performing the light source-replacing operation to thereby prevent a secondary damage from occurring.

To solve the above-described problems, the present invention provides a liquid crystal display including a liquid crystal panel, a group of optical sheets disposed rearward from the liquid crystal panel, a light source disposed rearward from the group of optical sheets, a frame-shaped front frame disposed forward from at least the group of optical sheets, a back chassis disposed rearward from light source and fixedly connected to the front frame directly or indirectly, and a holding member integrally holding the group of the optical sheets to keep the group of the optical sheets held in position integrally, when the back chassis and the front frame are unfixed from each other.

In the above-described construction, in maintenance of replacing the failed light source which has been exposed to the outside because the back chassis has been removed, the group of the optical sheets remains held integrally. Therefore in the light source-replacing operation, it is possible to prevent the optical sheets from being separated from each other and hence dust from entering between the optical sheets. Further the construction eliminates the need for performing the light source-replacing operation in a particular environment such as a clean room. Thus the operability in the maintenance can be improved. Since the optical sheets are not separated from each other, it is unnecessary to perform an operation of assembling the optical sheets when the liquid crystal display is assembled from the constituting members. Therefore it is possible to decrease the number of manufacturing processes.

It is preferable that the holding member integrally holding the group of the optical sheets is composed of a sheet-holding chassis having a substantially vertical portion projecting from a peripheral edge of the substantially flat portion on which a peripheral edge of a rear side of the group of the optical sheet is placed, and a fastener fixing the sheet-holding chassis to the front frame, and when the front frame and the back chassis are unfixed from each other, the group of the optical sheets remains fixed to the front frame.

In the above-described construction, it is possible to prevent the group of the optical sheets from being removed toward the removed back chassis by supporting the periphery of the group of the optical sheets by the substantially flat portion of the sheet-holding chassis fixed to the front frame. The substantially vertical portion plays the role of the frame for placing the group of the optical sheets in position and further is capable of playing the role of a spacer for securing a space for vertically disposing the group of the optical sheets. Further the substantially vertical portion is capable of keeping the clearance between the liquid crystal panel and the group of the optical sheets constant. Accordingly the above-described construction allows (prevents nonuniformity) the display quality of the liquid crystal display to be stable. It is preferable to use screws or bolts as the fastener.

It is preferable that a light source-holding member holding the light source in position is equipped and that the light source-holding member is fastened to the front frame and to the back chassis with a fastener. Alternatively, the light source-holding member and the front frame are fastened to each other with a fastener, and the light source-holding member and the back chassis are fastened to each other with another fastener.

In the above-described construction, when the light source-holding member, the front frame, and the back chassis are fixed to each other integrally with the fastener, the fastener is screwed in screw holes in one direction. Thereby it is possible to perform a disassembling operation in the one direction and unnecessary to turn the liquid crystal display upside down in the disassembling operation. Consequently it is possible to reduce a load in the light source-replacing operation and prevent the liquid crystal display from being damaged. When the light source-holding member and the front frame are fastened to each other with a fastener, and the light source-holding member and the back chassis are fastened to each other with another fastener, it is preferable to screw a fastener for fixing the back chassis to the light source-holding member into screw holes from the rear side thereof. This construction allows the disassembling operation to be accomplished at a high operability when maintenance can be facilitated by performing the disassembling operation at the rear side thereof. That is, when a member of the liquid crystal display disposed at its upper side is desired to be taken out, the light source-replacing operation is performed at the front side of the liquid crystal display. On the other hand, when a member of the liquid crystal display disposed at its lower side is desired to be taken out, the light source-replacing operation is performed at the rear side of the liquid crystal display. That is, the construction allows an operator to select an appropriate method in dependence on a purpose and a situation.

It is preferable that at least two members selected from the front frame, the sheet-holding chassis, the light source-holding member and the back chassis are fixed with fasteners penetrated therethrough in a direction from a front side of the liquid crystal display.

More specifically, each of the fasteners is mounted on a member to be fixed by penetrating each of the fasteners through a through-hole formed in an unfixed member, which is disposed at a side forward from the member to be fixed.

In the above-described construction, when any of the front frame, the sheet-holding chassis, the light source-holding member and the back chassis except the member disposed at the forefront are fixed to each other with the fastener that penetrates through the opening, the fastener can be removed through the opening without removing the member disposed forward from the member to be fixed. Further a disassembling operation at a maintenance time can be accomplished at only the front side of the liquid crystal display. Therefore it is unnecessary to turn the liquid crystal display upside down and possible to reduce the number of manufacturing processes.

The present invention provides a liquid crystal display including a liquid crystal panel, a group of optical sheets disposed rearward from the liquid crystal panel, a light source disposed rearward from the group of optical sheets, a frame-shaped front frame disposed forward from at least the group of optical sheets, a back chassis disposed rearward from the light source and fixedly connected to the front frame directly or indirectly, and a fastener fixing at least a rearmost sheet of the group of the layered optical sheets to the front frame, and the group of the optical sheets is held in position integrally by the front frame, when the back chassis and the front frame are unfixed from each other.

In the above-described construction, in maintenance of replacing the failed light source which has been exposed to the outside because the back chassis has been removed, the rearmost optical sheet remains fixed to the front frame. Therefore the construction prevents the optical sheets from being separated from each other and hence dust from entering between the optical sheets. Further the rearmost optical sheet remains fixed to the front frame. Thus the construction eliminates the need for using a member for supporting the rearmost optical sheet, thus preventing an increase in the number of component parts for the liquid crystal display. Further the construction eliminates the need for performing the light source-replacing operation in a particular environment such as a clean room. Thus the operability in the maintenance can be improved. Since the optical sheets are not separated from each other, it is unnecessary to perform an operation of assembling the optical sheets when the liquid crystal display is assembled after the light source-replacing operation is performed. Therefore it is possible to decrease the number of manufacturing processes.

It is preferable that a light source-holding member holding the light source in position is equipped and that the light source-holding member is fixed to a rearmost sheet of the group of the optical sheets with a fastener.

In the above-described construction, by mounting the rearmost sheet of the group of the optical sheets fixed to the front frame on the light source-holding member with the fastener, the light source-holding member can be fixed to the front frame.

It is preferable that at least two members selected from the front frame, the rearmost sheet of the group of the optical sheets, the light source-holding member and the back chassis are fixed with fasteners penetrated therethrough in a direction from a front side of the liquid crystal display.

More specifically, each of the fasteners is mounted on a member to be fixed by penetrating each of the fasteners through a through-hole formed in an unfixed member, which is disposed at a side forward from the member to be fixed.

In the above-described construction, when any of the front frame, the rearmost sheet of the group of the optical sheets, the light source-holding member and the back chassis except the member disposed at the forefront are fixed to each other with the fastener that penetrates through the opening, the fastener can be removed through the opening without removing the member disposed forward from the member to be fixed. Further a disassembling operation at a maintenance time can be accomplished at only the front side of the liquid crystal display. Therefore it is unnecessary to turn the liquid crystal display upside down and possible to reduce the number of manufacturing processes.

The present invention provides a liquid crystal display including a liquid crystal panel, a group of optical sheets disposed rearward from the liquid crystal panel, a light source disposed rearward from the group of optical sheets, a frame-shaped front frame disposed forward from at least the group of optical sheets, a back chassis disposed rearward from the light source and fixedly connected to the front frame directly or indirectly, a light source holding member holding the light source in position and supporting a periphery of a rear side of the group of optical sheets by its upper surface, and a fastener fixing the light source-holding member to the front frame, and the group of the optical sheets held in position integrally by the front frame, when the back chassis and the front frame are unfixed from each other.

In the above-described construction, in maintenance of replacing the failed light source which has been exposed to the outside because the back chassis has been removed, the group of the optical sheets remain supported by the upper surface of the light source-holding member fixed to the front frame. Therefore in performing the light source-replacing operation, the construction prevents the optical sheets from being separated from each other and hence dust from entering between the optical sheets. Further since upper surface of the light source-holding member is utilized to support the optical sheets, the construction eliminates the need for additionally using a member for supporting the optical sheets, thus preventing an increase in the number of component parts for the liquid crystal display.

Further the construction eliminates the need for performing the light source-replacing operation in a particular environment such as a clean room. Thus the operability in the maintenance can be improved. Since the optical sheets are not separated from each other, it is unnecessary to perform an operation of mounting the optical sheets in position when the liquid crystal display is assembled. Therefore it is possible to decrease the number of manufacturing processes.

It is preferable that at least two members selected from the front frame, the light source-holding member and the back chassis are fixed with fasteners penetrated therethrough in a direction from a front side of the liquid crystal display.

More specifically, each of the fasteners is mounted on a member to be fixed by penetrating each of the fasteners through a through-hole formed in an unfixed member, which is disposed at a side forward from the member to be fixed.

In the above-described construction, when any of the front frame, the light source-holding member and the back chassis except the member disposed at the forefront are fixed to each other with the fastener that penetrates through the opening, the fastener can be removed through the opening without removing the member disposed forward from the member to be fixed. Further a disassembling operation at a maintenance time can be accomplished at only the front side of the liquid crystal display. Therefore it is unnecessary to turn the liquid crystal display upside down and possible to reduce the number of manufacturing processes.

It is preferable that the front frame has a frame-shaped bezel holding a periphery of a front side of the liquid crystal panel or/and a frame-shaped front chassis holding a periphery of a rear side of the liquid crystal panel.

The above-described construction allows the periphery of the liquid crystal panel to be sandwiched between the frame-shaped bezel and the frame-shaped front chassis constituting the front frame in combination with the bezel. A spacer interposed between the liquid crystal panel and the bezel as well as the front chassis is capable of preventing the glass substrate of the liquid crystal panel interfering with the bezel and with the front chassis. Thereby it is possible to prevent the generation of an abnormal sound. When the liquid crystal display having this construction is used for audiovisual apparatuses generating a sound, this construction is very effective for preventing an interference sound from being generated by sound wave-caused vibrations.

It is preferable that the light source is composed of a plurality of linear light sources arranged in parallel; light source insertion portions are formed by cutting out a lower end of the light source-holding member; the linear light sources are positioned at the light source insertion portions respectively; and an opening formed at a lower end of each of the light source insertion portions is closed with the back chassis.

In the above-described construction, a surface light source is constructed by arranging a plurality of linear light sources (for example, cold cathode-ray tube, hot cathode-ray tube, xenon lamp, and the like) at the rear side thereof, and the linear light sources can be placed in position in parallel by means of the light source-holding member. The linear light sources can be easily removed from the light source-holding member by merely sliding both end portions of the linear light sources downward from the openings formed at the lower end of the light source insertion portion of the light source-holding member after the back chassis is removed from the liquid crystal display.

When the cold cathode-ray tube containing mercury is used as the linear light source, it is preferable to adopt a construction allowing efficient light source-replacing operation to be accomplished. Thereby it is possible to perform the light source-replacing operation safely without breaking the cold cathode-ray tube and completely recover the mercury that is a harmful substance from the unnecessary cold cathode-ray tube removed from the liquid crystal display. That is, the above-described construction is capable of contributing to recycling in consideration of the protection of environment.

It is preferable that the light source-holding member has a rear receiving member having a groove where an end portion of each of linear light sources is mounted and a front hold-down member mounted on the rear receiving member at a front side thereof.

In the above-described construction, the front hold-down member is fixedly placed on the rear receiving member with the end portion of the linear light source disposed on the groove of the rear receiving member. Thereby the linear light source is held by the light source-holding member. Consequently the assembling operation can be performed with a high handleability. In performing the light source-replacing operation, after the light source-holding member is disassembled from the front frame, the front hold-down member is taken out upward. Thereby the linear light source disposed on the groove can be taken out to the front side of the liquid crystal display. Consequently the light source-replacing operation can be accomplished at the front side of the liquid crystal display without turning the liquid crystal display upside down in the disassembling operation.

It is preferable that the front hold-down member is fixed to the front frame with a fastener; and the rear receiving member is fixed to the back chassis.

In the above-described construction, by merely removing the front hold-down member from the rear receiving member after the fastener is removed to disassemble the front hold-down member from the front frame, the construction allows the light source-replacing operation to be accomplished.

It is preferable that the front hold-down member has a locking portion; the rear receiving member has a to-be-locked portion. In this construction, the front hold-down member is fixed to the rear receiving member by locking the to-be-locked portion to the locking portion.

In the above-described construction, the front hold-down member is locked to the rear receiving member. Unlike the construction in which the front hold-down member is fixed to the rear receiving member with a screw, this construction allows a fixing operation and a removing operation to be performed by one touch. Thus this construction improves operability.

It is preferable that each of the back chassis and the light source-holding member is provided with a positioning means for placing the light source-holding member and the back chassis in position.

In the above-described construction, the light source-holding member can be easily mounted on the back chassis at a predetermined position thereof. Therefore the construction improves a high operability.

More specifically, it is preferable that the positioning means has a convex portion formed on a lower surface of the light source-holding member and a concave portion or a fit-in hole formed on the back chassis at a position corresponding to a position of the convex portion. It is also preferable that the positioning means has a concave portion formed on the lower surface of the light source-holding member and a convex portion formed on the back chassis at the position corresponding to the position of the convex portion.

In this construction, the convex portion and the concave portion are engaged each other to place the back chassis and the light source-holding member in position.

That is, it is possible to place the light source-holding member and the back chassis in position by locking the light source-holding member and the back chassis to each other by means of the convex portion and the concave portion. Thus the light source-holding member and the back chassis can be placed in position by one touch in a simple construction.

It is preferable that sheets constituting the group of optical sheets include a diffusing plate, a prism sheet, a diffusing sheet, an ITO sheet, PET sheet, a light-reflecting sheet.

It is preferable that the light source-holding member and the back chassis are fixed to each other with a fastener mounted thereon in a direction from a rear side thereof.

In the above-described construction, when the liquid crystal display is so constructed that the light source-replacing operation can be performed easily at the rear side thereof, by merely removing the fastener at the rear side of the back chassis, it is possible to separate the back chassis from the light source-holding member and expose the light source held by the light source-holding member to the outside. Therefore the operability in the maintenance can be improved.

As apparent from the foregoing description, the liquid crystal display according to the present invention is so constructed that the group of the optical sheets is supported by the sheet-holding chassis; the group of the optical sheets is fixed to the front frame; or the group of the optical sheets is supported by the upper surface of the light source-holding member even when the back chassis is removed. Thus in the maintenance of replacing the light source which has been exposed to the outside because the back chassis has been removed, the group of the optical sheets remains held integrally. Therefore in the light source-replacing operation, it is possible to prevent the optical sheets from being separated from each other and hence dust from entering between the optical sheets. Further the construction eliminates the need for performing the light source-replacing operation in a particular environment such as a clean room. Thus the operability in the maintenance can be improved. Since the optical sheets are not separated from each other, it is unnecessary to perform an operation of assembling the optical sheets when the liquid crystal display is assembled from the constituting members. Therefore it is possible to decrease the number of manufacturing processes. When the cold cathode-ray tube is used as the linear light source, it is possible to take out mercury therefrom safely and securely, thus contributing to recycling in consideration of the protection of environment.

Further according to the liquid crystal display of the present invention, the cost of transportation is not required and only a failed light source is replaced. Thus a short period of time is required for the light source-replacing operation and hence labor is cheap. Consequently the light source-replacing operation can be performed at a low cost. Furthermore the light source-replacing operation can be accomplished easily because it is necessary to remove only several screws. By merely replacing the failed light source in a simple operation, the liquid crystal display (for example, liquid crystal TV) to which a user has become attached can be restored to be as functional as that of a new one. As such, the user can be satisfied with the liquid crystal display.

DETAILED DESCRIPTION OF THE PREFERRED EMBODIMENTS

The first embodiment of the present invention will be described below with reference to drawings.

Figure 1:
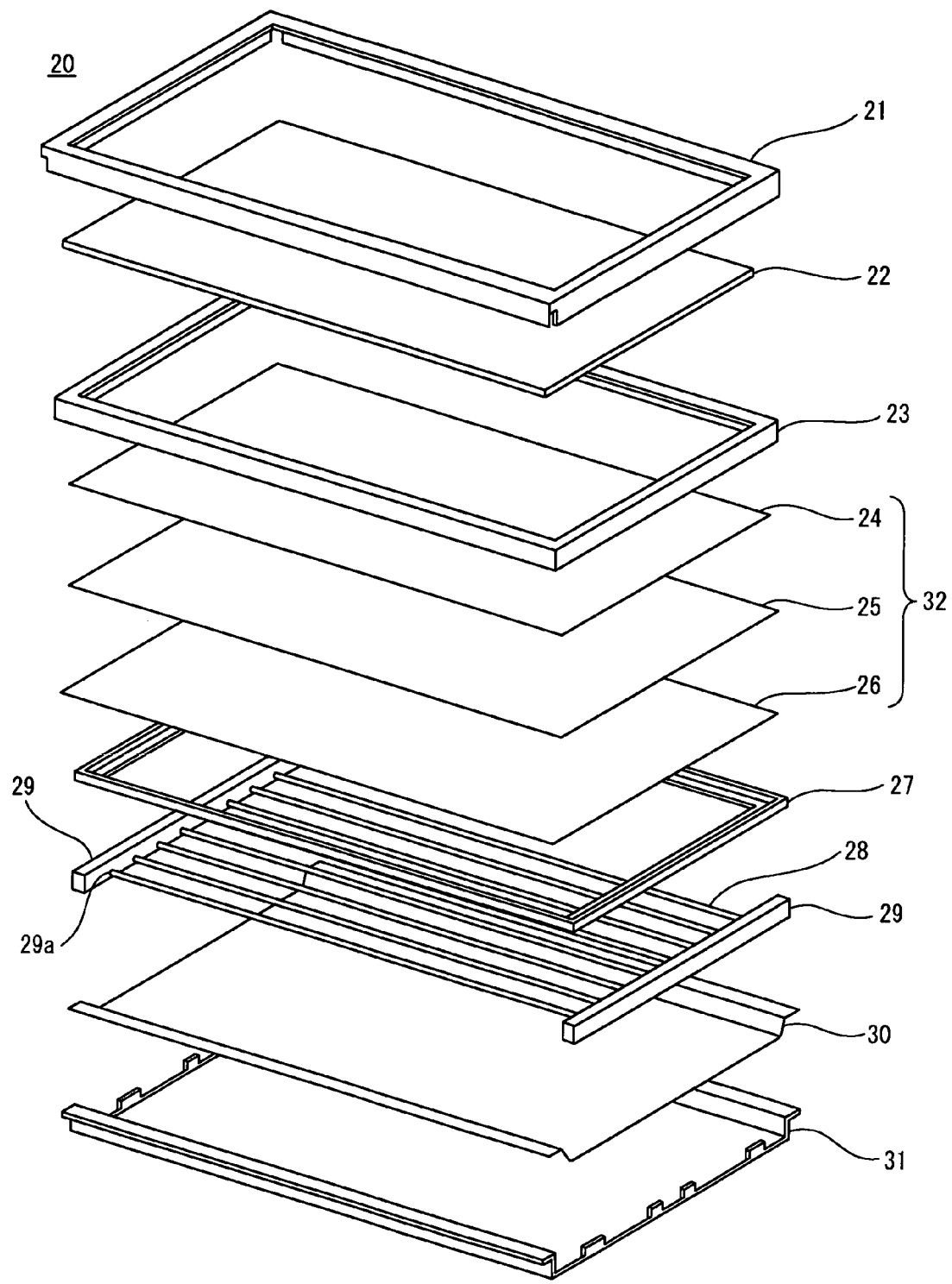
FIG. 1 is a perspective view showing a disassembled liquid crystal display of a first embodiment of the present invention.
Figure 2A:
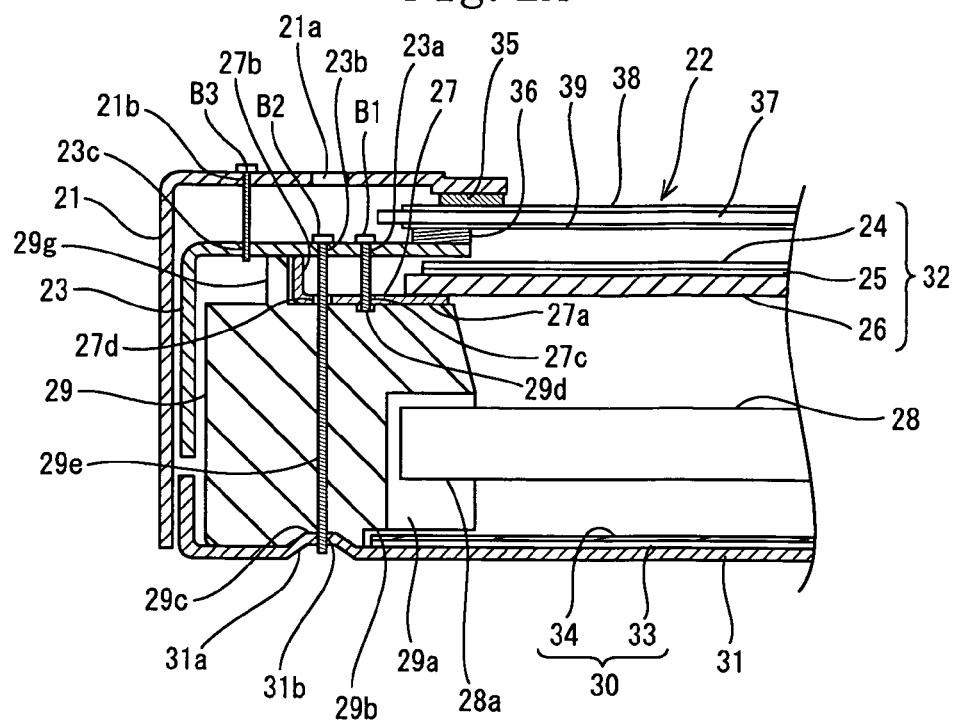
FIG. 2A is a sectional view showing main parts of the liquid crystal display of the first embodiment.

As shown in FIGS. 1 and 2A, in a liquid crystal display 20, the periphery of a liquid crystal panel 22 is held by a frame-shaped front chassis 23 and a bezel 21 through spacers 35, 36. The front chassis 23 and the bezel 21 form a front frame. A optical sheet group 32 (hereinafter referred to as optical sheet group 32) is disposed below the liquid crystal panel 22 by supporting the optical sheet group 32 with a frame-shaped sheet-holding chassis 27. A plurality of linear light sources 28 is disposed parallel with each other below the optical sheet group 32. With both ends 28a of each linear light source 28 being held with a light source-holding member 29, the linear light sources 28 are closed with a reflecting composite member 30 disposed below the light source-holding member 29 and a back chassis 31 disposed below the reflecting composite member 30. It is to be noted that the front side of the liquid crystal display at which images are displayed is set as the upper side thereof and that the rear side thereof is set as the lower side thereof.

As shown in FIG. 2A, in the liquid crystal panel 22, liquid crystal is enclosed between transparent substrates 37 confronting each other to form a large number of pixels arranged in the shape of a matrix. Polarizing plates 38 and 39 for making the direction of planes of polarization of light beams incident on the liquid crystal panel 22 and leaving it uniform are provided at either side of the transparent substrates 37.

The optical sheet group 32 are resin sheets for diffusing and condensing transmitted light. The optical sheet group 32 includes a prism sheet 24 disposed uppermost, a diffusing sheet 25 located at an intermediate position, and a diffusing plate 26 disposed lowermost. The number of the optical sheets and the combination thereof are arbitrarily set. For example, a DBEF-D, a prism sheet, a diffusing sheet, and a diffusing plate can be layered one upon another, with the DBEF-D disposed uppermost, the prism sheet disposed under the DBEF-D, the diffusing sheet under the prism sheet, and the diffusing plate disposed lowermost. The optical sheet group 32 may include an ITO sheet, PET sheet, a light-guiding plate, and a selective reflecting sheet.

The frame-shaped sheet-holding chassis 27 sectionally L-shaped includes a flat portion 27a supporting the peripheral edge of the lower surface of the diffusing plate 26 disposed lowermost in the optical sheet group 32 and a vertical portion 27b projecting vertically upward from the periphery of the flat portion 27a. A screw hole 27c and a through-hole 27d are formed at the flat portion 27a.

A cold cathode-ray tube is used as the linear light source 28 in the first embodiment. But a hot cathode-ray tube, a xenon lamp, and a nonlinear light emitting diode (LED) may be used as the linear light source 28. A rubber holder is mounted on the linear light source 28 at both ends thereof, although the rubber holder is not shown in the drawings. In the first embodiment, in using the liquid crystal display 20 by setting the shorter side of the liquid crystal display 20 vertically and the longer side thereof horizontally, the linear light source 28 is set horizontally to prevent mercury accommodated therein from staying at only one side. Thereby it is possible to optimize the characteristic of the light source. However, the linear light source 28 may be vertically disposed according to the performance thereof. This construction allows the linear light source disposed vertically to be shorter than the linear light source disposed horizontally.

A pair of the light source-holding members 29 is a molded product made of resin and holds both ends 28a of a plurality of linear light sources 28 in position. Light source insertion portions 29a are formed by cutting out the lower ends of the opposed surfaces of a pair of the light source-holding members 29 at predetermined intervals. The light source-holding members 29 has a cut-out portion 29b, formed at the lower end thereof, for placing the end portion of the reflecting composite member 30 in position. The light source-holding member 29 has a concave portion 29c, formed on the lower surface thereof, which is used to position the light source-holding member 29 on the back chassis 31. The light source-holding member 29 has an insertion hole 29e formed in the range from the concave portion 29c to the upper surface thereof. The light source-holding member 29 has a projected portion 29g, formed on the upper surface thereof, which contacts the lower surface of the front chassis 23. The light source-holding member 29 has another concave portion 29d formed on the upper surface thereof by forming a gap between a screw B1 and the circumference of the concave portion 29d to prevent the light source-holding member 29 and the screw B1 from interfering with each other.

"Alset" (produced by Mitsubishi Jushi Inc.) having a reflectivity of not less than 90% is used as the reflecting composite member 30. The "Alset" is formed by bonding a reflecting sheet 34 to the upper surface of a metal plate 33 made of aluminum.

The back chassis 31 made of metal plays the role of improving the strength of the liquid crystal display and releasing heat. The back chassis 31 has a convex portion 31a formed at a position corresponding to the position of the concave portion 29c formed on the lower surface of the light source-holding member 29 to place the back chassis 31 in position. A screw hole 31b is formed at the convex portion 31a. To maintain the strength of the back chassis 31, instead of metal, the back chassis 31 may be made of resin such as fiber reinforced resin having a rigidity.

It is possible to use an integral composite member having the function of the reflecting composite member 30 and the back chassis 31. Thereby when the linear light source 28 is replaced at the rear side of the liquid crystal display, an operation of replacing the linear light source 28 can be accomplished by disassembling only several fasteners and the composite member because the composite member is integral and is hence not separated.

The bezel 21 is frame-shaped and has a sectional shape of an inverted L. The bezel 21 has an opening 21a into which a screw B2 is inserted and a screw hole 21b formed on the upper surface thereof. The front chassis 23 is frame-shaped and has a sectional shape of an inverted L. The front chassis 23 has screw holes 23a, 23b, and 23c formed on the upper surface thereof. Screws B1, B2, and B3 are inserted into the screw holes 23a, 23b, and 23c respectively.

The front chassis 23 and the sheet-holding chassis 27 are fixed to each other, with the optical sheet group 32 interposed therebetween by the screw B1 threaded downward into the screw holes 23a and 27c. The concave portion 29d is formed at the position of the light source-holding member 29 at which the screw B1 and the light source-holding member 29 interfere with each other. Thereby it is possible to prevent the screw B1 and the light source-holding member 29 from interfering with each other.

The bezel 21 and the front chassis 23 are fixed to each other with the screw B3 threaded downward into the screw holes 21b and 23c, with the liquid crystal panel 22 sandwiched therebetween.

The front chassis 23, the light source-holding member 29, and the back chassis 31 are fixed to each other with the screw B2 penetrated through a through-hole 27d of the sheet-holding chassis 27 and threaded downward into the screw holes 23b and 31b and an insertion hole 29e.

The back chassis 31 may be fixed to an unshown position of the front chassis 23 and the bezel 21 without using the screw B2.

The procedure of maintenance to be performed when the linear light source 28 has failed is described below.

Figure 2B:
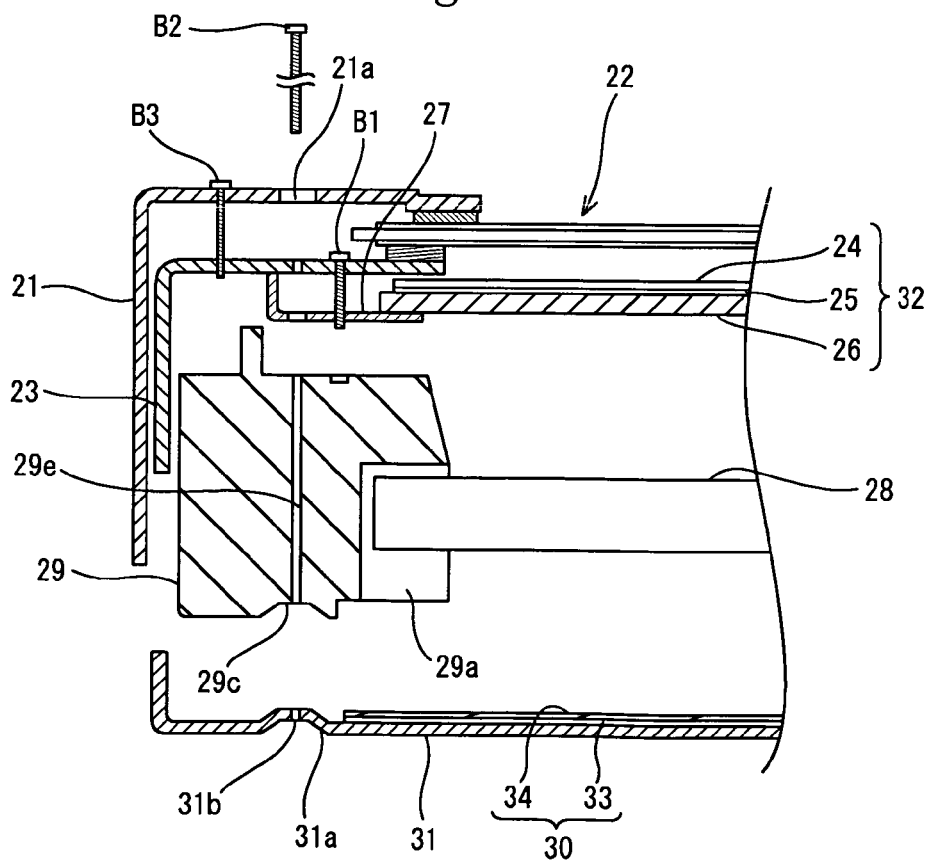
FIG. 2B is a sectional view showing the disassembled liquid crystal display of the first embodiment when a light source-replacing operation is performed.

As shown in FIG. 2B, the back chassis 31, the reflecting composite member 30, and the light source-holding member 29 can be disassembled by removing the screw B2 at the front side (upper side in FIG. 2B) of the liquid crystal display 20 through the opening 21a. Thereby the linear light source 28 can be taken out downward from an opening formed below the light source insertion portion 29a of the light source-holding member 29. At this time, the sheet-holding chassis 27 remains fixed to the front chassis 23 with the screw B1. Therefore the optical sheet group 32 remains supported by the sheet-holding chassis 27. Consequently the above-described sheets 24, 25, and 26 of the optical sheet group 32 can be prevented from being separated from each other. Thus it is possible to prevent dust from entering between the sheets 24 and 25 and between the sheets 25 and 26.

The maintenance operation can be finished by merely performing an operation of positioning the concave portion 29c on the convex portion 31a of the back chassis 31, assembling the light source-holding member 29, the reflecting composite member 30, and the back chassis 31 on each other, and fixing them to each other with the screw B2. That is, the linear light source 28 can be replaced by performing a light source-replacing operation at the front side of the liquid crystal display without taking a trouble of turning the liquid crystal display upside down. Because all the screws B1 through B3 are mounted in the direction from the front side of the liquid crystal display, other disassembling operations can be performed at only the front side thereof. Thus a high operability can be obtained in the first embodiment.

Figure 3A:
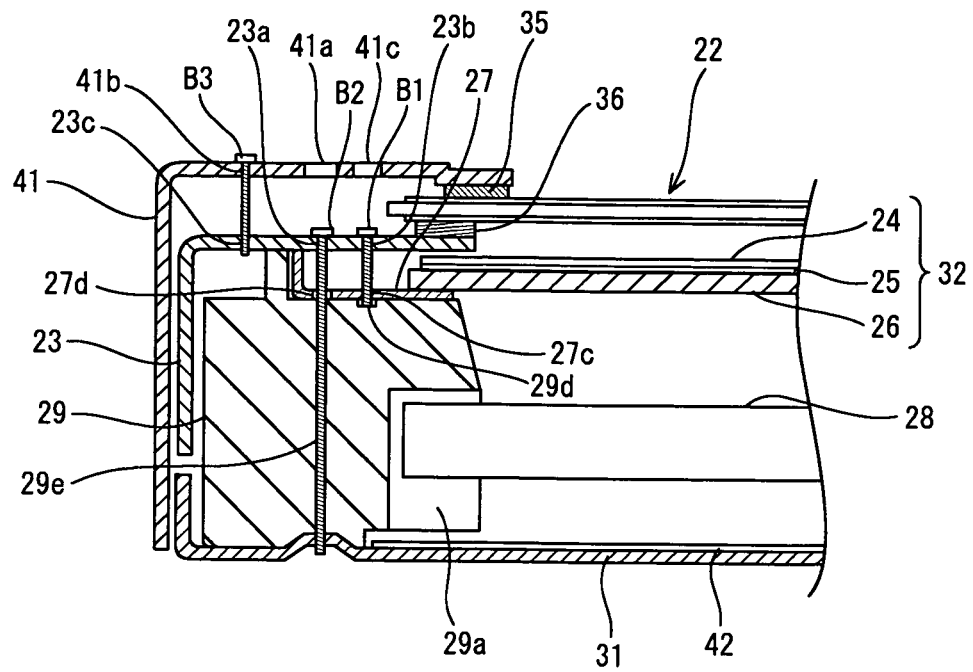
FIG. 3A is a sectional view showing main parts of a liquid crystal display of a second embodiment.
Figure 3B:
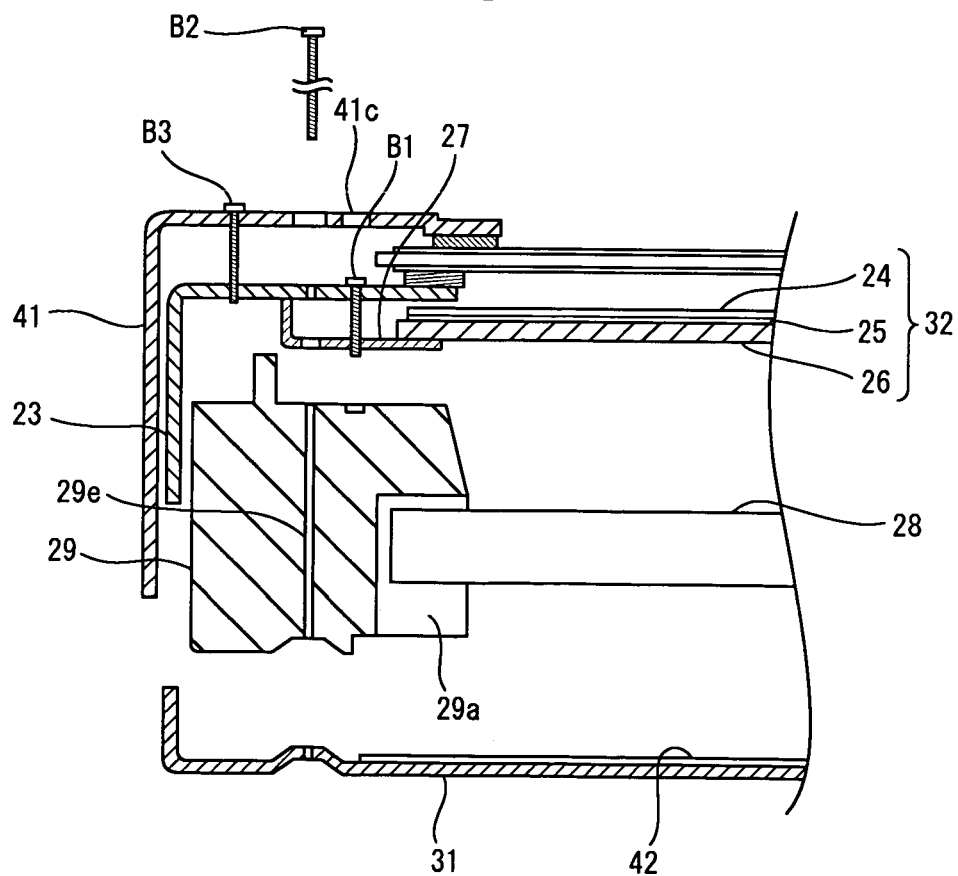
FIG. 3B is a sectional view showing the disassembled liquid crystal display of the second embodiment when a light source-replacing operation is performed.

FIGS. 3A and 3B show the second embodiment.

In the second embodiment, instead of the reflecting composite member 30, a reflecting sheet 42 is mounted on the upper surface of the back chassis 31. A bezel 41 has an opening 41c, formed above the screw B1, into which a screw is threaded.

The bezel 41 has openings 41a and 41c formed at a position corresponding to the position of the screw B1 and at a position corresponding to the position of the screw B2. The bezel 41 has a screw hole 41b at a position corresponding to the position of the screw B3.

In the above-described construction, when the sheet-holding chassis 27 is intended to be disassembled, the screw B2 is removed through the opening 41a of the bezel 41 to disassemble the light source-holding member 29, the reflecting sheet 42, and the back chassis 31 from each other. The screw B1 is also removed through the opening 41c of the bezel 41 to disassemble the sheet-holding chassis 27 without disassembling the bezel 41 and the front chassis 23. Therefore it is possible to maintain the fixed state of the liquid crystal panel 22 and hence maintenance can be accomplished with high operability.

That is, because all the screws B1 through B3 are mounted in the direction from the front side of the liquid crystal display, the disassembling operation can be performed at only the front side thereof. Thus a high operability can be obtained in the second embodiment. The other constructions are similar to those of the first embodiment. Thus they are denoted by the same reference numerals as those of the first embodiment and description thereof is omitted herein.

Figure 4A:
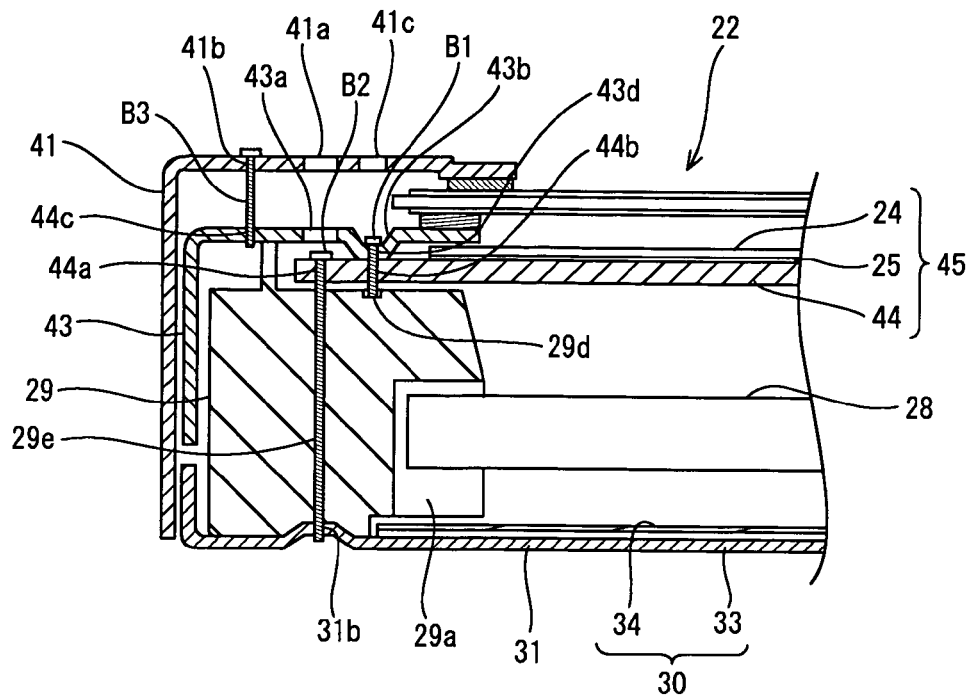
FIG. 4A is a sectional view showing main parts of a liquid crystal display of a third embodiment.
Figure 4B:
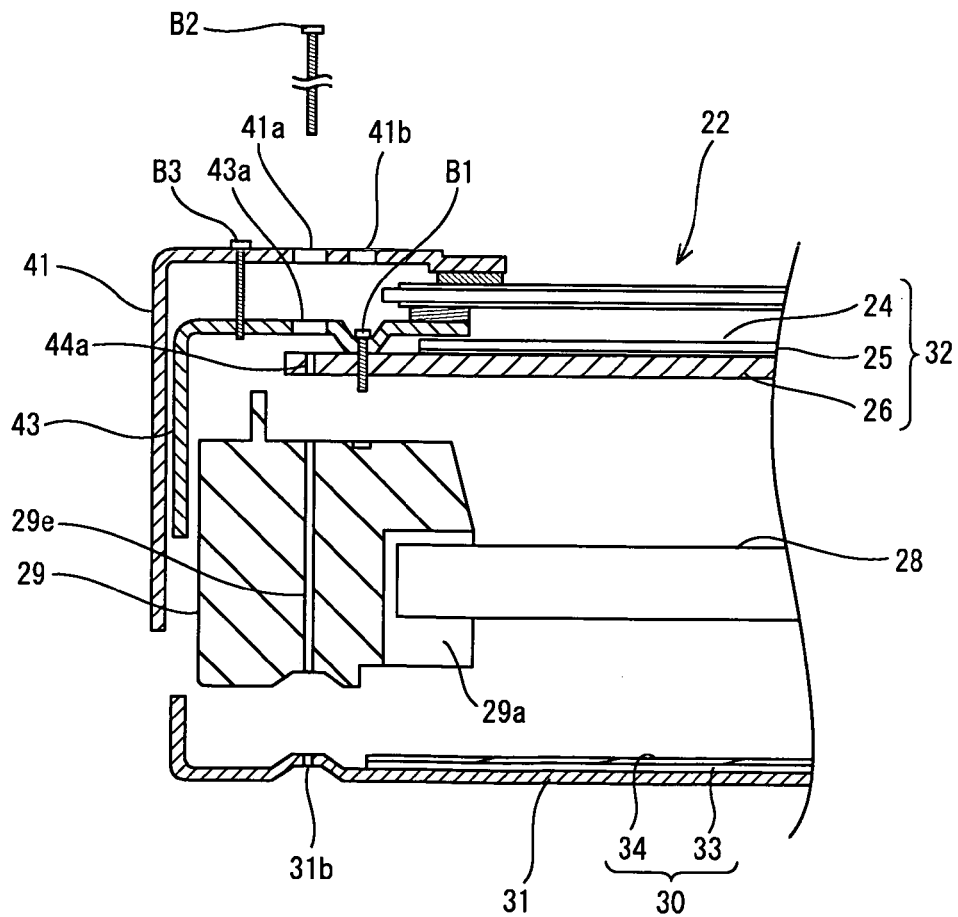
FIG. 4B is a sectional view showing the disassembled liquid crystal display of the third embodiment when a light source-replacing operation is performed.

FIGS. 4A and 4B show the third embodiment.

In the third embodiment, the liquid crystal display is not provided with the sheet-holding chassis 27. Instead, one end of a diffusing plate 44 disposed lowermost in an optical sheet group 45 is extended sideways to provide screw holes 44a and 44b on the diffusing plate 44.

The front chassis 43 has a concave portion 43b formed at a position into which the screw B1 is threaded and has a screw hole 43d formed at the concave portion 43b. The front chassis 43 has an opening 43a formed at a position corresponding to the position of the screw B2 and has a screw hole 44c formed at a position corresponding to the position of the screw B3.

The front chassis 43 and the diffusing plate 44 disposed lowermost in the optical sheet group 45 are fixed to each other with the screw B1 threaded into the screw hole 43d and the screw hole 44b. Thereby in addition to the fixing of the diffusing plate 44 to the front chassis 43, the prism sheet 24 and the diffusing sheet 25 disposed above the diffusing plate 44 are supported.

A concave portion 43b is formed on the front chassis 43 to form a space in which the prism sheet 24 and the diffusing sheet 25 are layered on each other. The diffusing plate 44, the light source-holding member 29, and the back chassis 31 are fixed to each other with the screw B2 threaded into the screw hole 44a, an insertion hole 29e, and a screw hole 31b.

In the above-described construction, when the back chassis 31, the reflecting composite member 30, and the light source-holding member 29 are disassembled by removing the screw B2, the diffusing plate 44 disposed lowermost in the optical sheet group 45 is fixed to the front chassis 43 with the screw B1. Thus the prism sheet 24 and diffusing sheet 25 disposed above the diffusing plate 44 remain supported thereby. Consequently the above-described sheets 24, 25, and 44 of the optical sheet group 45 can be prevented from being separated from each other. Thus it is possible to prevent dust from entering between the prism sheet 24 and the diffusing sheet 25 and between the diffusing sheet 25 and the diffusing plate 44.

All the screws B1 through B3 are mounted in the direction from the front side of the liquid crystal display. Thus it is possible to accomplish the operation of replacing the linear light source 28 at the front side of the liquid crystal display without taking a trouble of turning the liquid crystal display upside down. Thus a high operability can be obtained in the third embodiment.

Instead of forming the screw holes 44a and 44b on the diffusing plate 44, a nut may be mounted on the diffusing plate 44 by insert molding. The screw B1 may be used to fix the prism sheet 24 and the diffusing sheet 25 disposed above the diffusing plate 44, although the screw B1 is used to fix the diffusing plate 44 disposed lowermost in the optical sheet group 45 to the front chassis 43 in the third embodiment. The other constructions are similar to those of the above-described embodiments. Thus they are denoted by the same reference numerals as those of the above-described embodiments and description thereof is omitted herein.

Figure 5A:
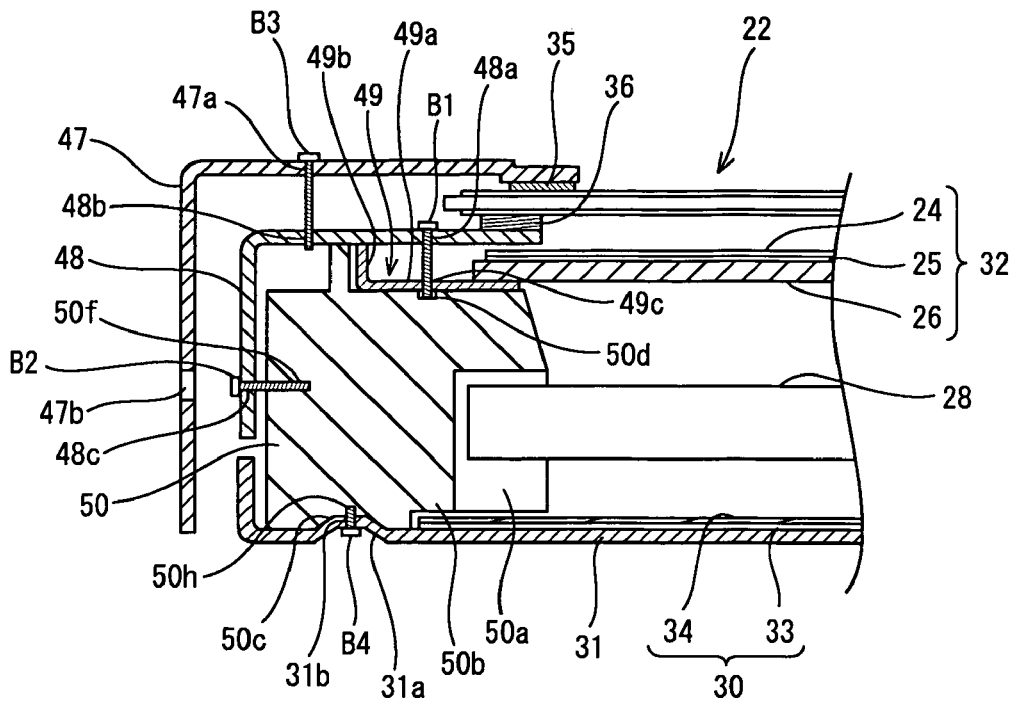
FIG. 5A is a sectional view showing main parts of a liquid crystal display of a fourth embodiment.
Figure 5B:
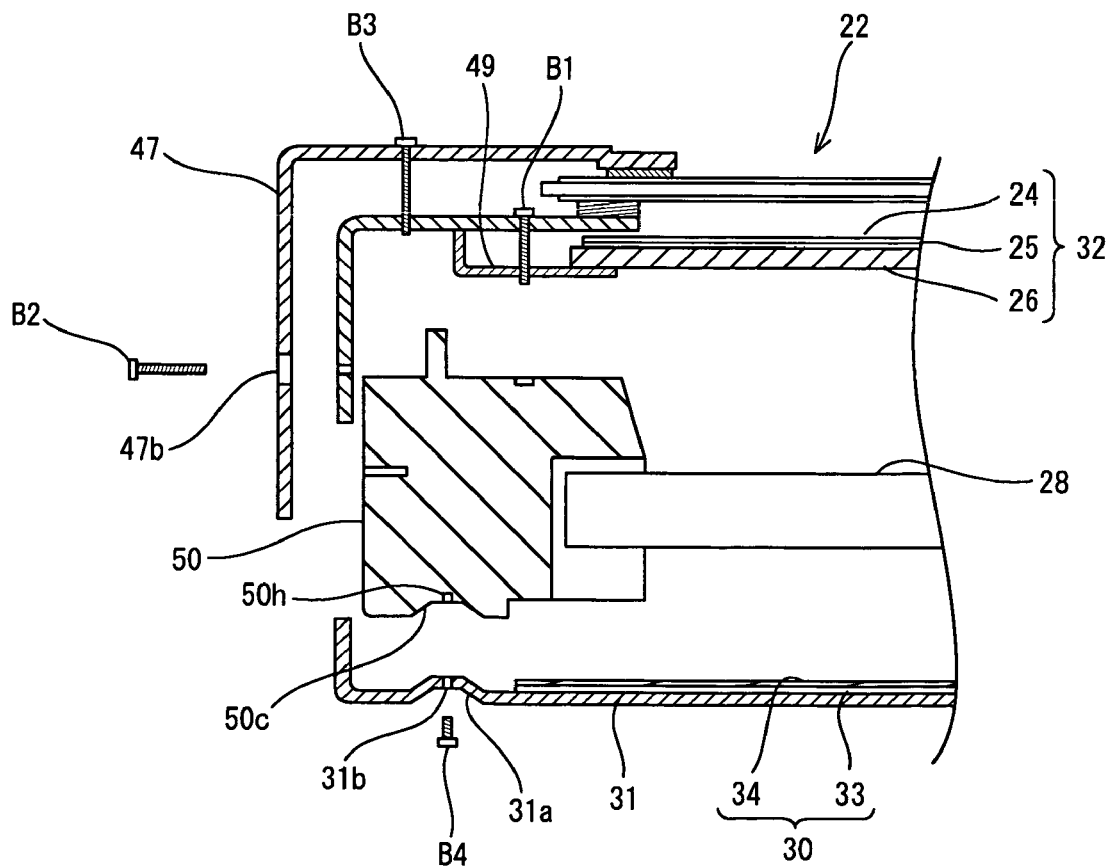
FIG. 5B is a sectional view showing the disassembled liquid crystal display of the fourth embodiment when a light source-replacing operation is performed.

FIGS. 5A and 5B show the fourth embodiment.

In the fourth embodiment, the screw B2 for fixing a front chassis 48 and a light source-holding member 50 to each other is horizontally threaded into screw holes formed on the side surface thereof. The back chassis 31 is fixed to the light source-holding member 50 with a screw B4 threaded upward into screw holes formed on the rear surfaces thereof.

The bezel 47 has a screw hole 47a formed on its upper surface and a screw insertion opening 47b formed on its side surface.

A front chassis 48 has screw holes 48a and 48b, formed on its upper surface, into which the screws B1 and B3 are threaded respectively and has a screw hole 48c, formed on its side surface, into which the screw B2 is threaded.

The lower end of the opposed surfaces of a pair of the light source-holding members 50 is cut out to form light source insertion portions 50a. The light source-holding member 50 has a concave portion 50c, formed on its lower surface, for positioning the light source-holding member 50 on the back chassis 31. A screw hole 50h is formed through the concave portion 50c. A cut-out portion 50b for positioning an end portion of the reflecting composite member 30 is formed on the lower end of the light source insertion portion 50a. The light source-holding member 50 has a concave portion 50d formed on its upper surface by forming a gap between the circumference of the concave portion 50d and the screw B1 to prevent the screw B and the light source-holding member 50 from interfering with each other. The light source-holding member 50 has a screw hole 50f, formed on its side surface, for fixing the screw B2 thereto.

The light source-holding member 50 and the back chassis 31 are fixed to each other by threading the screw B4 upward into the screw holes 31b and 50h, with the convex portion 31a of the back chassis 31 fitted into the concave portion 50c of the light source-holding member 50.

In performing the operation of replacing the linear light source 28, the screw B4 is removed from the rear side of the liquid crystal display. Thereby the back chassis 31 and the reflecting composite member 30 can be removed without disassembling the optical sheet group 32. When the light source-holding member 50 is desired to be removed, the screw B2 is removed through the opening 47b of the bezel 47. Thereby with the optical sheet group 42 and the liquid crystal panel 22 kept fixed, a disassembling operation can be accomplished sideways. The other constructions are similar to those of the above-described embodiments. Thus they are denoted by the same reference numerals as those of the above-described embodiments and description thereof is omitted herein.

Figure 6A:
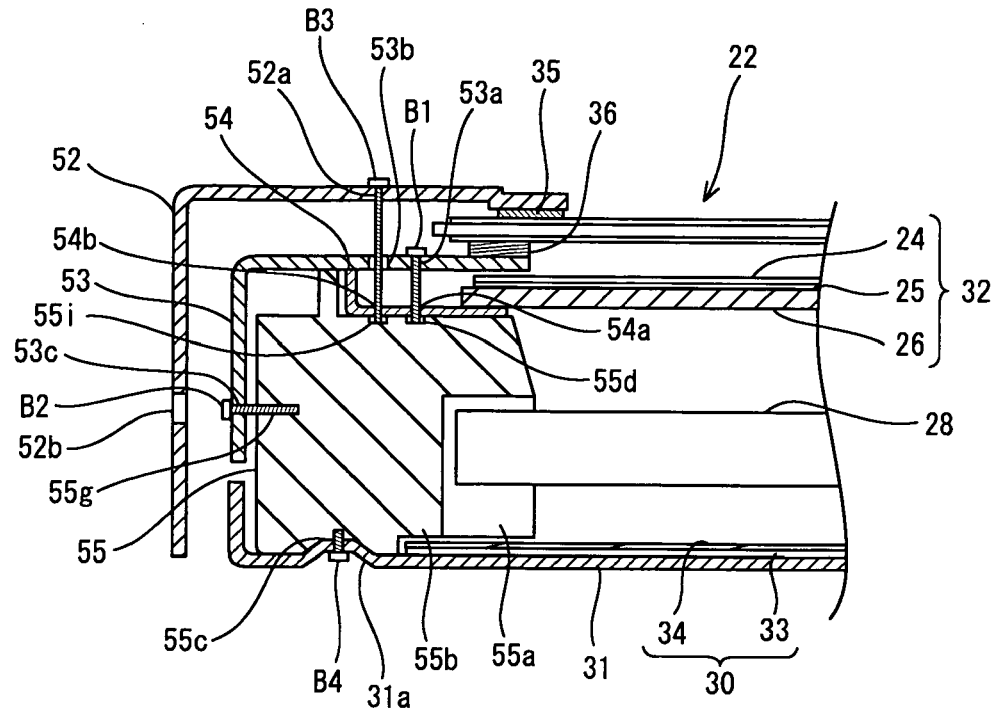
FIG. 6A is a sectional view showing main parts of a liquid crystal display of a fifth embodiment.
Figure 6B:
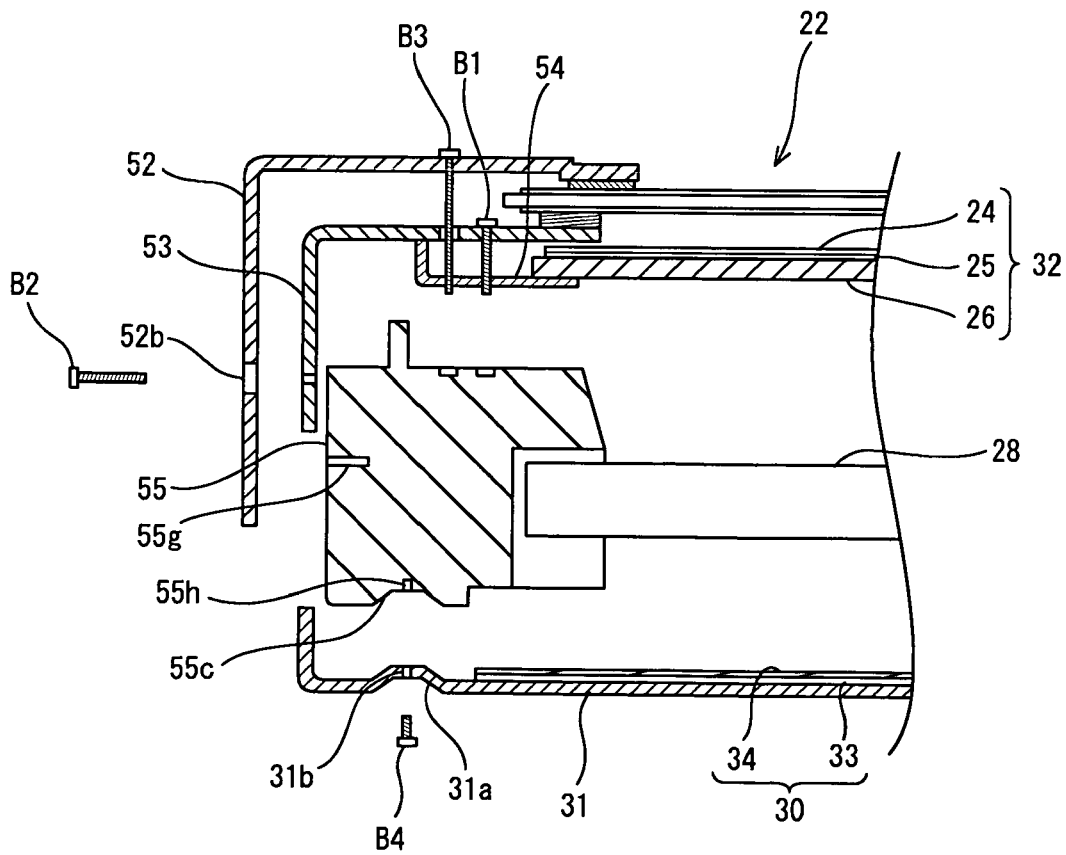
FIG. 6B is a sectional view showing the disassembled liquid crystal display of the fifth embodiment when a light source-replacing operation is performed.

FIGS. 6A and 6B show the fifth embodiment.

In the fifth embodiment, a sheet-holding chassis 54 is fixed to a bezel 52 with the screw B3.

The bezel 52 has a screw hole 52a, formed on its upper surface, into which the screw B3 is threaded and has a screw insertion opening 52b formed on its side surface.

A front chassis 53 has a screw hole 53a, formed on its upper surface, into which the screw B1 is threaded and has a through-hole 53b, formed on its upper surface, through which the screw B3 is inserted. The front chassis 53 has a screw hole 53c, formed on its side surface, into which the screw B2 is threaded.

The sheet-holding chassis 54 has screw holes 54a and 54b into which the screws B1 and B3 are threaded respectively.

The lower end of the opposed surfaces of a pair of the light source-holding members 55 is cut out to form light source insertion portions 55a. The light source-holding member 55 has a concave portion 55c, formed on its lower surface, for positioning the light source-holding member 55 on the back chassis 31. A screw hole 55h is formed through the concave portion 55c. A cut-out portion 55b for positioning an end portion of the reflecting composite member 30 is formed on the lower end of the light source insertion portion 55a. The light source-holding member 55 has concave portions 55d and 55i formed on its upper surface by forming a gap between the circumference of the concave portion 55d and the screw B1 and between the circumference of the concave portion 55i and the screw B2 to prevent the screws B1 and B2 from interfering the light source-holding member 55. The light source-holding member 55 has a screw hole 55g, formed on its side surface, for fixing the screw B2 thereto.

In performing the operation of replacing the linear light source 28, as in the case of the fourth embodiment, the screw B4 is removed from the rear side of the liquid crystal display. Thereby the back chassis 31 and the reflecting composite member 30 can be removed without disassembling the optical sheet group 32 to replace the linear light source 28. The other constructions are similar to those of the above-described embodiments. Thus they are denoted by the same reference numerals as those of the above-described embodiments and description thereof is omitted herein.

Figure 7A:
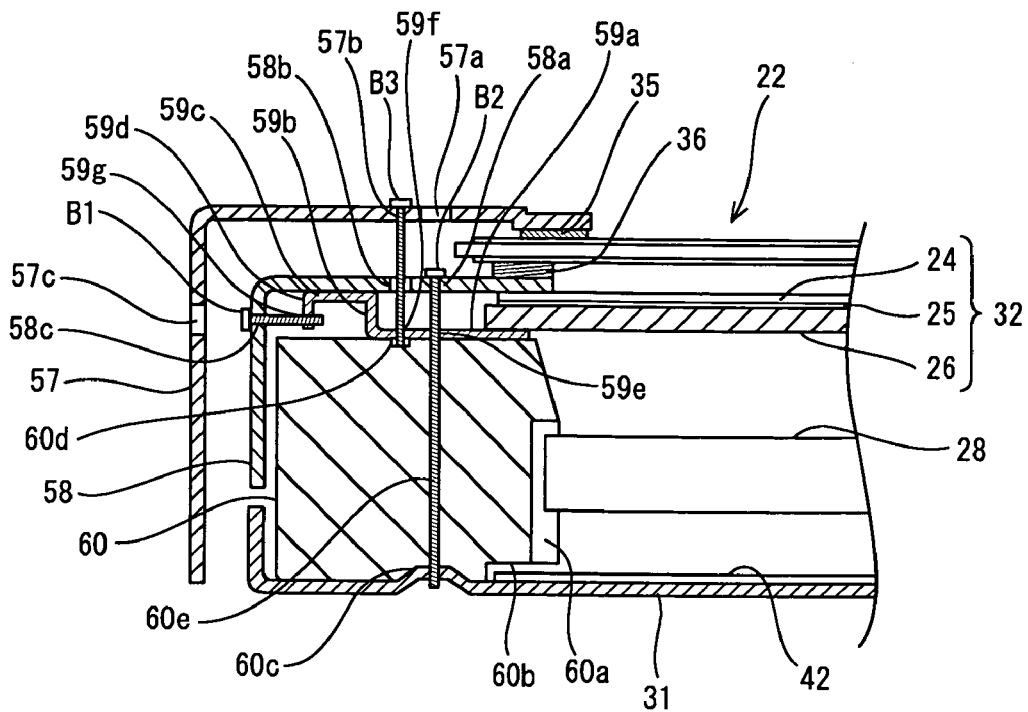
FIG. 7A is a sectional view showing main parts of a liquid crystal display of a sixth embodiment.
Figure 7B:
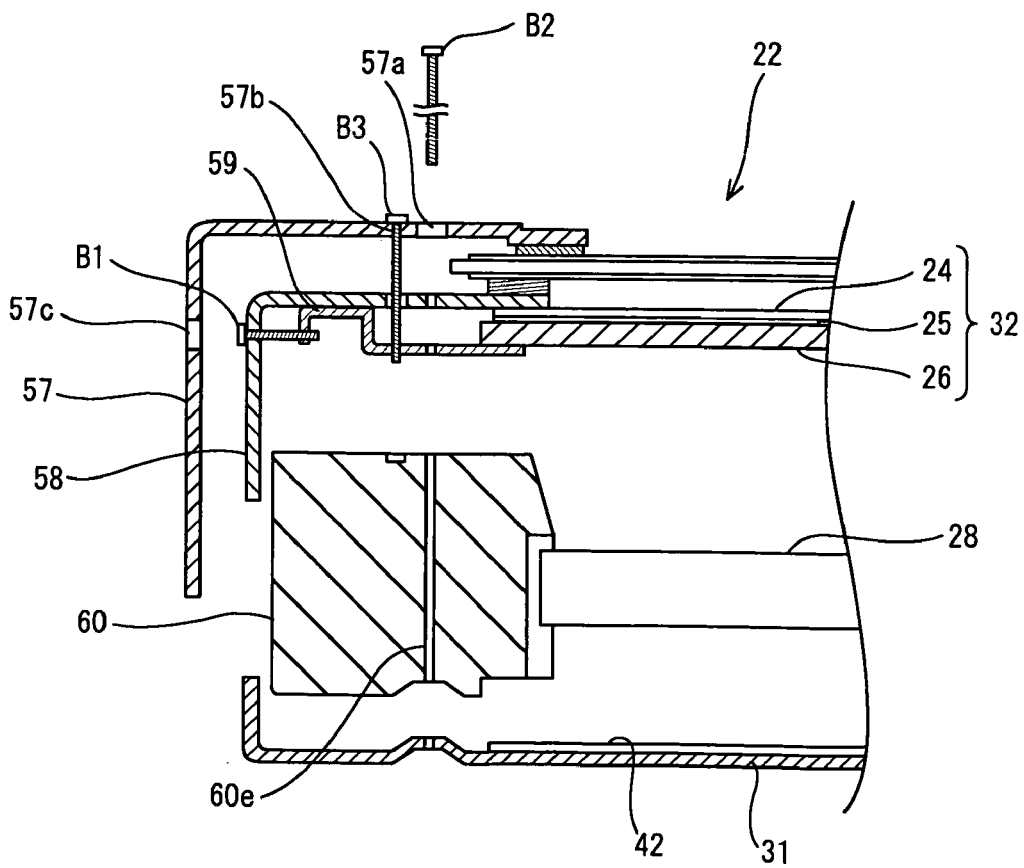
FIG. 7B is a sectional view showing the disassembled liquid crystal display of the sixth embodiment when a light source-replacing operation is performed.

FIGS. 7A and 7B show the sixth embodiment.

The sheet-holding chassis 59 of the sixth embodiment has a flat portion 59a supporting the diffusing plate 26, a vertical portion 59b projecting vertically upward from the periphery of the flat portion 59a, a horizontal portion 59c projecting outward from the upper end of the vertical portion 59b, and a descending portion 59d projecting downward from the periphery of the horizontal portion 59c. The flat portion 59a has screw holes 59e and 59f into which the screws B2 and B3 are threaded respectively. The descending portion 59d has a screw hole 59g into which the screw B1 is inserted.

A bezel 57 has a screw hole 57b, formed on its upper surface, into which the screw B3 is threaded and has a screw insertion opening 57a formed on its upper surface. The bezel 57 has a screw insertion opening 57c formed on its side surface.

A front chassis 58 has a screw hole 58a, formed on its upper surface, into which the screw B2 is threaded and has an opening 58b, formed on its upper surface, through which the screw B3 penetrates. The front chassis 58 has a screw hole 58c, formed on its side surface, into which the screw B1 is threaded.

The lower end of the opposed surfaces of a pair of the light source-holding members 60 is cut out to form light source insertion portions 60a. The light source-holding member 60 has a concave portion 60c, formed on its lower surface, for positioning the light source-holding member 60 on the back chassis 31. An insertion hole 60e is formed in the direction from the concave portion 60c to the upper surface of the light source-holding member 60. A cut-out portion 60b for positioning an end portion of the reflecting sheet 42 is formed on the lower end of the light source insertion portion 60a. The light source-holding member 60 has a concave portion 60d formed on its upper surface by forming a gap between the circumference of the concave portion 60d and the screw B3 to prevent the screw B3 and the light source-holding member 60 from interfering with each other.

In performing the operation of replacing the linear light source 28, the screw B2 is removed through the opening 57a of the bezel 57. Thereby without disassembling the optical sheet group 32, the back chassis 31, the reflecting sheet 42, and the light source-holding member 60 can be removed by performing the replacing operation at only the front side of the liquid crystal display. The other constructions are similar to those of the above-described embodiments. Thus they are denoted by the same reference numerals as those of the above-described embodiments and description thereof is omitted herein.

Figure 8A:
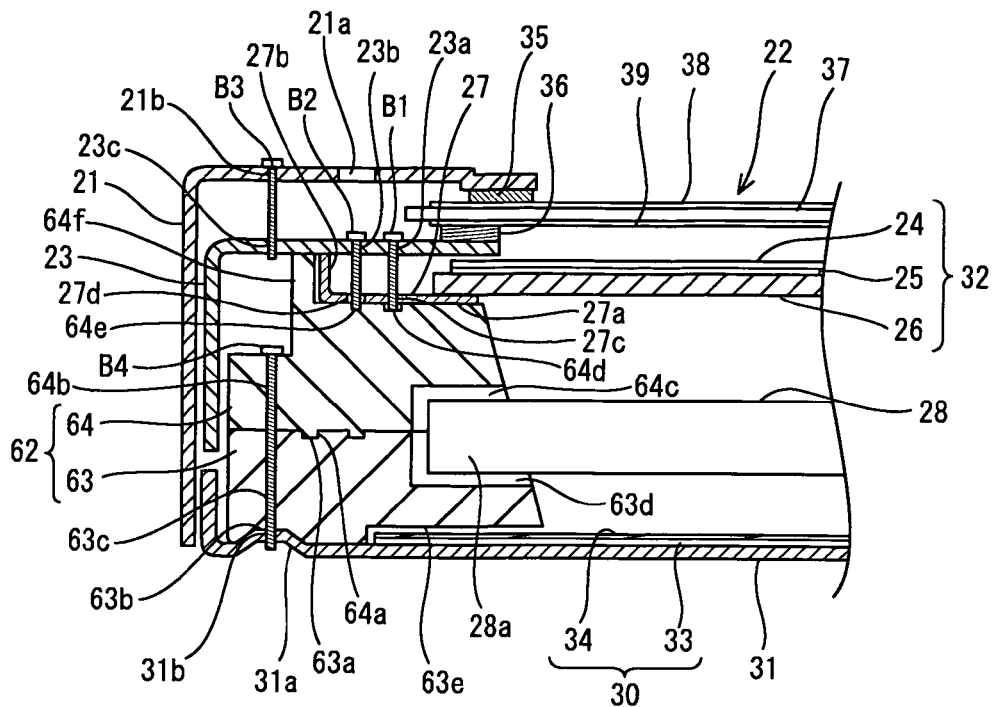
FIG. 8A is a sectional view showing main parts of a liquid crystal display of a seventh embodiment.
Figure 8B:
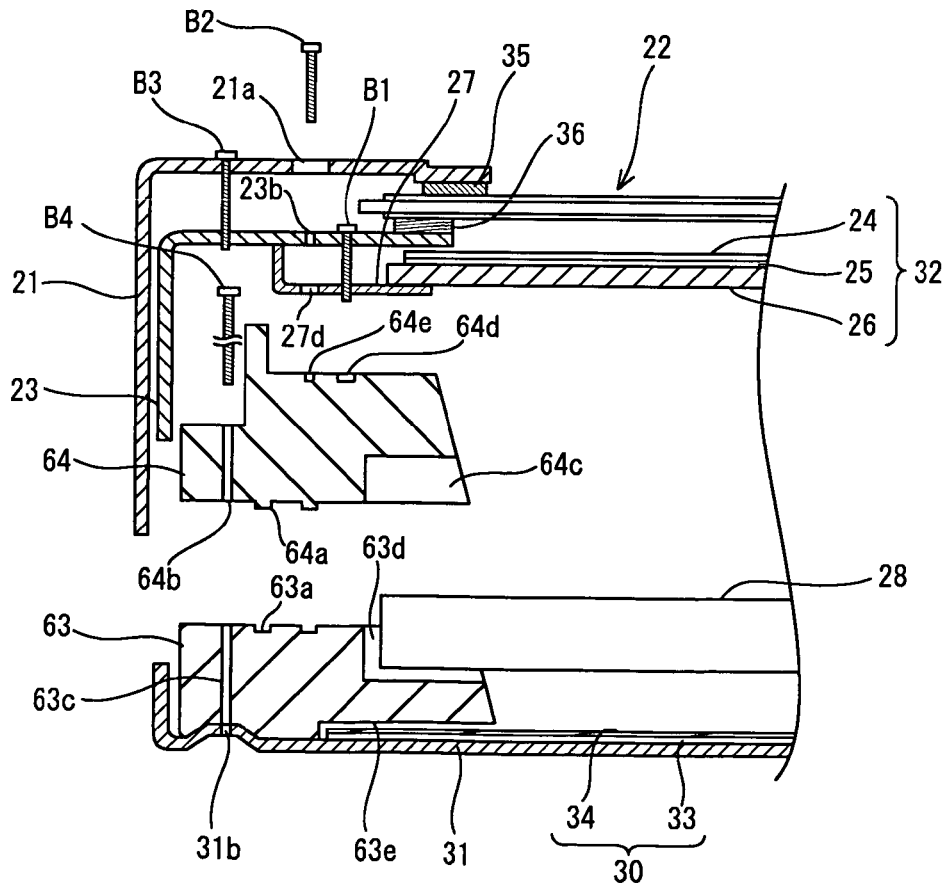
FIG. 8B is a sectional view showing the disassembled liquid crystal display of the seventh embodiment when a light source-replacing operation is performed.

FIGS. 8A and 8B shows the seventh embodiment.

A light source-holding member 62 of the seventh embodiment is composed of a rear receiving member 63 and a front hold-down member 64 sandwiching both ends 28a of the linear light source 28 therebetween.

The rear receiving member 63 has a concave portion 63a, formed on its upper surface, into which the lower surface of the front hold-down member 64 is fitted. The upper end of the inner side surface of the rear receiving member 63 is cut out to form a groove 63d on which an end portion 28a of the linear light source 28 is mounted. The lower end of the inner side surface of the rear receiving member 63 is cut out to form a cut-out portion 63e for holding down the reflecting composite member 30. The rear receiving member 63 has a concave portion 63b, formed on its lower surface, for positioning the rear receiving member 63 on the back chassis 31. An insertion hole 63c penetrating through the rear receiving member 63 from the concave portion 63b to the upper surface thereof is formed in the concave portion 63b.

The front hold-down member 64 has a convex portion 64a, formed on its lower surface, which fits in the concave portion 63a of the rear receiving member 63. The lower end of the inner side surface of the front hold-down member 64 is cut out to form a cut-out portion 64c which matches the groove 63d of the rear receiving member 63. The front hold-down member 64 has a concave portion 64d formed on its upper surface by forming a gap between the circumference of the concave portion 64d and the screw B1 to prevent the screw B1 and the front hold-down member 64 from interfering with each other. The front hold-down member 64 has a screw hole 64e, formed on its upper surface, into which the screw B2 is threaded. The front hold-down member 64 has a projected portion 64f that contacts the lower surface of the front chassis 23. The front hold-down member 64 has a screw hole 64b formed in the range from a stepped horizontal outer upper surface thereof to the lower surface thereof.

The front hold-down member 64 is placed on the rear receiving member 63 with the end portion 28a of the linear light source 28 mounted on the groove 63d of the rear receiving member 63. The convex portion 64a is fitted in the concave portion 63a. The screw B4 is inserted downward into the matched insertion hole 63c and the screw hole 64b and threaded into the screw hole 31b of the back chassis 31 to fix the rear receiving member 63 and the front hold-down member 64 to each other. The front chassis 23 and the light source-holding member 62 are fixed to each other by penetrating the screw B2 through the through-hole 27d of the sheet-holding chassis 27 and by threading the screw B2 into the screw holes 23b and 64e.

In the above-described construction, before the light source-holding member 62 is mounted on the front chassis 23, the linear light source 28 is held by the light source-holding member 62 with the screw B4. Therefore the assembling operation can be performed with high handleability.

In performing the operation of replacing the linear light source 28, after the screw B2 is removed, the screw B4 is removed to take out the front hold-down member 64 upward. Thereby the linear light source 28 disposed on the groove 63d can be taken out to the front side of the liquid crystal display. That is, the operation of replacing the linear light source 28 can be accomplished at the front side of the liquid crystal display. Thus it is unnecessary to turn the liquid crystal display upside down and possible to reduce a load in the light source-replacing operation. Thus it is possible prevent the liquid crystal display from being damaged. The other constructions are similar to those of the above-described embodiments. Thus they are denoted by the same reference numerals as those of the above-described embodiments and description thereof is omitted herein.

Figure 9A:
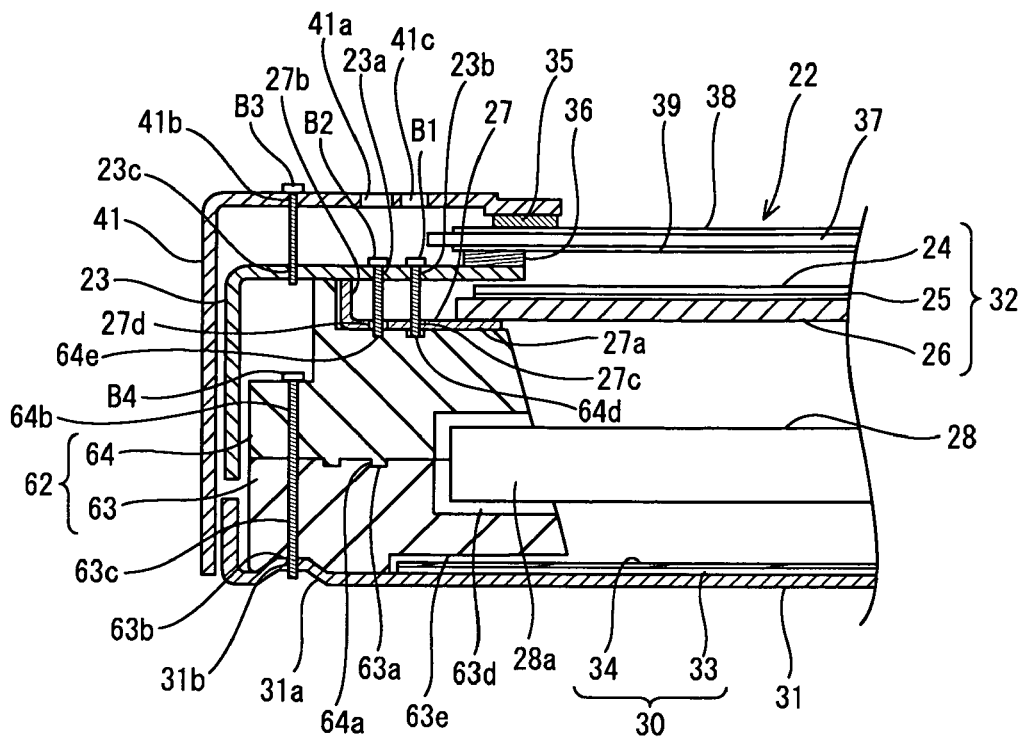
FIG. 9A is a sectional view showing main parts of a liquid crystal display of an eighth embodiment.
Figure 9B:
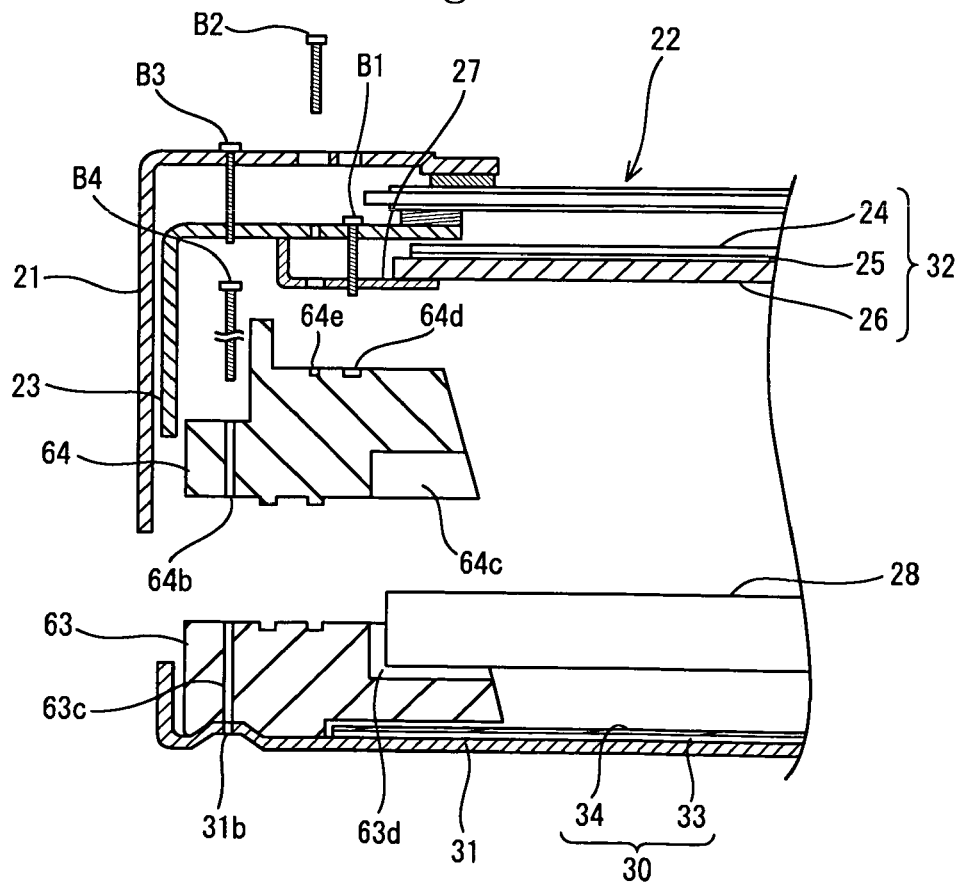
FIG. 9B is a sectional view showing the disassembled liquid crystal display of the eighth embodiment when a light source-replacing operation is performed.

FIGS. 9A and 9B show the eighth embodiment.

Similarly to the second embodiment, the bezel 41 has an opening 41c formed above the screw B1. The other constructions are similar to those of the above-described embodiments. Thus they are denoted by the same reference numerals as those of the above-described embodiments and description thereof is omitted herein.

Figure 10A:
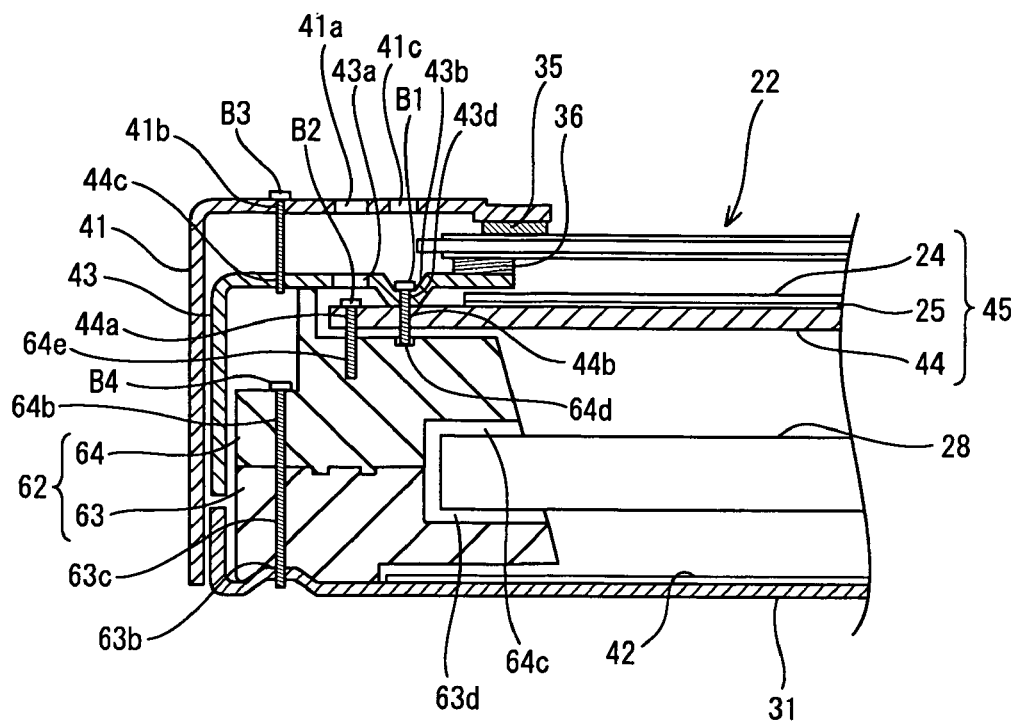
FIG. 10A is a sectional view showing main parts of a liquid crystal display of a ninth embodiment.
Figure 10B:
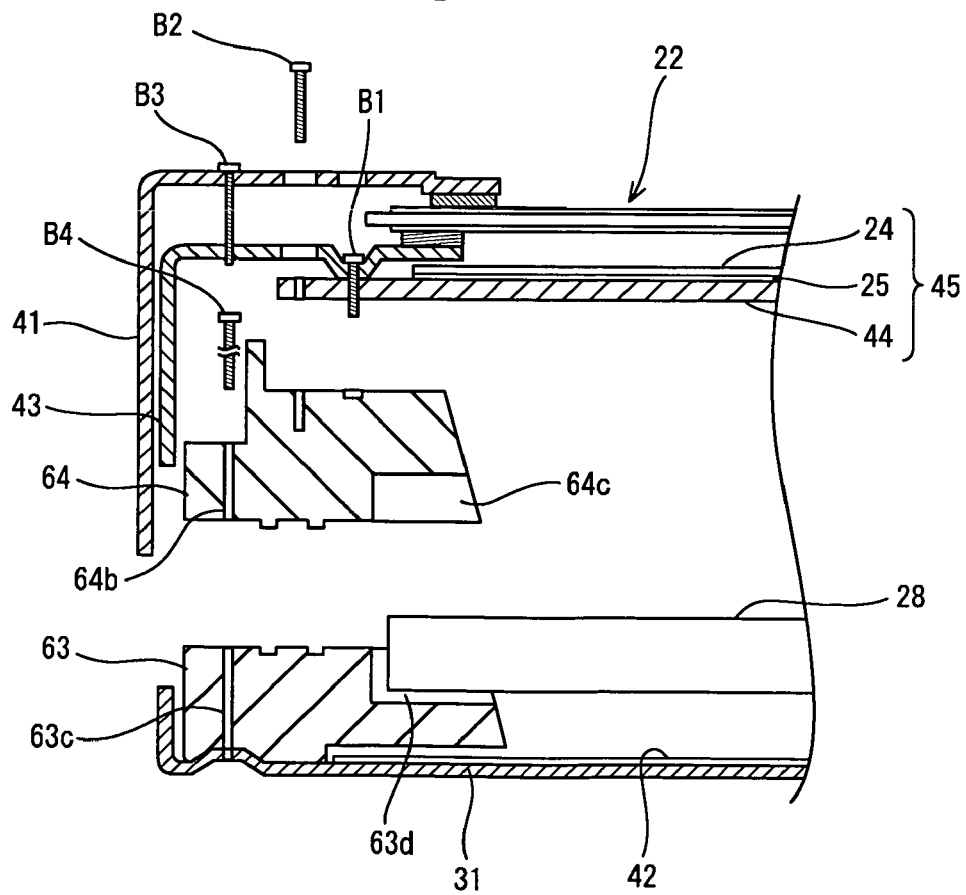
FIG. 10B is a sectional view showing the disassembled liquid crystal display of the ninth embodiment when a light source-replacing operation is performed.

FIGS. 10A and 10B show the ninth embodiment.

Unlike the eighth embodiment, in the ninth embodiment, the sheet-holding chassis 27 is not used. But instead, similarly to the ninth embodiment, one end of the diffusing plate 44 disposed lowermost in the optical sheet group 45 is extended sideways to form the screw holes 44a and 44b on the diffusing plate 44.

The front chassis 43 and the diffusing plate 44 disposed lowermost in the optical sheet group 45 are fixed to each other with the screw B1 threaded into the screw hole 43d and the screw hole 44b. Thereby in addition to the fixing of the diffusing plate 44 to the front chassis 43, the prism sheet 24 and the diffusing sheet 25 disposed above the diffusing plate 44 are supported.

Therefore in performing the operation of replacing the linear light source 28 by removing the screws B2 and B4, it is possible to prevent the prism sheet 24, the diffusing sheet 25, and the diffusing plate 44 of the optical sheet group 32 from being separated from each other and hence prevent dust from entering between the prism sheet 24 and the diffusing sheet 25 and between the diffusing sheet 25 and the diffusing plate 44. Further the operation of replacing the linear light source 28 can be accomplished at only the front side of the liquid crystal display. Thus a high operability can be obtained in the ninth embodiment. The other constructions are similar to those of the above-described embodiments. Thus they are denoted by the same reference numerals as those of the above-described embodiments and description thereof is omitted herein.

Figure 11A:
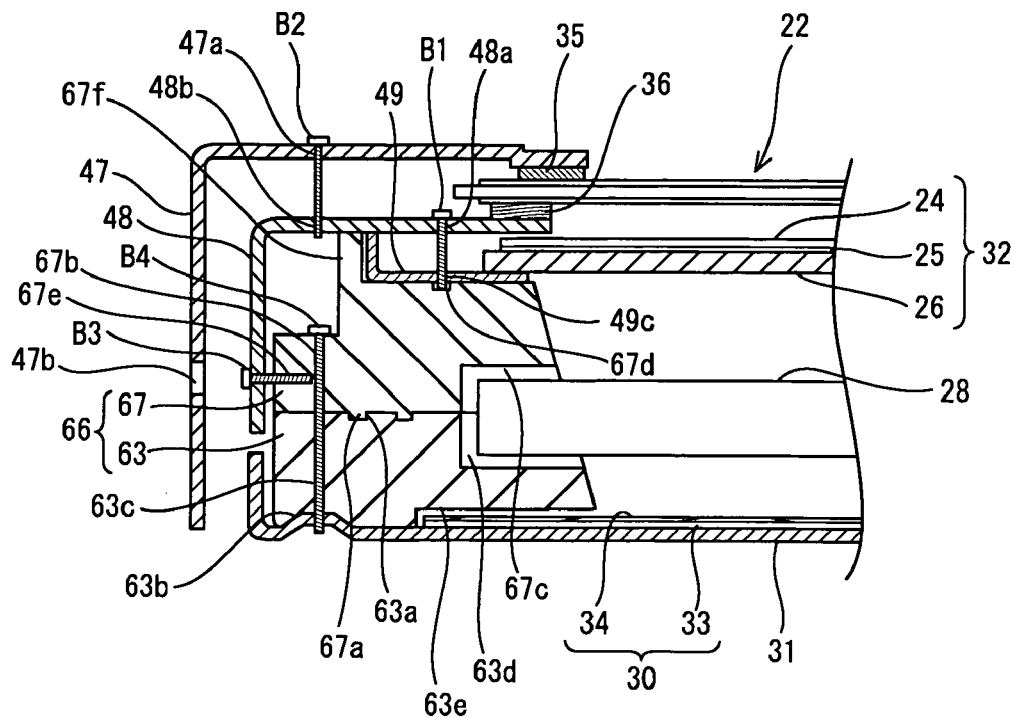
FIG. 11A is a sectional view showing main parts of a liquid crystal display of a tenth embodiment.
Figure 11B:
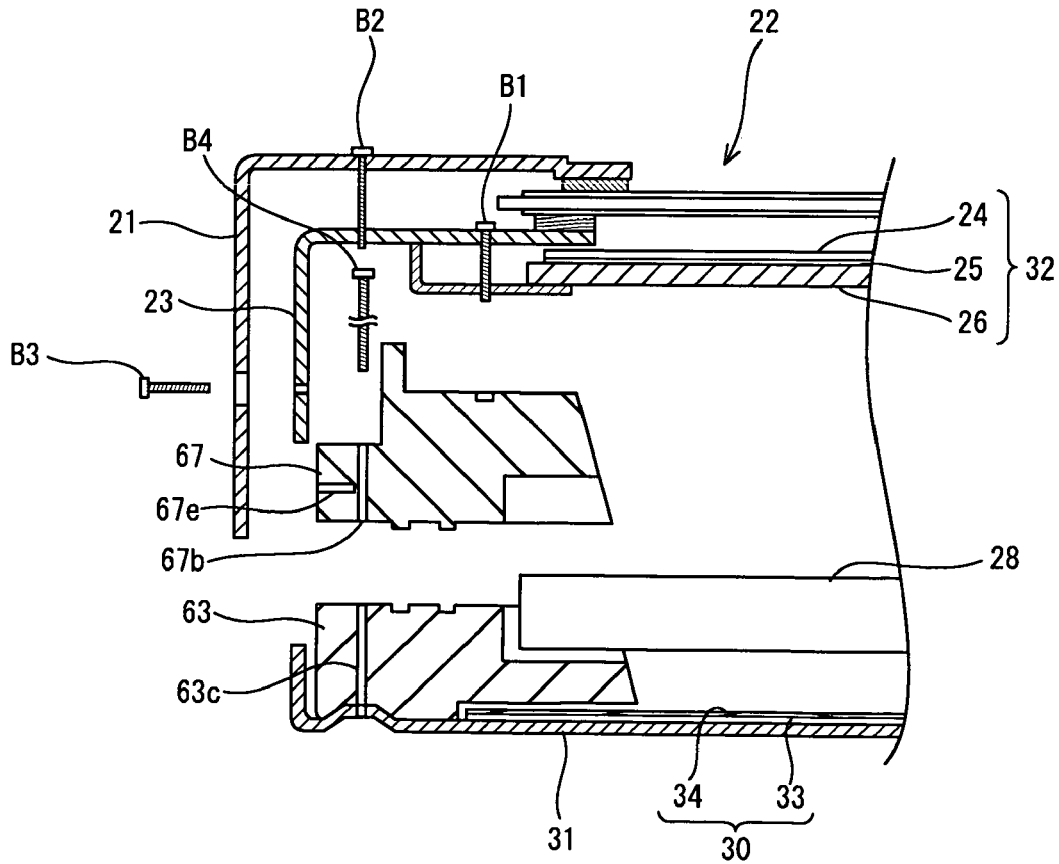
FIG. 11B is a sectional view showing the disassembled liquid crystal display of the tenth embodiment when a light source-replacing operation is performed.

FIGS. 11A and 11B show the tenth embodiment.

Unlike the ninth embodiment, in the tenth embodiment, a front chassis 48 and a front hold-down member 67 are fixed to each other with the screw B3 threaded into screw holes formed sideways.

The front hold-down member 67 of a light source-holding member 66 has a convex portion 67a, formed on its lower surface, which fits in the concave portion 63a of the rear receiving member 63. The lower end of the inner side surface of the front hold-down member 67 is cut out to form a cut-out portion 67c which matches the groove 63d of the rear receiving member 63. The front hold-down member 67 has a concave portion 67d formed on its upper surface by forming a gap between the circumference of the concave portion 67d and the screw B1 to prevent the screw B1 and the front hold-down member 67 from interfering with each other. The front hold-down member 67 has a projected portion 67f, formed on its upper surface, which contacts the lower surface of the front chassis 23. The front hold-down member 67 has a screw hole 67b formed in the range from a stepped horizontal outer upper surface thereof to the lower surface thereof. The front hold-down member 67 has a screw hole 67e, formed on its outer side surface, into which the screw B3 is threaded.

In performing the operation of replacing the linear light source 28, after the screw B3 is removed sideways, the screw B4 is removed at the front side to disassemble the front hold-down member 67 upward from the liquid crystal display. Thereby the linear light source 28 disposed on the groove 63d can be taken out to the front side of the liquid crystal display. The other constructions are similar to those of the above-described embodiments. Thus they are denoted by the same reference numerals as those of the above-described embodiments and description thereof is omitted herein.

Figure 12A:
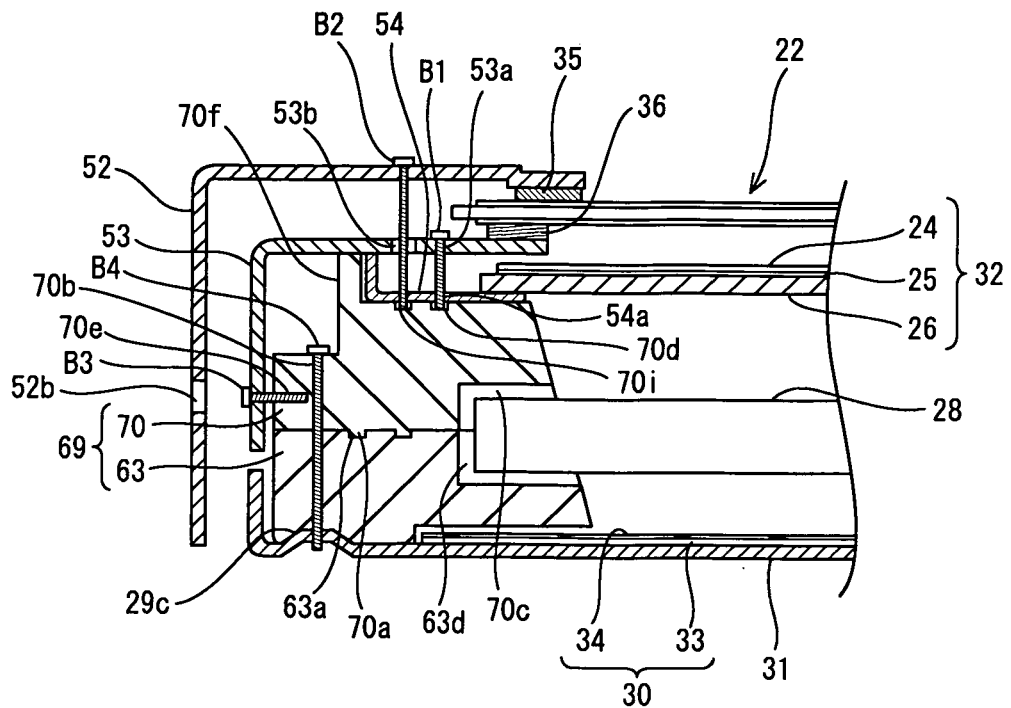
FIG. 12A is a sectional view showing main parts of a liquid crystal display of an eleventh embodiment.
Figure 12B:
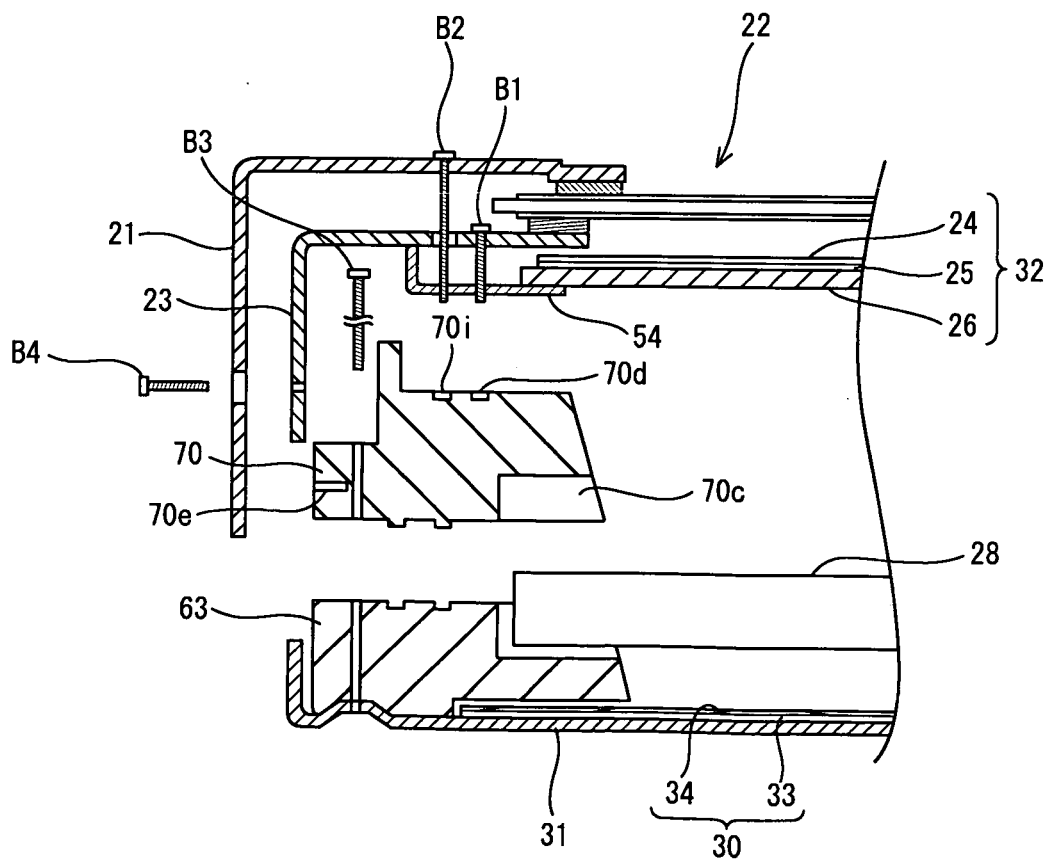
FIG. 12B is a sectional view showing the disassembled liquid crystal display of the eleventh embodiment when a light source-replacing operation is performed.

FIGS. 12A and 12B show the eleventh embodiment.

In the eleventh embodiment, the bezel 52 and the sheet-holding chassis 54 are fixed to each other with the screw B2 threaded downward into screw holes formed on the upper surfaces thereof.

The front hold-down member 70 of a light source-holding member 69 has a convex portion 70a, formed on its lower surface, which fits in the concave portion 63a of the rear receiving member 63. The lower end of the inner side surface of the front hold-down member 70 is cut out to form a cut-out portion 70c which matches the groove 63d of the rear receiving member 63. The front hold-down member 70 has concave portions 70d and 70i formed on its upper surface by forming a gap between the circumference of the concave portion 70d and the screw B1 and between the circumference of the concave portion 70i and the screw B2 to prevent the screws B1 and B2 from interfering with the front hold-down member 70. The front hold-down member 70 has a projected portion 70f formed on its upper surface, which contact the lower surface of the front chassis 23. The front hold-down member 70 has a screw hole 70b formed in the range from a stepped horizontal outer upper surface thereof to the lower surface thereof. The front hold-down member 70 has a screw hole 70e, formed on its outer side surface, into which the screw B3 is threaded. The other constructions are similar to those of the above-described embodiments. Thus they are denoted by the same reference numerals as those of the above-described embodiments and description thereof is omitted herein.

Figure 13A:
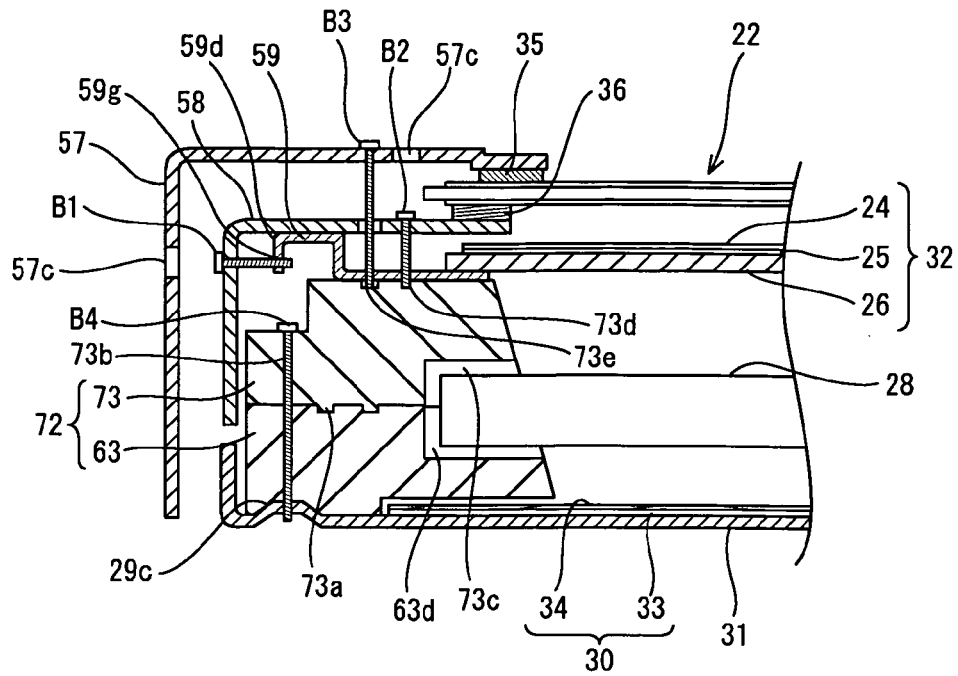
FIG. 13A is a sectional view showing main parts of a liquid crystal display of a twelfth embodiment.
Figure 13B:
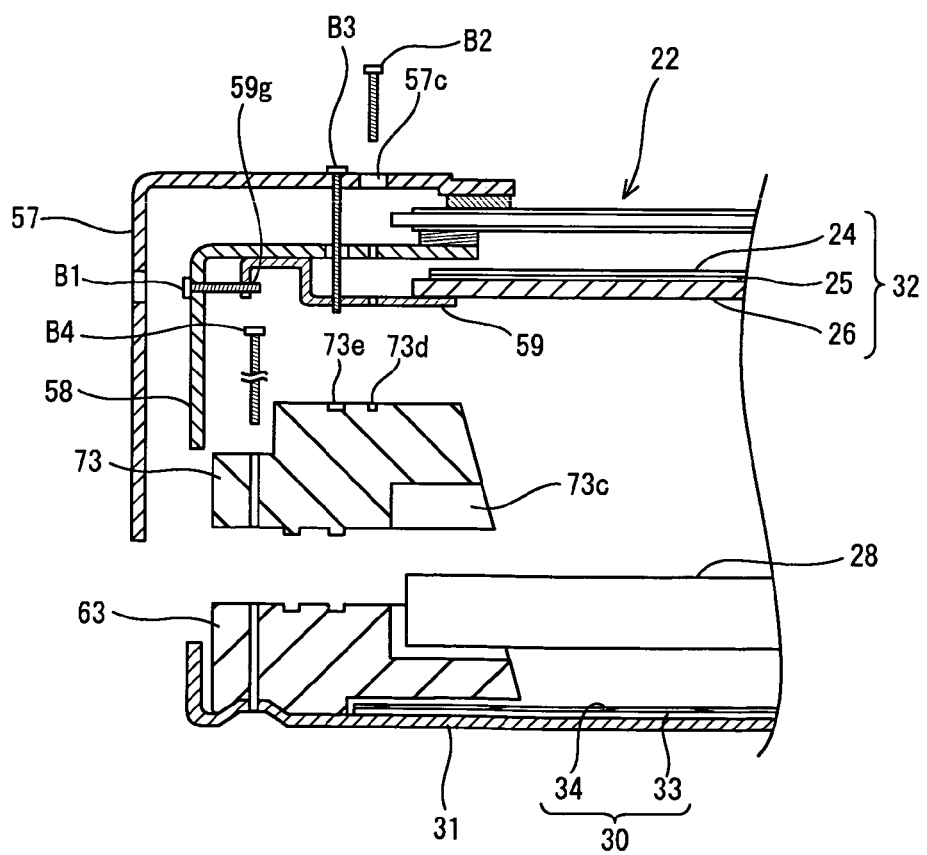
FIG. 13B is a sectional view showing the disassembled liquid crystal display of the twelfth embodiment when a light source-replacing operation is performed.

FIGS. 13A and 13B show the twelfth embodiment.

Unlike eleventh embodiment, the sheet-holding chassis 59 of the twelfth embodiment is similar to that of the sixth embodiment.

The front hold-down member 73 of a light source-holding member 72 has a convex portion 73a, formed on its lower surface, which fits in the rear receiving member 63. The lower end of the inner side surface of the front hold-down member 73 is cut out to form a cut-out portion 73c which matches the groove 63d of the rear receiving member 63. The front hold-down member 73 has a screw hole 73d into which the screw B2 is threaded. The front hold-down member 73 has a concave portion 73e formed on its upper surface by forming a gap between the circumference of the concave portion 73e and the screw B3 to prevent the screw B2 and the front hold-down member 73 from interfering with each other. The front hold-down member 73 has a screw hole 73b formed in the range from a stepped horizontal outer upper surface thereof to the lower surface thereof.

In performing the operation of replacing the linear light source 28, after the screw B2 is removed through the opening 57c of the bezel 57, the screw B4 is removed to perform a disassembling operation. Thereby the linear light source 28 can be replaced by performing the replacing operation at the front side of the liquid crystal display. The other constructions are similar to those of the above-described embodiments. Thus they are denoted by the same reference numerals as those of the above-described embodiments and description thereof is omitted herein.

Figure 14A:
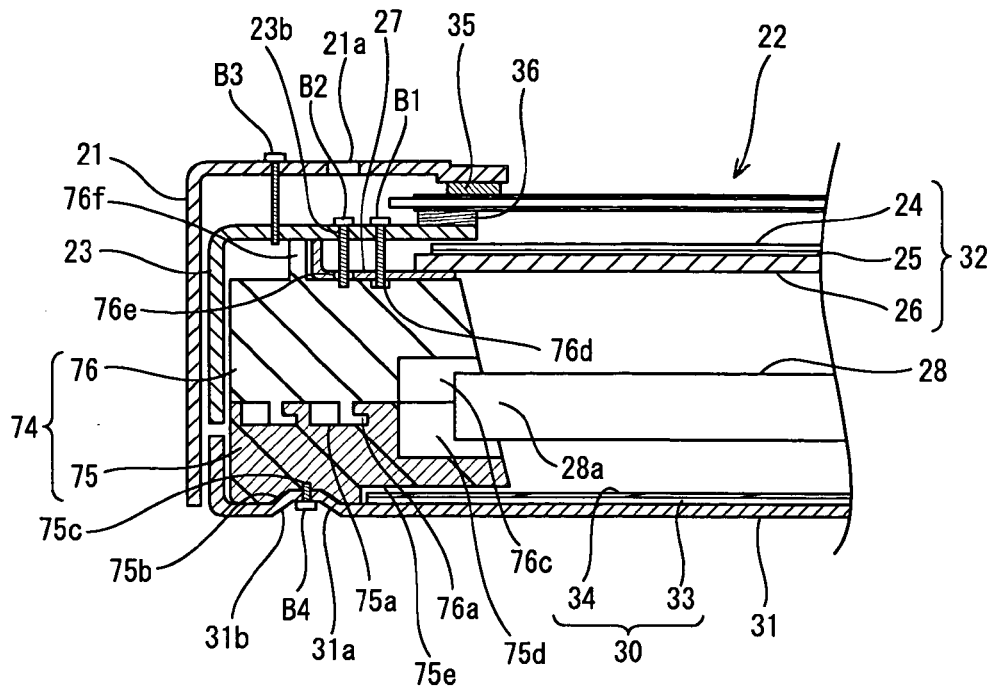
FIG. 14A is a sectional view showing main parts of a liquid crystal display of a thirteenth embodiment.
Figure 14B:
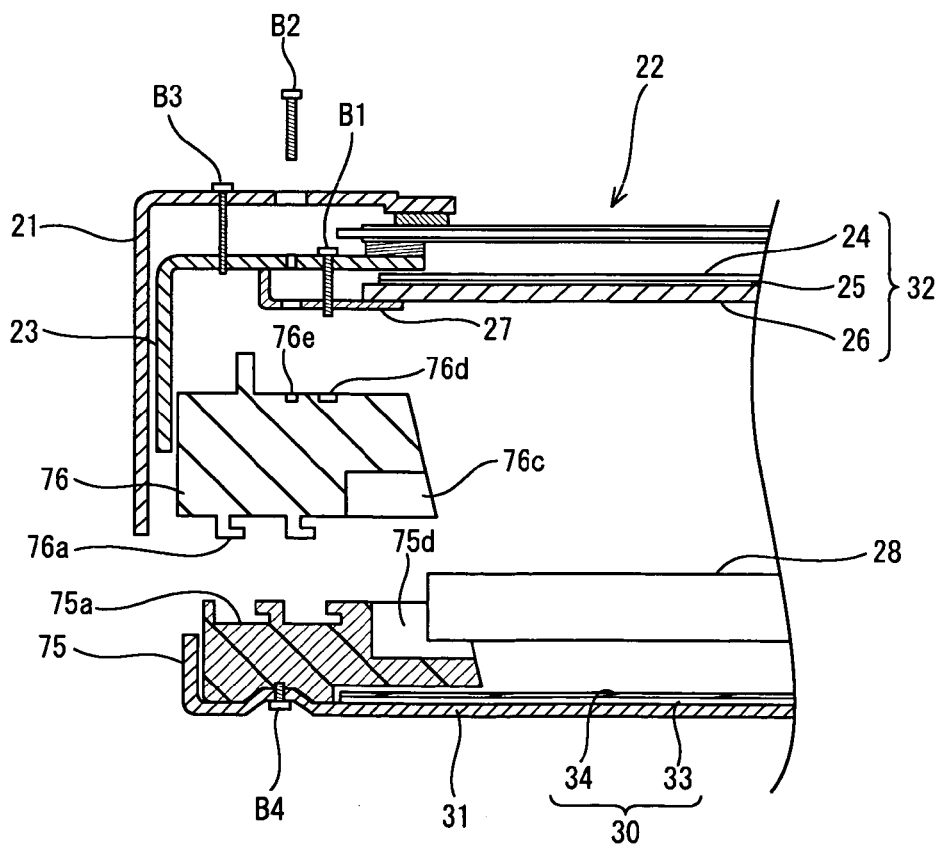
FIG. 14B is a sectional view showing the disassembled liquid crystal display of the thirteenth embodiment when a light source-replacing operation is performed.

FIGS. 14A and 14B show the thirteenth embodiment.

A light source-holding member 74 of the thirteenth embodiment has a rear receiving member 75 and a front hold-down member 76. The light source-holding member 74 is so constructed that the rear receiving member 75 and the front hold-down member 76 are removably fixed to each other.

The rear receiving member 75 has a concave to-be-locked portion 75a sectionally L-shaped, formed on its upper surface, which is locked to the front hold-down member 76. The upper end of the inner side surface of the rear receiving member 75 is cut out to form a groove 75d on which an end portion 28a of the linear light source 28 is mounted. The lower end of the inner side surface of the rear receiving member 75 is cut out to form a cut-out portion 75e for holding down the reflecting composite member 30. The rear receiving member 75 has a concave portion 75b, formed on its lower surface, for placing the rear receiving member 75 in position. A screw hole 75c is formed in penetration through the concave portion 75b.

The front hold-down member 76 has a locking portion 76a formed on its lower surface. The locking portion 76a is projected in the shape of L in section and slidably locked to the to-be-locked portion 75a of the rear receiving member 75. The lower end of its inner side surface of the front hold-down member 76 is cut out to form a cut-out portion 76c which matches the groove 75d. The front hold-down member 76 has a concave portion 76d formed on its upper surface by forming a gap between the circumference of the concave portion 76d and the screw B1 to prevent the screw B1 and the front hold-down member 76 from interfering with each other. The front hold-down member 76 has a screw hole 76e, formed on its upper surface, into which the screw B2 is threaded and has a projected portion 76f, formed on its upper surface, which contacts the lower surface of the front chassis 23.

The light source-holding member 74 and the linear light source 28 are fixed to each other by slidably fitting the locking portion 76a of the front hold-down member 76 into the concave portion 75a of the rear receiving member 75 with the end 28a of the linear light source 28 mounted on the groove 75d of the rear receiving member 75 and by locking both to each other. Thereby the linear light source 28 is held by the light source-holding member 74. Thus the assembling operation can be performed with high handleability.

The rear receiving member 75 is fixed to the back chassis 31 with the screw B4 threaded upward into the screw holes 31b and 75c, with the concave portion 75b of the rear receiving member 75 positioned at the convex portion 31a of the back chassis 31. The front chassis 23 and the front hold-down member 76 are fixed to each other with the screw B2 penetrated through the through-hole 27d of the sheet-holding chassis 27 and threaded downward into the screw holes 23b and 76e.

In the above-described construction, to unlock the front hold-down member 76 from the to-be-locked portion 75a, after the screw B2 is removed, the front hold-down member 76 is moved upward while the front hold-down member 76 is being slid. Thereby the linear light source 28 disposed on the groove 75d can be taken out from the liquid crystal display and replaced. That is, since the front hold-down member 76 is locked to the rear receiving member 75, it is possible to perform a fixing operation and a disassembling operation by one touch and hence improve the operability.

The operation of replacing the linear light source 28 can be accomplished at only the front side of the liquid crystal display. Alternatively, it is possible to perform the light source-replacing operation at the rear side of the liquid crystal display by unlocking the rear receiving member 75 after removing the screw B4. That is, in dependence on an operation situation, the construction of the 13th embodiment allows an operator to perform the light source-replacing operation by selecting a direction in which the light source-replacing operation can be made easily. Thus the flexibility of the light source-replacing operation can be improved. The other constructions are similar to those of the above-described embodiments. Thus they are denoted by the same reference numerals as those of the above-described embodiments and description thereof is omitted herein.

Figure 15A:
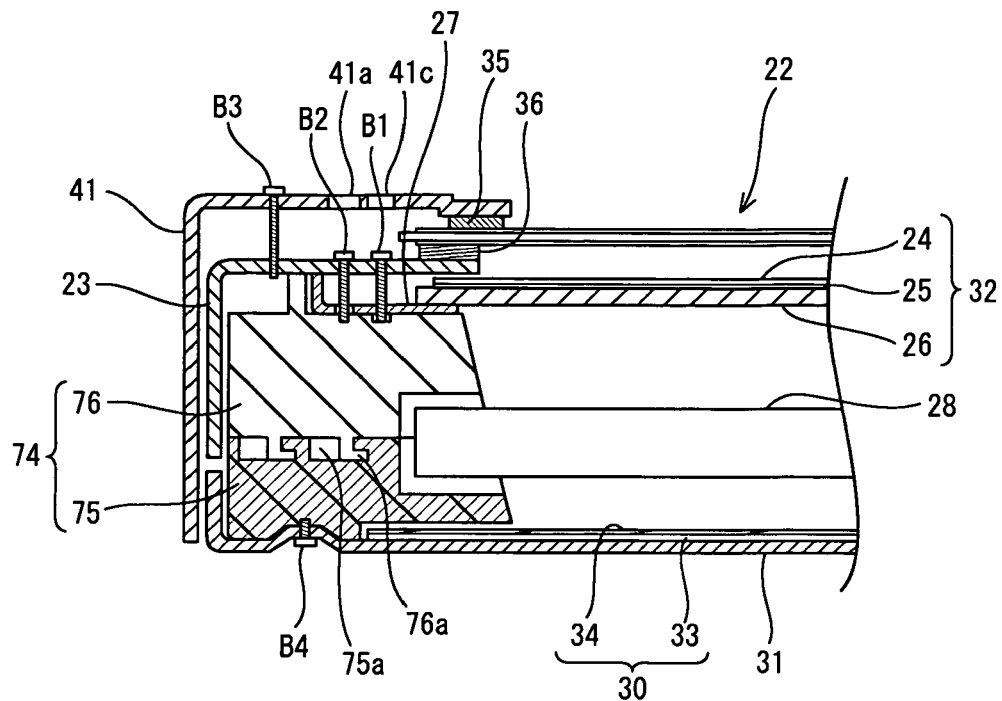
FIG. 15A is a sectional view showing main parts of a liquid crystal display of a fourteenth embodiment.
Figure 15B:
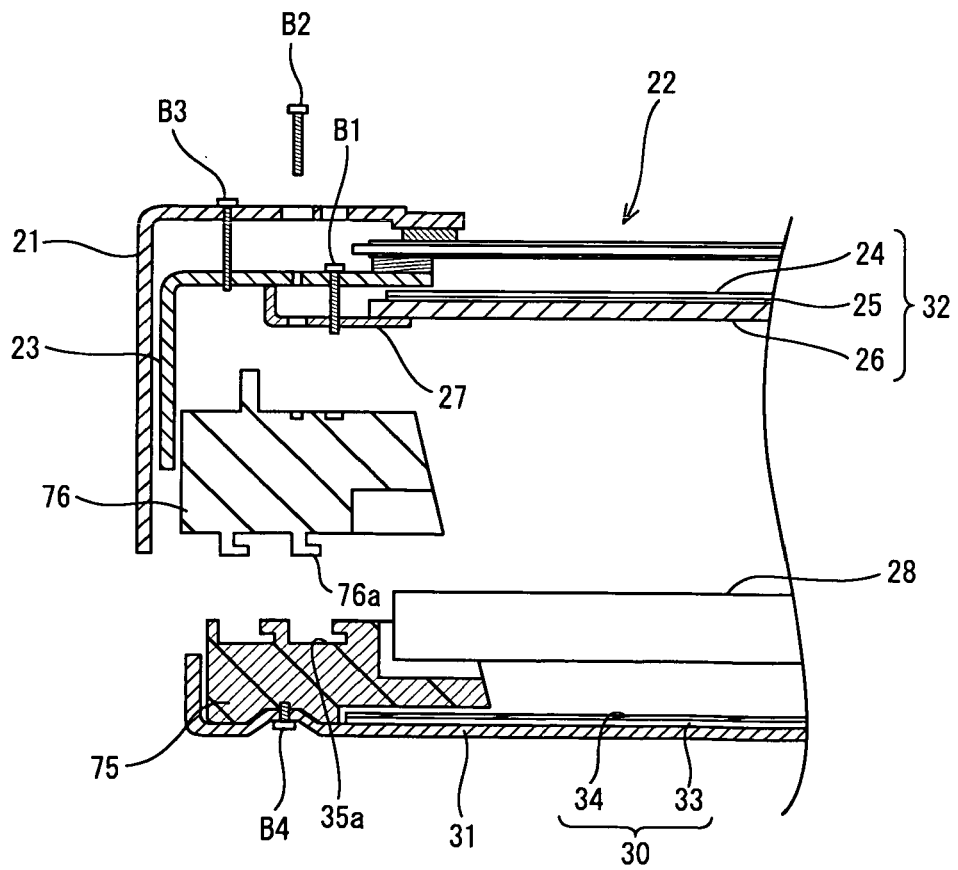
FIG. 15B is a sectional view showing the disassembled liquid crystal display of the fourteenth embodiment when a light source-replacing operation is performed.

FIGS. 15A and 15B show the fourteenth embodiment.

Unlike the thirteenth embodiment, in the fourteenth embodiment, similarly to the second embodiment, the bezel 41 has the screw insertion opening 41c formed above the screw B1. The other constructions are similar to those of the above-described embodiments. Thus they are denoted by the same reference numerals as those of the above-described embodiments and description thereof is omitted herein.

Figure 16A:
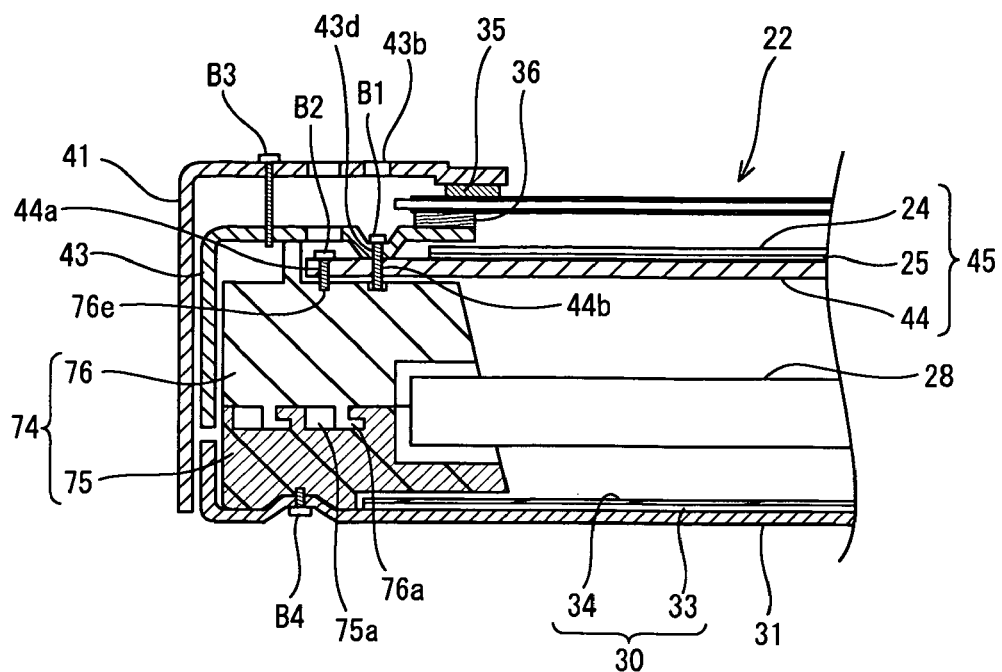
FIG. 16A is a sectional view showing main parts of a liquid crystal display of a fifteenth embodiment.
Figure 16B:
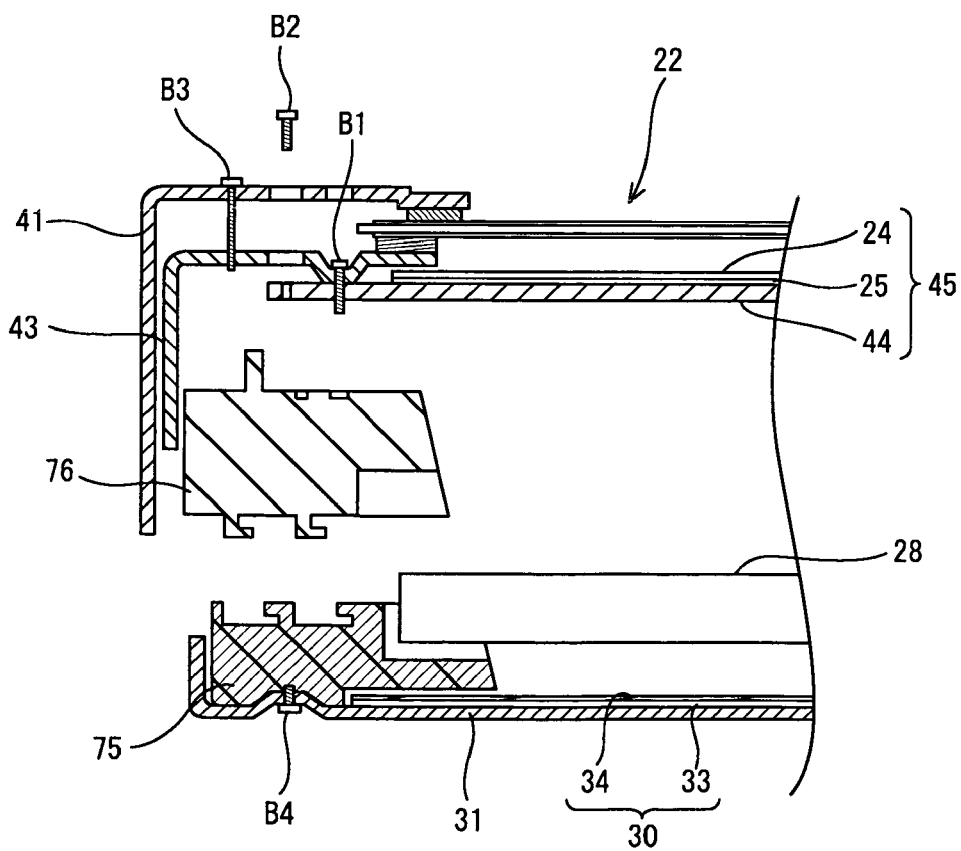
FIG. 16B is a sectional view showing the disassembled liquid crystal display of the fifteenth embodiment when a light source-replacing operation is performed.

FIGS. 16A and 16B show the fifteenth embodiment.

Unlike the fourteenth embodiment, in the fifteenth embodiment, the sheet-holding chassis 27 is not used. But instead similarly to the ninth embodiment, one end of the diffusing plate 44 disposed lowermost in the optical sheet group 45 is extended sideways to form the screw holes 44a and 44b on the diffusing plate 44, similarly to the third and ninth embodiments.

In the above-described construction, to unlock the front hold-down member 76 from the to-be-locked portion 75a, after the screw B2 is removed, the front hold-down member 76 is moved upward while the front hold-down member 76 is being slid. Thereby the linear light source 28 can be replaced. The screw B1 maintains the fixed state of the diffusing plate 44, the prism sheet 24 and the diffusing sheet 25 disposed above the diffusing plate 44 are supported. Thus it is possible to prevent the sheets 24, 25, and 44 of the optical sheet group 45 from being separated from each other and dust from entering between the sheets 24 and 25 and between the sheets 25 and 44. The other constructions are similar to those of the above-described embodiments. Thus they are denoted by the same reference numerals as those of the above-described embodiments and description thereof is omitted herein.

Figure 17A:
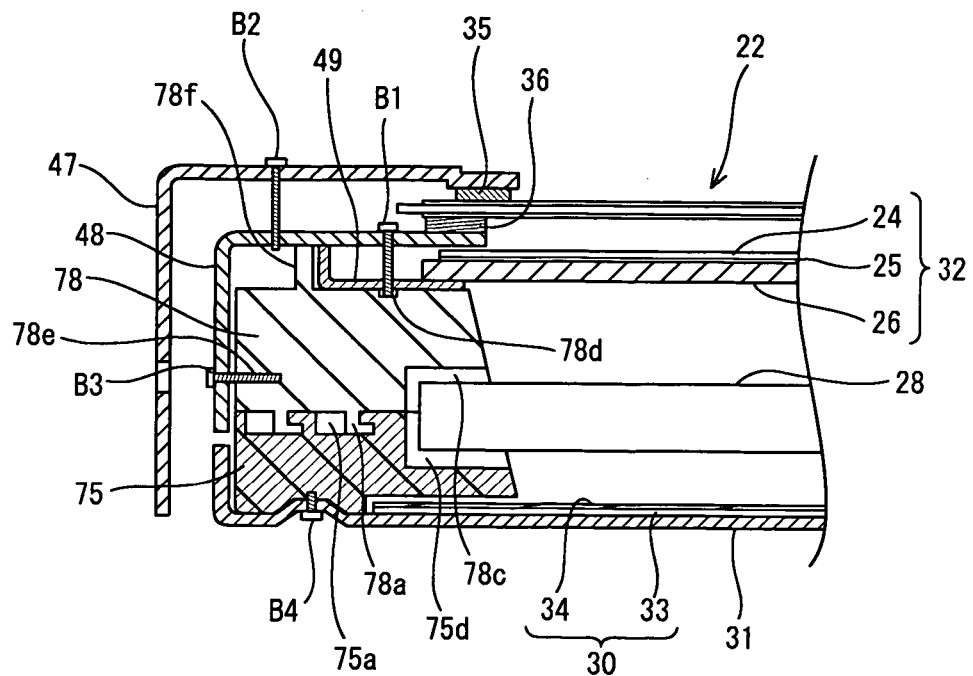
FIG. 17A is a sectional view showing main parts of a liquid crystal display of a sixteenth embodiment.
Figure 17B:
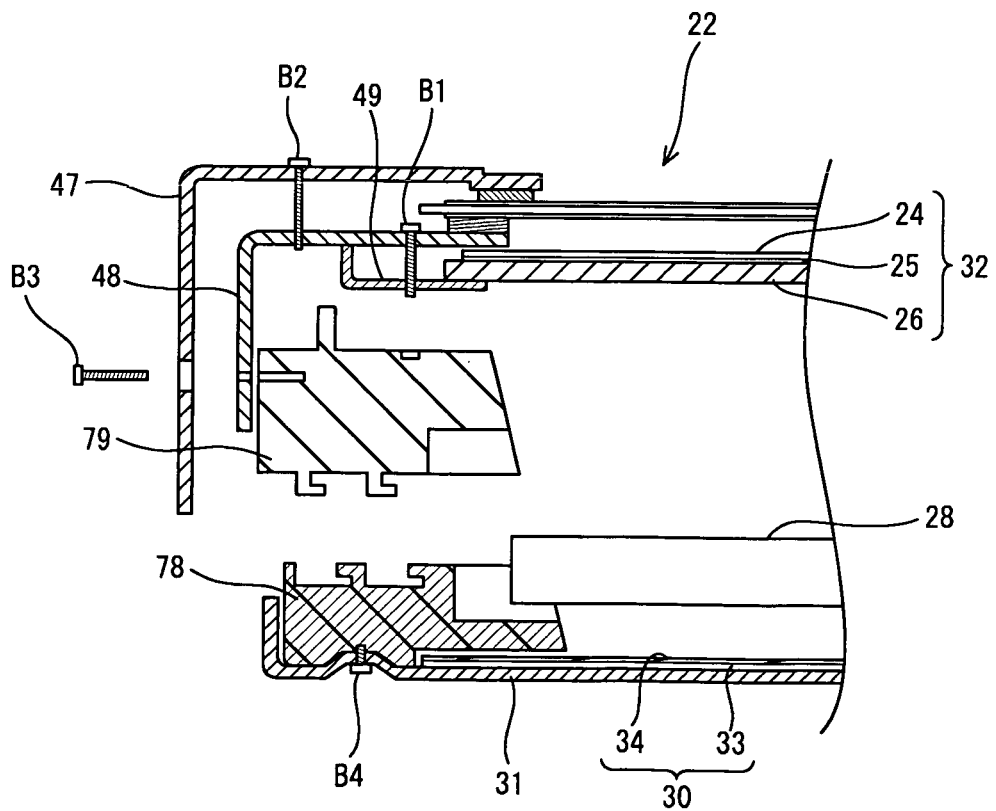
FIG. 17B is a sectional view showing the disassembled liquid crystal display of the sixteenth embodiment when a light source-replacing operation is performed.

FIGS. 17A and 17B show the sixteenth embodiment.

Unlike the thirteenth embodiment, in the sixteenth embodiment, a front chassis 48 and a front hold-down member 78 are fixed to each other with the screw B3 threaded into screw holes formed sideways.

The front hold-down member 78 has a locking portion 78a formed on its lower surface. The locking portion 78a is projected in the shape of L in section and slidably locked to the to-be-locked portion 75a of the rear receiving member 75. The lower end of the inner side surface of the front hold-down member 78 is cut out to form a cut-out portion 78c which matches the groove 75d. The front hold-down member 78 has a concave portion 78d formed on its upper surface by forming a gap between the circumference of the concave portion 78d and the screw B1 to prevent the screw B1 and the front hold-down member 78 from interfering with each other. The front hold-down member 78 has a projected portion 78f, formed on its upper surface, which contacts the lower surface of the front chassis 23. The front hold-down member 78 has a screw hole 78e, formed on its outer side surface, into which the screw B2 is threaded.

In the above-described construction, in performing the operation of replacing the linear light source 28, after the screw B3 is removed, the front hold-down member 78 is slid to unlock the front hold-down member 76 from the to-be-locked portion 75a. Then the front hold-down member 76 is moved upward. Thereby the linear light source 28 disposed on the groove 75d can be taken out from the liquid crystal display and replaced. The other constructions are similar to those of the above-described embodiments. Thus they are denoted by the same reference numerals as those of the above-described embodiments and description thereof is omitted herein.

Figure 18A:
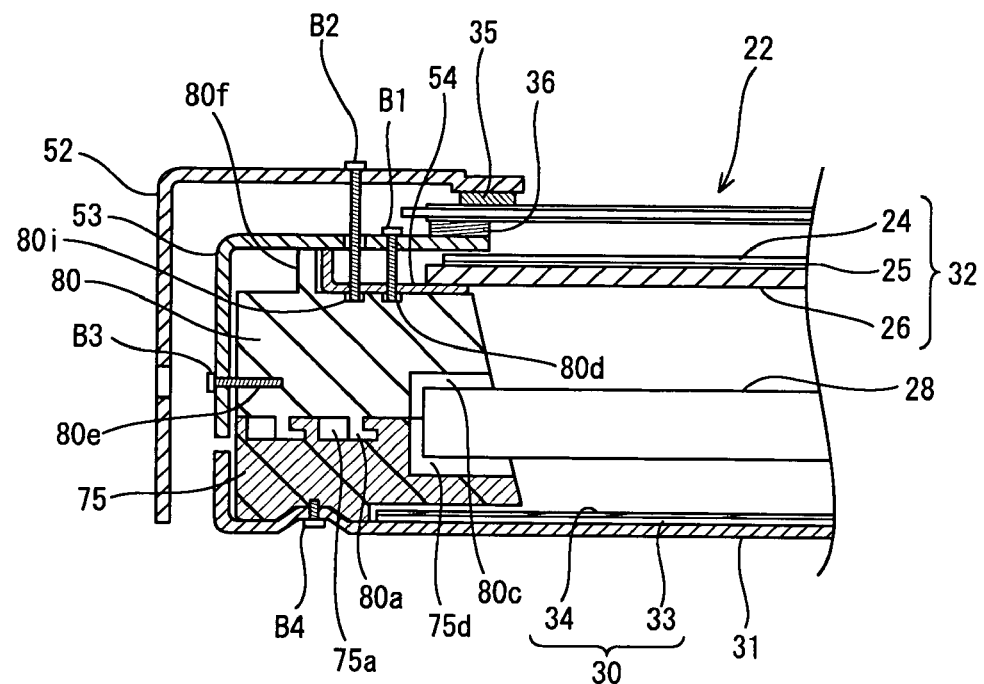
FIG. 18A is a sectional view showing main parts of a liquid crystal display of a seventeenth embodiment.
Figure 18B:
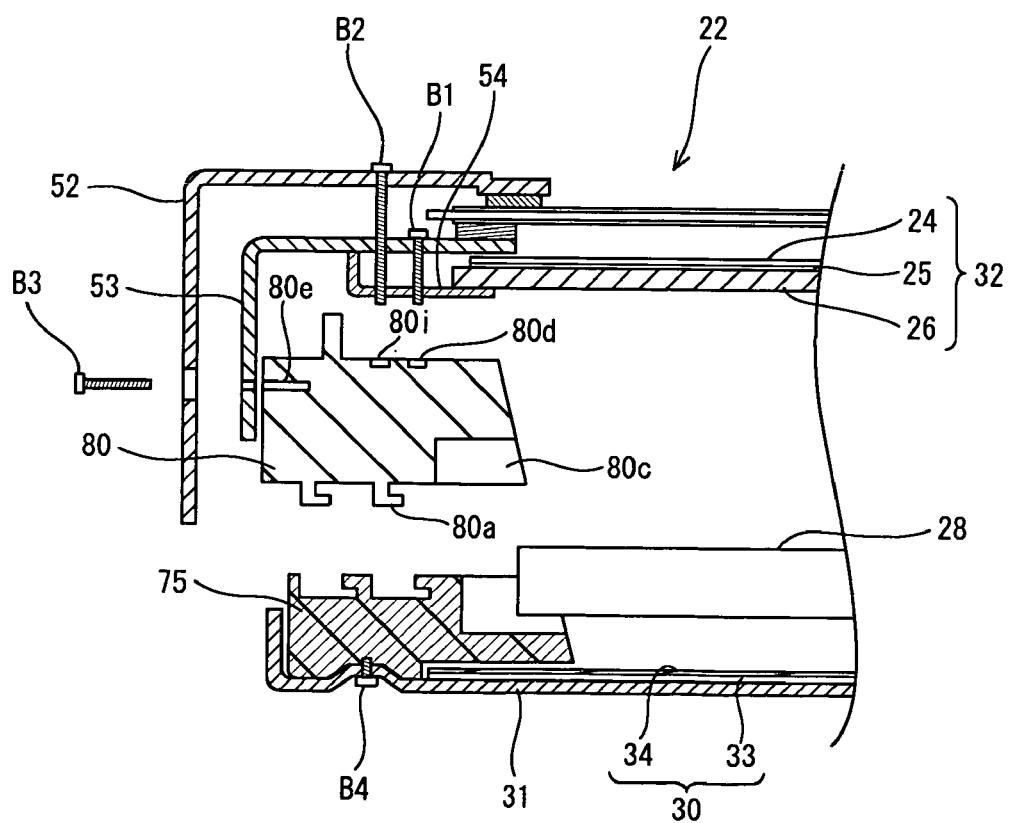
FIG. 18B is a sectional view showing the disassembled liquid crystal display of the seventeenth embodiment when a light source-replacing operation is performed.

FIGS. 18A and 18B show the seventeenth embodiment.

Unlike the sixteenth embodiment, in the seventeenth embodiment, similarly to the eleventh embodiment, the bezel 52 and the sheet-holding chassis 54 are fixed to each other with the screw B2 threaded downward into screw holes formed on the upper surfaces thereof.

The front hold-down member 80 has a locking portion 80a formed on its lower surface. The locking portion 80a is projected in the shape of L in section and slidably locked to the to-be-locked portion 75a of the rear receiving member 75. The lower end of the inner side surface of the front hold-down member 80 is cut out to form a cut-out portion 80c which matches the groove 75d. The front hold-down member 80 has concave portions 80d and 80i formed on its upper surface by forming a gap between the circumference of the concave portion 80d and the screw B1 and between the circumference of the concave portion 80i and the screw B2 to prevent the screws B1 and B2 from interfering with the front hold-down member 80. The front hold-down member 80 has a projected portion 80f, formed on its upper surface, which contacts the lower surface of the front chassis 53. The front hold-down member 80 has a screw hole 80e, formed on its outer side surface, into which the screw B2 is threaded. The other constructions are similar to those of the above-described embodiments. Thus they are denoted by the same reference numerals as those of the above-described embodiments and description thereof is omitted herein.

Figure 19A:
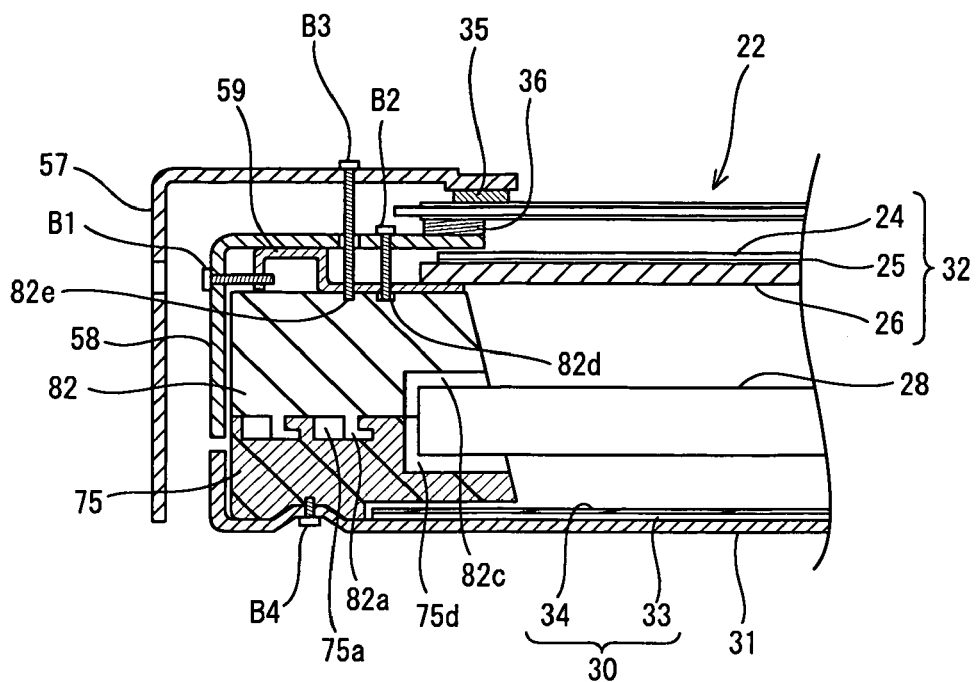
FIG. 19A is a sectional view showing main parts of a liquid crystal display of an eighteenth embodiment.
Figure 19B:
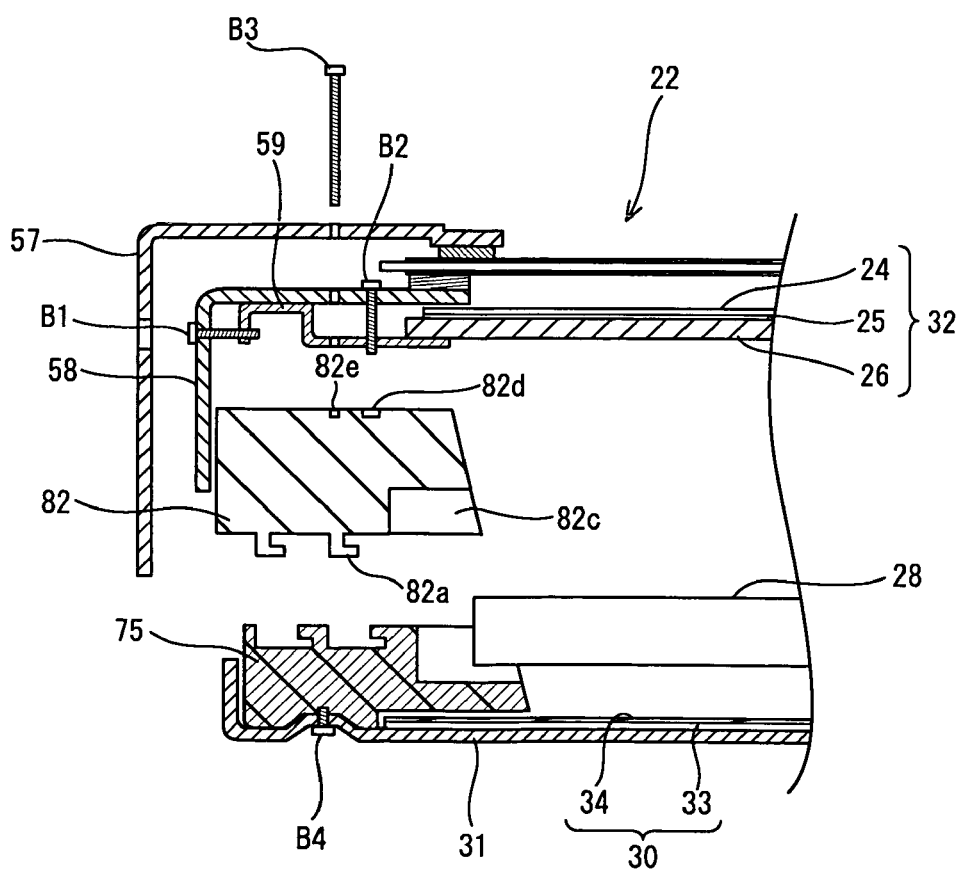
FIG. 19B is a sectional view showing the disassembled liquid crystal display of the eighteenth embodiment when a light source-replacing operation is performed.

FIGS. 19A and 19B show the eighteenth embodiment.

Unlike the seventeenth embodiment, in the eighteenth embodiment, the sheet-holding chassis 59 similar to that of the sixth embodiment and the twelfth embodiment is used.

The front hold-down member 82 has a locking portion 82a formed on its lower surface. The locking portion 82a is projected in the shape of L in section and slidably locked to the to-be-locked portion 75a of the rear receiving member 75. The lower end of the inner side surface of the front hold-down member 82 is cut out to form a cut-out portion 82c which matches the groove 75d. The front hold-down member 82 has a concave portion 82d formed on its upper surface by forming a gap between the circumference of the concave portion 82d and the screw B2 to prevent the screw B2 and the front hold-down member 82 from interfering with each other. The front hold-down member 82 has a screw hole 82e, formed on its upper surface, into which the screw B3 is threaded.

In the operation of replacing the linear light source 28, after the screw B3 is replaced, the front hold-down member 28 is slid to unlock the front hold-down member 28 from the rear receiving member 75 and take it out upward. The other constructions are similar to those of the above-described embodiments. Thus they are denoted by the same reference numerals as those of the above-described embodiments and description thereof is omitted herein.

Figure 20A:
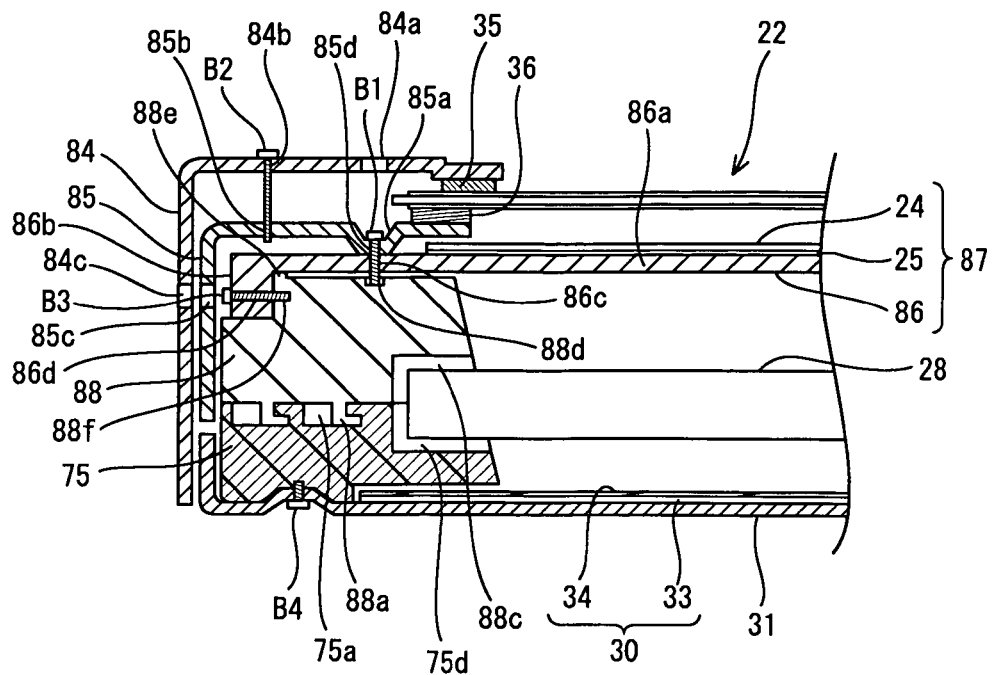
FIG. 20A is a sectional view showing main parts of a liquid crystal display of a nineteenth embodiment.
Figure 20B:
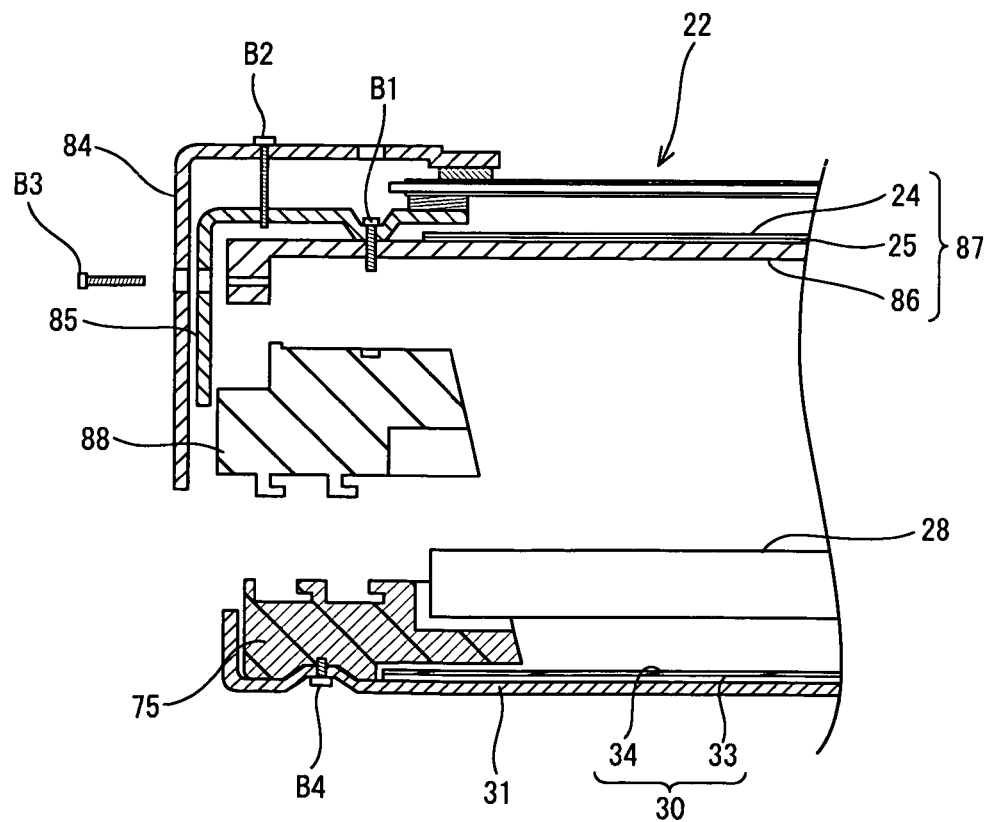
FIG. 20B is a sectional view showing the disassembled liquid crystal display of the nineteenth embodiment when a light source-replacing operation is performed.

FIGS. 20A and 20B show the nineteenth embodiment.

In the nineteenth embodiment, the sheet-holding chassis is not used. But instead one end of the diffusing plate 86 disposed lowermost in the optical sheet group 87 is extended sideways to fix the diffusing plate 86 and the front chassis 85 to each other. In addition, a vertical portion 86b formed by bending the end of the diffusing plate 86 downward is fixed to a front hold-down member 88 with the screw B3 threaded into screw holes formed sideways.

The bezel 84 has a screw hole 84b, formed on the upper surface thereof, into which the screw B2 is threaded and an opening 84a, formed on the side surface thereof, into which a screw is threaded. In addition, a screw insertion opening 84c is formed on the side surface of the bezel 84.

The front chassis 85 has a concave portion 85a formed at a position of its upper surface where the screw B1 is inserted. A screw hole 85d is formed in penetration through the concave portion 85a. A screw hole 85b is formed at a position corresponding to the position of the screw B2. The front chassis 85 has an opening 85c, formed on the side surface thereof, into which the screw B3 is inserted.

The diffusing plate 86 disposed lowermost in the optical sheet group 87 has a vertical portion 86b bent downward at an end of a flat portion 86a thereof, a screw hole 86c, formed at a position of the flat portion 86a, into which the screw B1 is threaded, and a screw hole 86d, formed on the vertical portion 86b thereof, into which the screw B3 is threaded.

The front hold-down member 88 has a locking portion 88a formed on its lower surface. The locking portion 88a is projected in the shape of L in section and slidably locked to the to-be-locked portion 75a of the rear receiving member 75. The lower end of the inner side surface of the front hold-down member 88 is cut out to form a cut-out portion 88c which matches the groove 75d. The front hold-down member 88 has a concave portion 88d formed on its upper surface by forming a gap between the circumference of the concave portion 88d and the screw B1 to prevent the screw B1 and the front hold-down member 88 from interfering with each other. The front hold-down member 88 has a projected portion 88e on its upper surface. The front hold-down member 88 has a screw hole 88*f* formed on a side surface formed by stepping the upper surface thereof outward.

The diffusing plate 86 and the front hold-down member 88 are fixed to each other with the screw B3 threaded sideways into screw holes 86*d* and 88*f*. The front chassis 85 and the diffusing plate 86 are fixed to each other with the screw B1 threaded into screw holes 85*d* and 86*c*. Thereby in addition to the fixing of the diffusing plate 86 to the front chassis 43, the prism sheet 24 and the diffusing sheet 25 disposed above the diffusing plate 44 are supported.

In the above-described construction, after the screw B3 is removed sideways, the front hold-down member 88 and the rear receiving member 75 are unlocked from each other. Thereby the linear light source 28 can be replaced without disassembling the optical sheet group 87. The other constructions are similar to those of the above-described embodiments. Thus they are denoted by the same reference numerals as those of the above-described embodiments and description thereof is omitted herein.

Figure 21A:
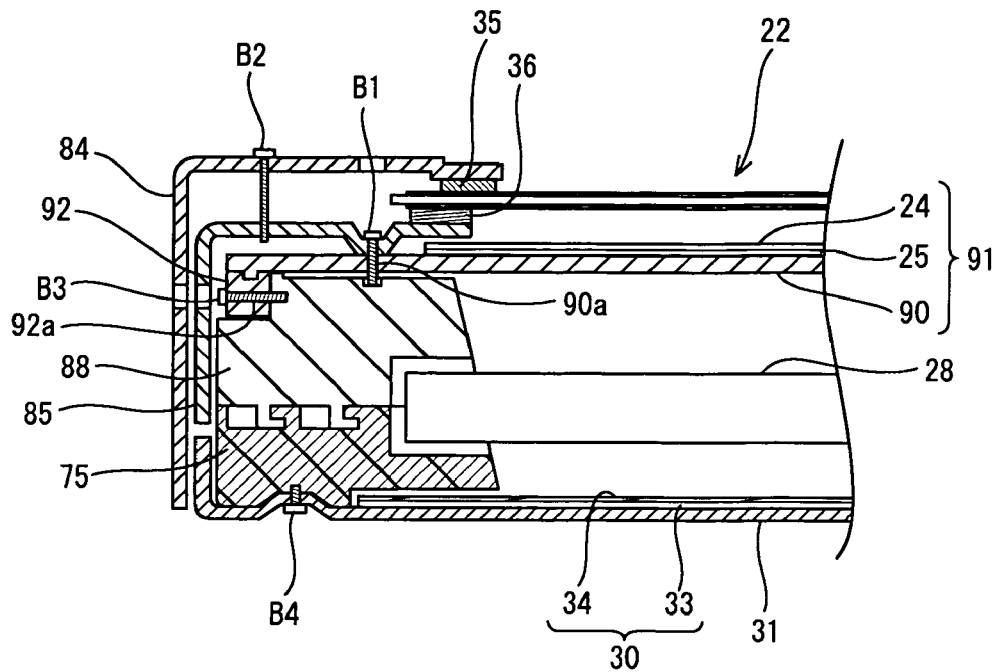
FIG. 21A is a sectional view showing main parts of a liquid crystal display of a 20th embodiment.
Figure 21B:
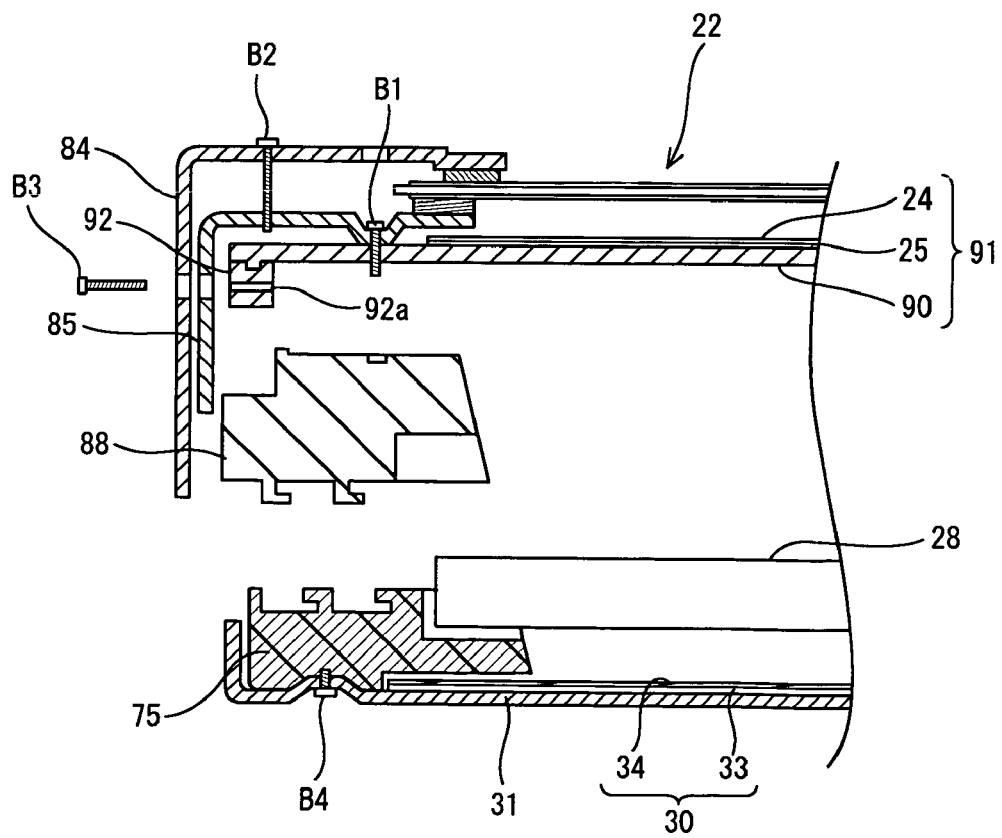
FIG. 21B is a sectional view showing the disassembled liquid crystal display of the 20th embodiment when a light source-replacing operation is performed.

FIGS. 21A and 21B show the twentieth embodiment.

Unlike the nineteenth embodiment, in the twentieth embodiment, a to-be-mounted portion 92 separate from the diffusing plate 90 is projectingly and downwardly mounted at an end of a diffusing plate 90 disposed lowermost in an optical sheet group 91.

The diffusing plate 90 has a screw hole 90*a*, formed at a required position, into which the screw B1 is threaded. The to-be-mounted portion 92 is fixed to the diffusing plate 90 at its one end by engagement, adhesion or weld. A screw hole 92*a* is formed sideways in penetration through the to-be-mounted portion 92. The other constructions are similar to those of the above-described embodiments. Thus they are denoted by the same reference numerals as those of the above-described embodiments and description thereof is omitted herein.

Figure 22A:
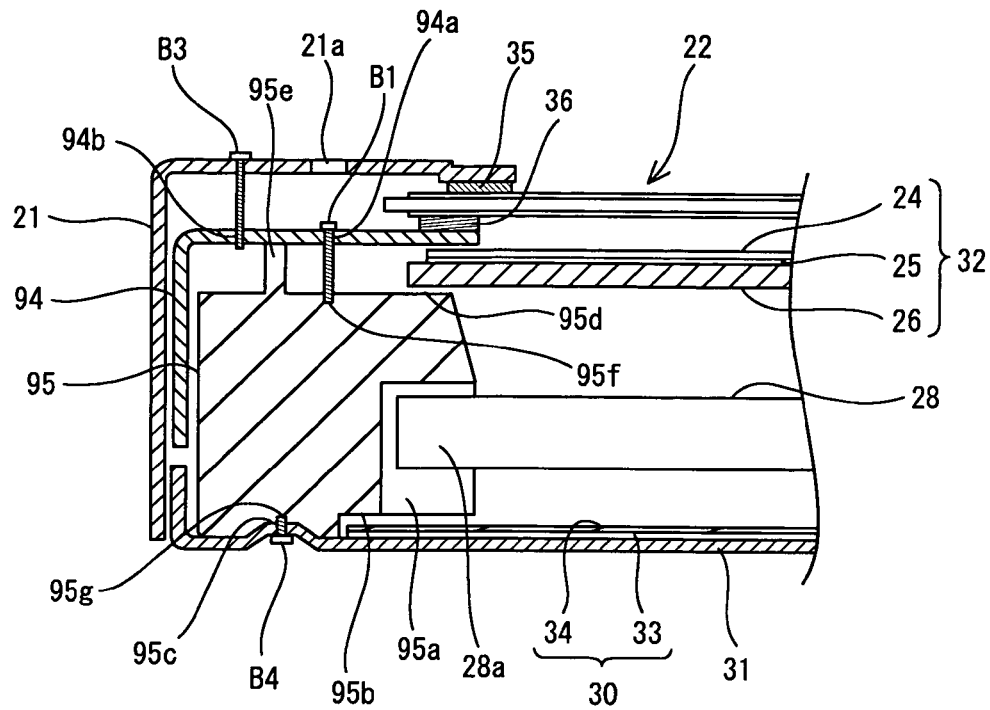
FIG. 22A is a sectional view showing main parts of a liquid crystal display of a 21st embodiment.
Figure 22B:
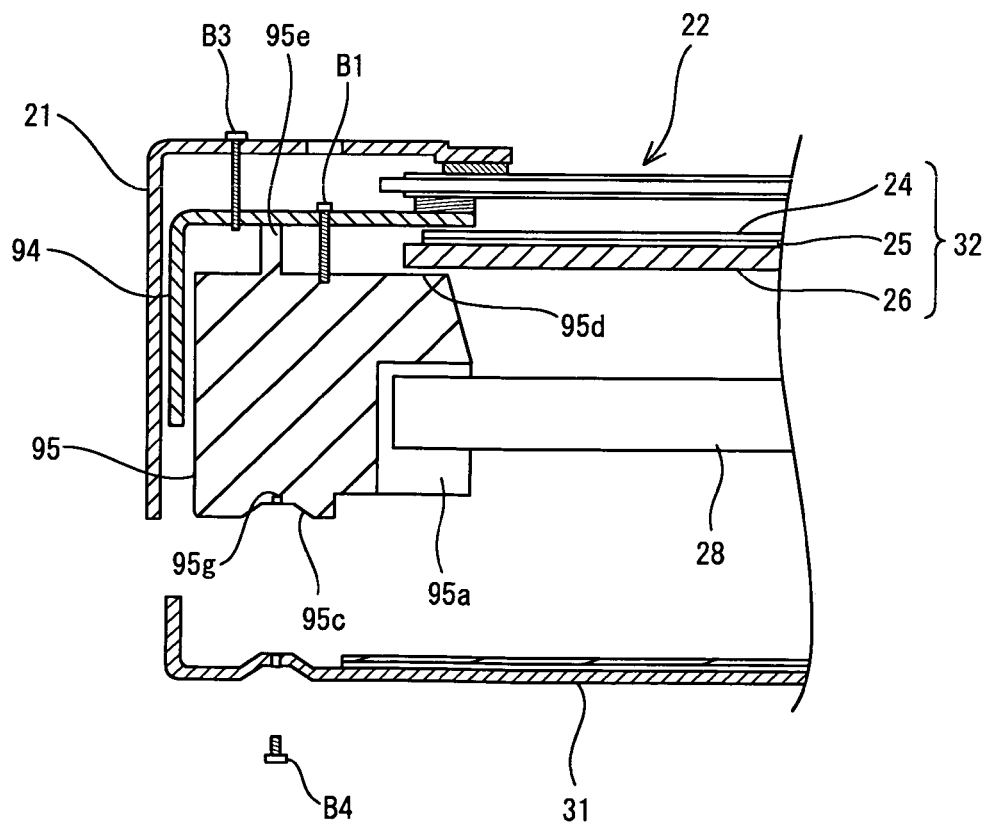
FIG. 22B is a sectional view showing the disassembled liquid crystal display of the 21st embodiment when a light source-replacing operation is performed.

FIGS. 22A and 22B show the 21st embodiment.

In the 21st embodiment, the optical sheet group 32 is supported by the upper surface 95*d* of the light source-holding member 95. Further the light source-holding member 95 is not disassembled but the linear light source 28 can be disassembled.

The lower end of the inner side surface of the light source-holding member 95 is cut out to form light source insertion portions 95*a*. A cut-out portion 95*b* for positioning an end of the reflecting composite member 30 is formed at the lower end of the light source-holding member 95. A concave portion 95*c* for positioning the light source-holding member 95 on the back chassis 31 is formed on the lower surface of the light source-holding member 95. A screw hole 95*g* into which the screw B4 is threaded is formed in penetration through the concave portion 95*c*. The upper surface 95*d* of the light source-holding member 95 is located at a position where the periphery of the lower surface of the diffusing plate 26 disposed lowermost in the optical sheet group 32 can be supported. A projected portion 95*e* which contacts the lower surface of the front chassis 94 is formed at a required position of the upper surface 95*d* of the light source-holding member 95. A screw hole 95*f* into which the screw B1 is threaded is also formed at a required position of the upper surface 95*d* of the light source-holding member 95.

The front chassis 94 has screw holes 94*a* and 94*b*, formed in penetration through its upper surface, into which the screws B1 and B3 are threaded respectively.

In performing the operation of replacing the linear light source 28, the screw B4 is removed at the rear side of the liquid crystal display to disassemble the back chassis 0.31 and the reflecting composite member 30. Thereby the operation of replacing the linear light source 28 can be accomplished without disassembling the optical sheet group 32. The linear light source 28 can be replaced by performing an operation at only the rear side of the liquid crystal display. The other constructions are similar to those of the above-described embodiments. Thus they are denoted by the same reference numerals as those of the above-described embodiments and description thereof is omitted herein.

Figure 23A:
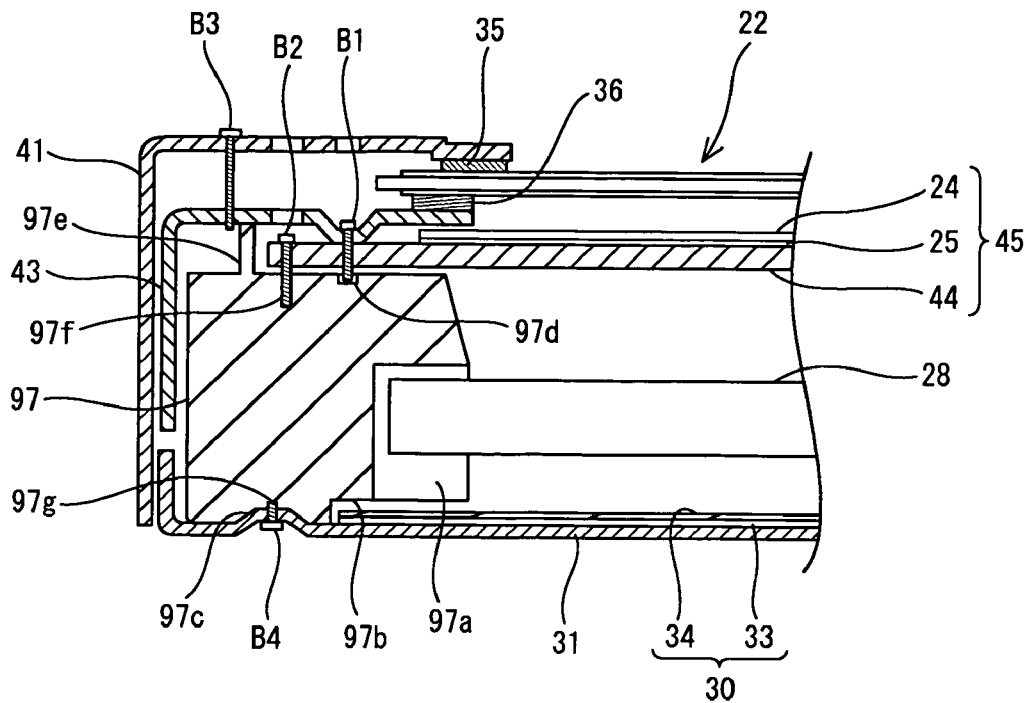
FIG. 23A is a sectional view showing main parts of a liquid crystal display of a 22nd embodiment.
Figure 23B:
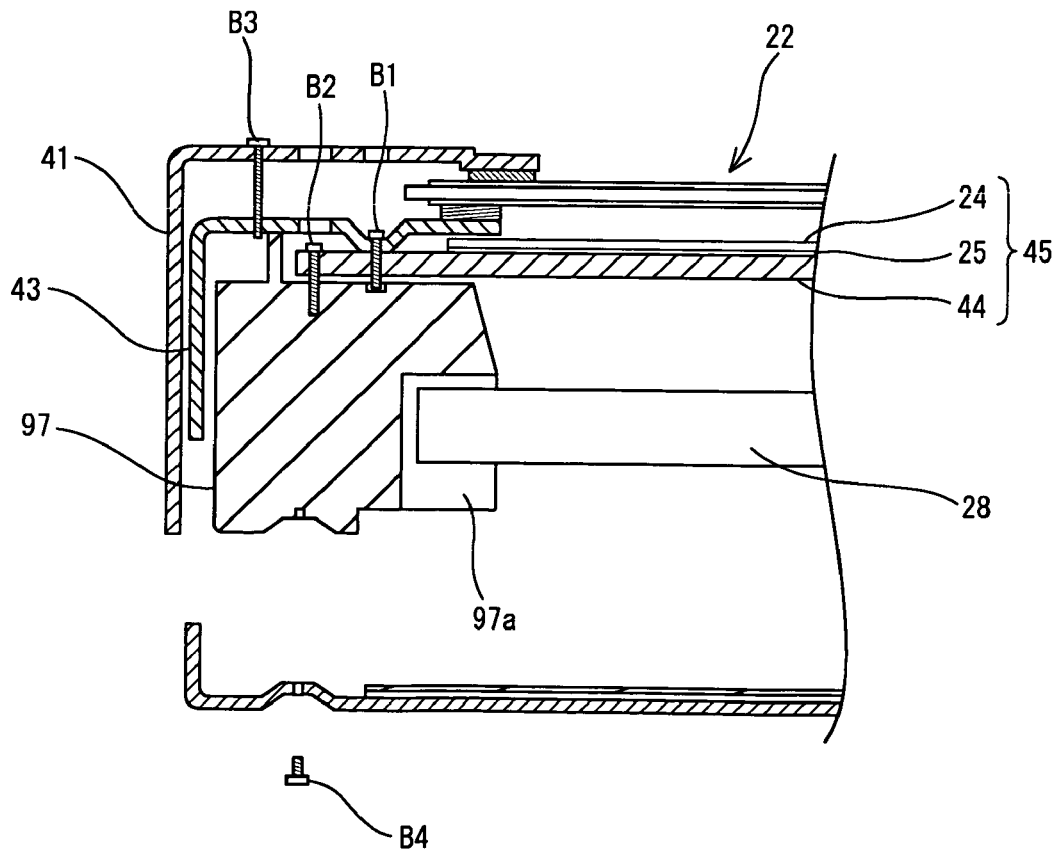
FIG. 23B is a sectional view showing the disassembled liquid crystal display of the 22nd embodiment when a light source-replacing operation is performed.

FIGS. 23A and 23B show the 22nd embodiment.

In the 22nd embodiment, the diffusing plate 44 disposed lowermost in the optical sheet group 45 is fixed to the front chassis 43 with the screw B1 and to the light source-holding member 97 with the screw B2. The back chassis 31 and the light source-holding member 97 are fixed to each other with the screw B4 threaded upward into screw holes formed on the rear surface thereof.

The lower end of the inner side surface of the light source-holding member 97 is cut out to form light source insertion portions 97*a*. A cut-out portion 97*b* for positioning an end of the reflecting composite member 30 is formed at the lower end of the light source-holding member 97. A concave portion 97*c* for positioning cut-out portion 97*b* on the back chassis 31 is formed on the lower surface of the light source-holding member 97. A screw hole 97*g* into which the screw B4 is threaded is formed in penetration through the concave portion 97*c*. A projected portion 97*e* that contacts the lower surface of the front chassis 43 is formed on the upper surface of the light source-holding member 97. The light source-holding member 97 has a concave portion 97*d*, formed on its upper surface, which is a vacant space for preventing the light source-holding member 97 from interfering with the screw B1. A screw hole 97*f* into which the screw B1 is threaded is also formed on the upper surface 97*d* of the light source-holding member 97.

In performing the operation of replacing the linear light source 28, the screw B4 is removed at the rear side of the liquid crystal display with the optical sheet group 45 being supported. The other constructions are similar to those of the above-described embodiments. Thus they are denoted by the same reference numerals as those of the above-described embodiments and description thereof is omitted herein.

Figure 24A:
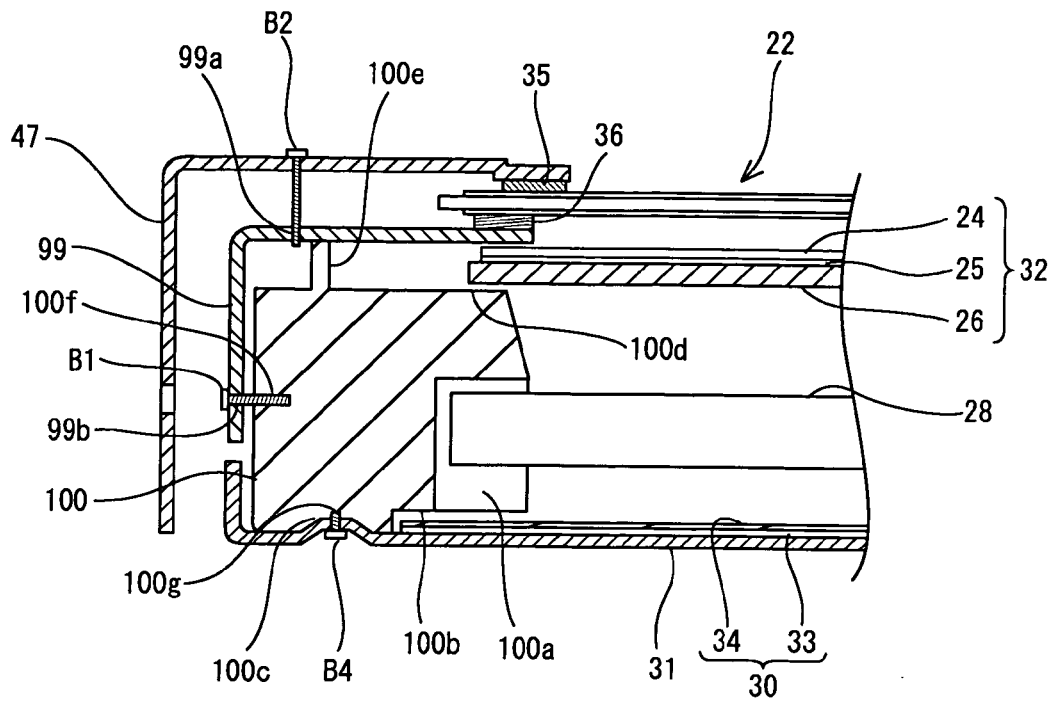
FIG. 24A is a sectional view showing main parts of a liquid crystal display of a 23rd embodiment.
Figure 24B:
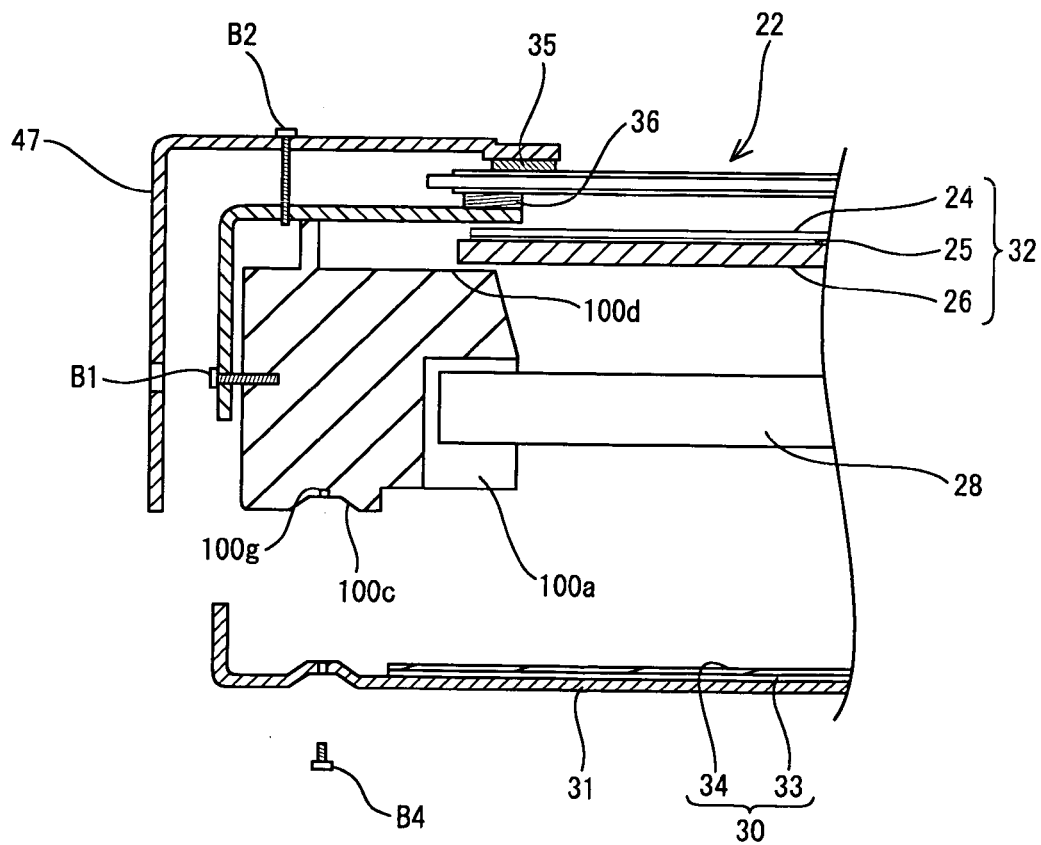
FIG. 24B is a sectional view showing the disassembled liquid crystal display of the 23rd embodiment when a light source-replacing operation is performed.

FIGS. 24A and 24B show the 23rd embodiment.

Unlike the 21st embodiment, in the 23rd embodiment, the screw B1 for fixing a front chassis 99 and a light source-holding member 100 to each other is threaded into screw holes formed sideways.

The front chassis 99 has a screw hole 99*a*, formed on its upper surface, into which the screw B2 is threaded and has a screw hole 99*b*, formed on its side surface, into which the screw B1 is threaded.

The lower end of the inner side surface of the light source-holding member 100 is cut out to form light source insertion portions 100*a*. A cut-out portion 100*b* for positioning an end of the reflecting composite member 30 is formed at the lower end of the light source-holding member 100. A concave portion 100*c* for positioning the light source-holding member 100 on the back chassis 31 is formed on the lower surface of the light source-holding member 100. A screw hole 100*g* into which the screw B4 is threaded is formed in penetration through the concave portion 100*c*. The upper surface 100*d* of the light source-holding member 100 is located at a position where the periphery of the lower surface of the diffusing plate 26 disposed lowermost in the optical sheet group 32 can be supported. A projected portion 100*e* which contacts the lower surface of the front chassis 99 is formed at a required position of the upper surface 100*d* of the light source-holding member

100. A screw hole 100f into which the screw B1 is threaded is formed on the outer side surface of the light source-holding member 100.

In performing the operation of replacing the linear light source 28, the screw B4 is removed at the rear side of the liquid crystal display to disassemble the back chassis 31 and the reflecting composite member 30. Thereby the operation of replacing the linear light source 28 can be accomplished without disassembling the optical sheet group 32. The other constructions are similar to those of the above-described embodiments. Thus they are denoted by the same reference numerals as those of the above-described embodiments and description thereof is omitted herein.

FIGS. 25 and 26 show the 24th embodiment.

Unlike the first embodiment, in the 24th embodiment, a back chassis 103, a reflecting composite member 104, and the front chassis 23 are fixed to each other with a screw B5 threaded downward into screw holes formed at the longer side thereof.

The lower end of the inner side surface of a light source-holding member 102 is cut out to form light source insertion portions 102a. A cut-out portion 102b for positioning an end of the reflecting composite member 104 is formed at the lower end of the light source-holding member 102. A convex portion 102c for positioning the light source-holding member 102 on the back chassis 103 is formed on the lower surface of the light source-holding member 102. A projected portion 102e that contacts the lower surface of the front chassis 23 is formed on the upper surface of the light source-holding member 102. The light source-holding member 102 has a concave portion 102d formed on its upper surface by forming a gap between the circumference of the concave portion 102d and the screw B1 to prevent the screw B1 and the light source-holding member 102 from interfering with each other. A screw hole 102e into which the screw B2 is threaded is also formed on the upper surface of the light source-holding member 102.

"Alset" (produced by Mitsubishi Jushi Inc.), having a reflectivity of not less than 90%, which is formed by bonding a reflecting sheet 106 to the upper surface of a metal plate 105 made of aluminum is used as the reflecting composite member 104. The reflecting composite member 104 has a bottom surface portion 104a, a side surface portion 104b inclining from an end of the bottom surface portion 104a and projecting upward, and a flange portion 104c projecting sideways from the upper end of the side surface portion 104b. A screw hole 104d is formed in penetration through the flange portion 104c.

Figure 25A:
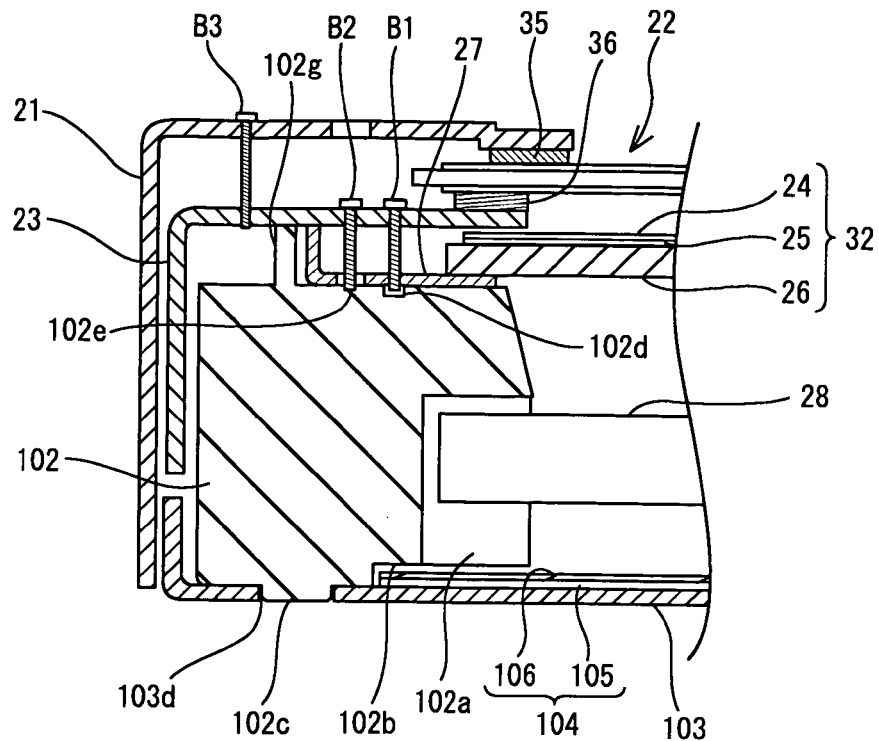
FIG. 25A is a sectional view showing main parts of a liquid crystal display of a 24th embodiment.
Figure 26A:
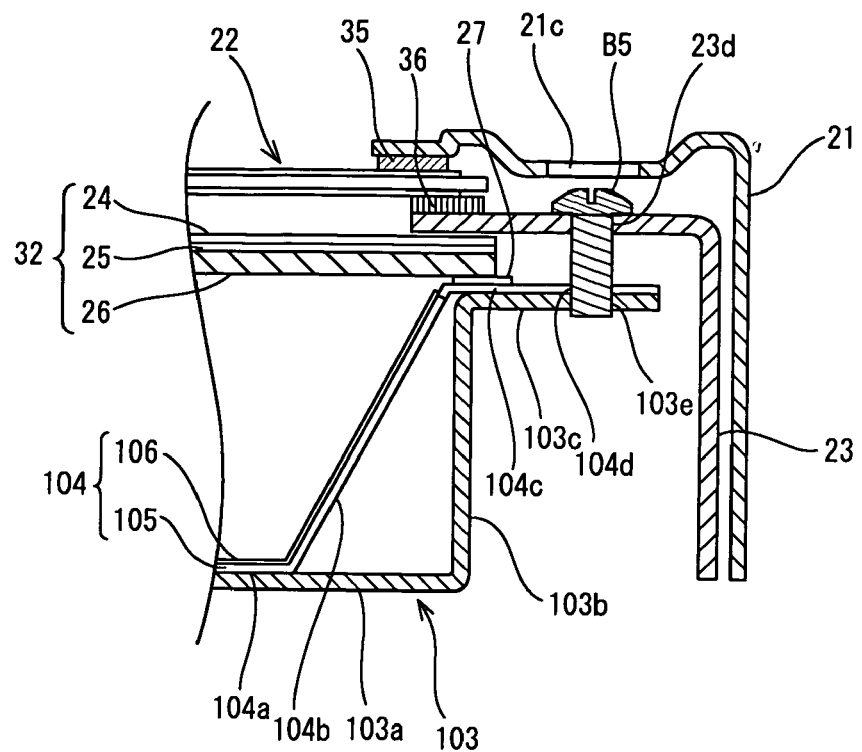
FIG. 26A is a sectional view showing the longer side of a liquid crystal display of a 24th embodiment.

As shown in FIG. 26A which is a sectional view showing the longer side of the back chassis 103, the back chassis 103 has a bottom surface portion 103a, a side surface portion 103b inclining from an end of the back chassis 103a and projecting upward, and a flange portion 103c projecting sideways from the upper end of the side surface portion 104b. A screw hole 103e is formed in penetration through the flange portion 104c. As shown in FIG. 25A which is a sectional view showing the shorter side of the back chassis 103, a fit-in hole 103d is formed at a position corresponding to the position of a convex portion 102c formed on the lower surface of the light source-holding member 102.

Figure 25B:
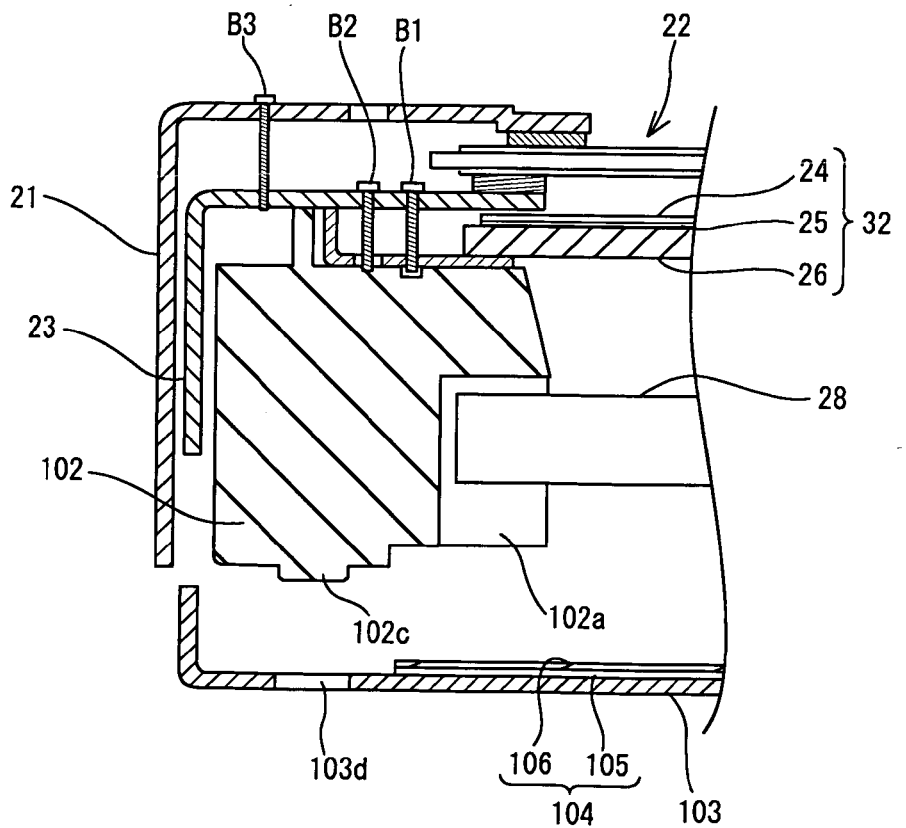
FIG. 25B is a sectional view showing the disassembled liquid crystal display of the 24th embodiment when a light source-replacing operation is performed.
Figure 26B:
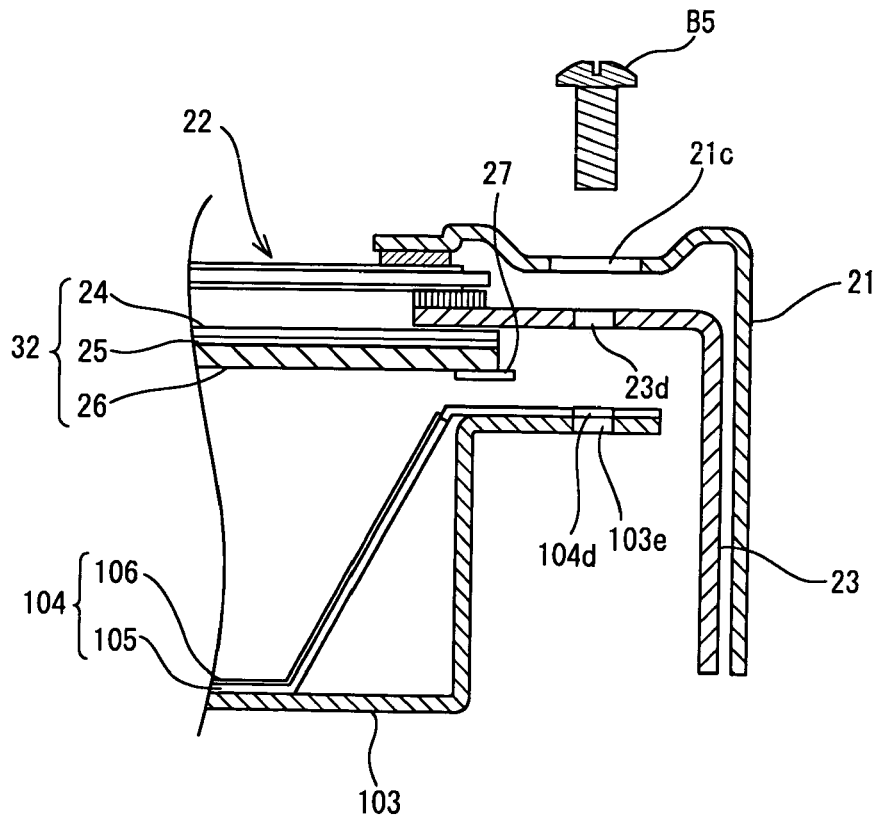
FIG. 26B is a sectional view showing the disassembled liquid crystal display of the 24th embodiment when a light source-replacing operation is performed.

In performing the operation of replacing the linear light source 28, as shown in FIGS. 25B and 26B, the screw B5 is removed upward to remove the back chassis 103 and the reflecting composite member 104 upward without disassembling the sheet-holding chassis 27. In this manner, the linear light source 28 can be replaced. Since all the screws B1, B2, B3, and B5 are threaded into the screw holes from the front side of the liquid crystal display, the disassembling operation can be performed in only one direction. Thus the construction of the 24th embodiment has high operability. The other constructions are similar to those of the above-described embodiments. Thus they are denoted by the same reference numerals as those of the above-described embodiments and description thereof is omitted herein.

Figure 27A:
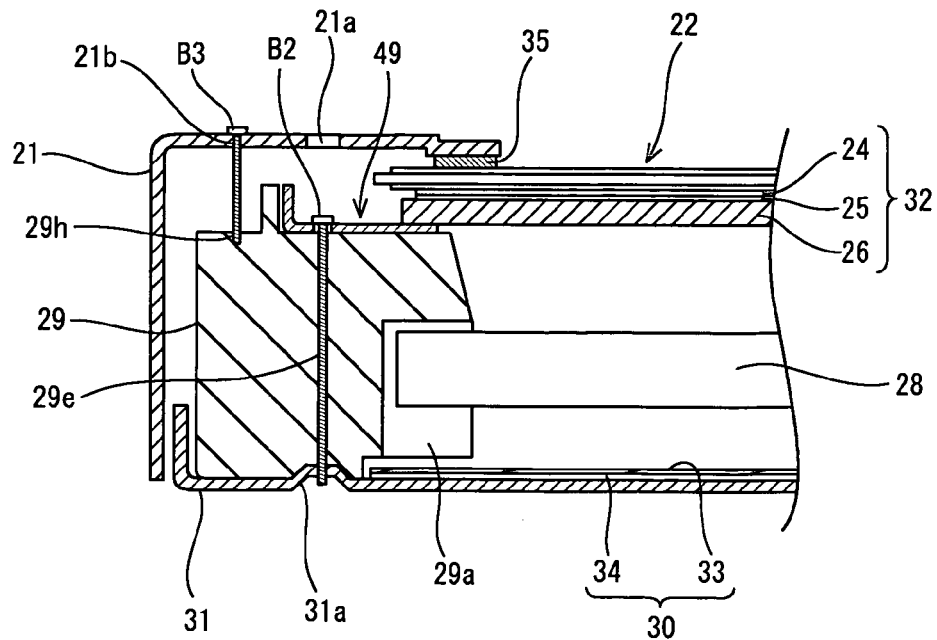
FIG. 27A is a sectional view showing main parts of a liquid crystal display of a 25th embodiment.
Figure 27B:
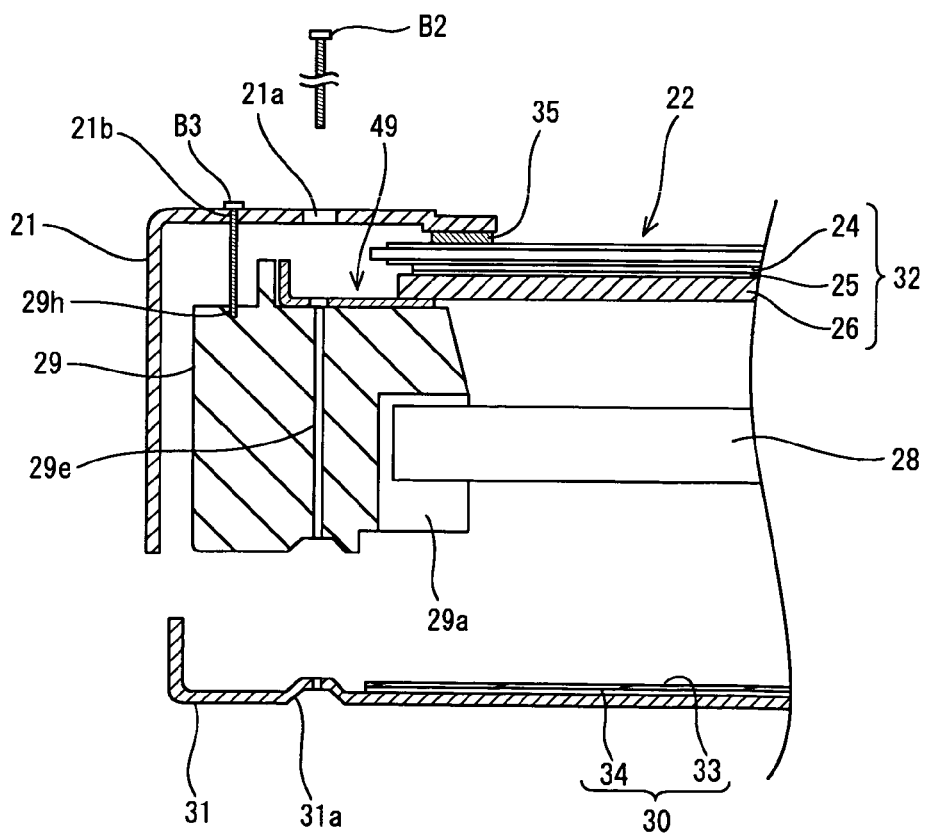
FIG. 27B is a sectional view showing the disassembled liquid crystal display of the 25th embodiment when a light source-replacing operation is performed.

FIGS. 27A and 27B show the 25th embodiment.

In the 25th embodiment, the front chassis is not used. The screw B3 is fixed to a screw hole 21b of the bezel 21 and to the screw hole 29h of the light source-holding member 29. The screw B2 penetrates through a sheet-holding chassis 49, the light source-holding member 29, and the back chassis 31 to fix them to each other.

In performing the operation of replacing the linear light source 28, as shown in FIG. 27B, the screw B2 is removed upward through an opening 21a of the bezel 21 to remove the back chassis 31 and the reflecting composite member 30. In this manner, the linear light source 28 can be replaced. Since the light source-holding member 29 remains fixed with the screw B3, the optical sheet group 32 is held by the sheet-holding chassis 49. Thus the optical sheet group 32 can be prevented from being disassembled. Since the optical sheet group 32 is supported by the four sides of the frame-shaped sheet-holding chassis 49, the optical sheet group 32 can be prevented from being flexed or dislocated. Thereby the liquid crystal display is capable of favorably maintaining the quality of display. The other constructions are similar to those of the above-described embodiments. Thus they are denoted by the same reference numerals as those of the above-described embodiments and description thereof is omitted herein.

Figure 28A:
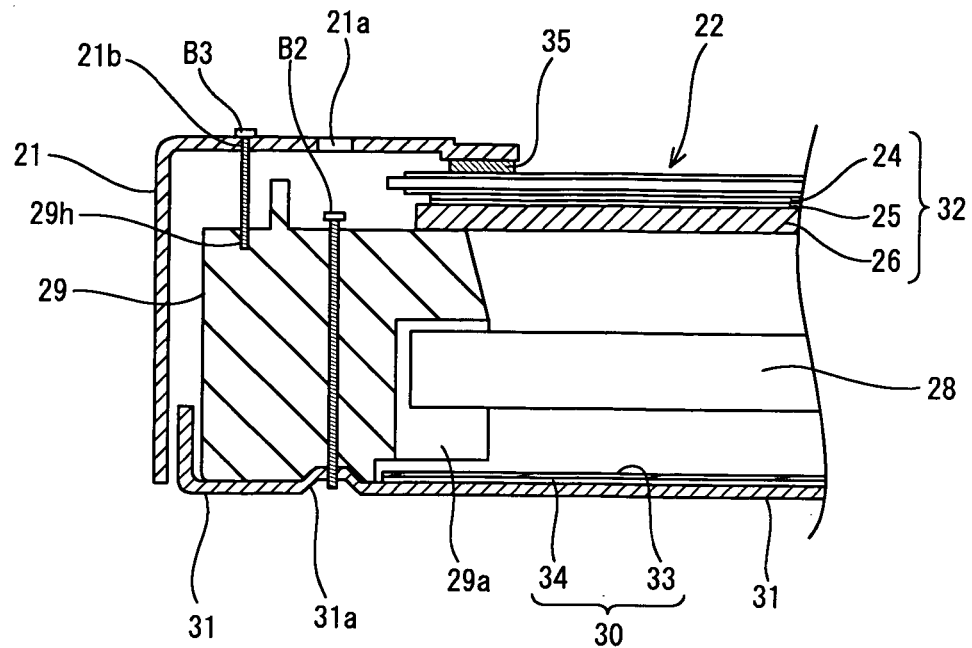
FIG. 28A is a sectional view showing main parts of a liquid crystal display of a 26th embodiment.
Figure 28B:
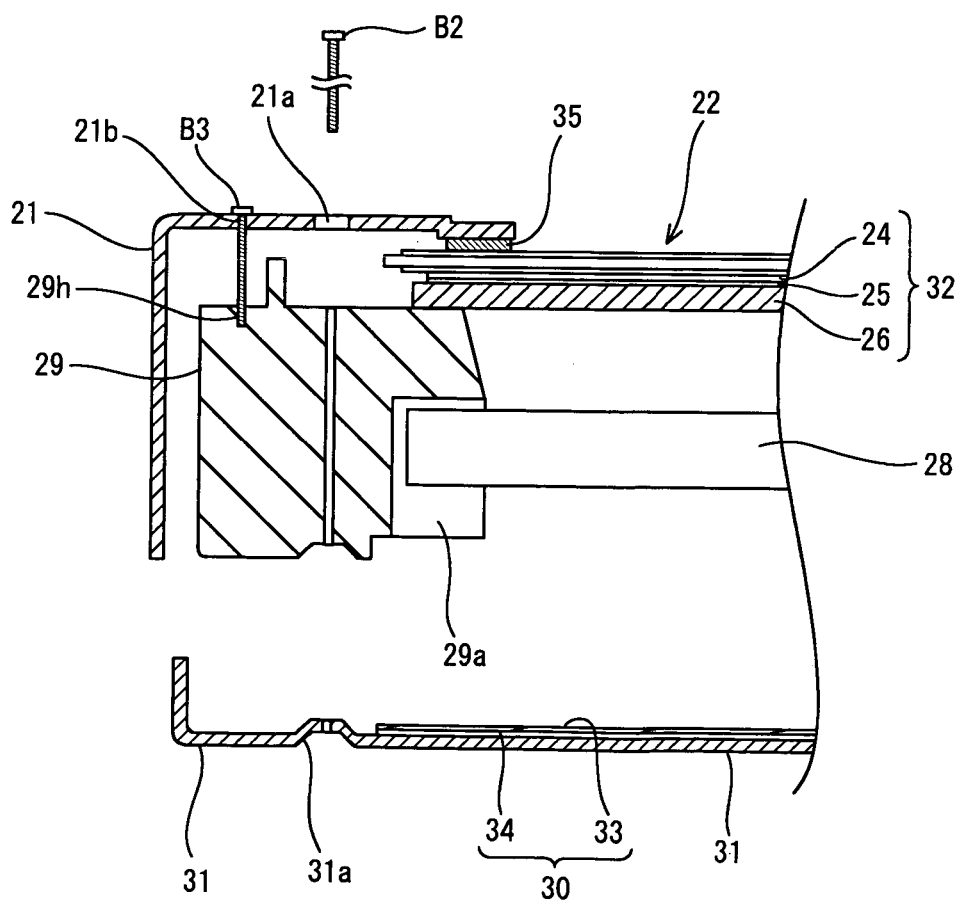
FIG. 28B is a sectional view showing the disassembled liquid crystal display of the 26th embodiment when a light source-replacing operation is performed.

FIGS. 28A and 28B show the 26th embodiment.

In the 26th embodiment, the front chassis is not used. The optical sheet group 32 is supported by the upper surface of the light source-holding member 29.

More specifically, the bezel 21 and the light source-holding member 29 are fixed to each other with the screw B3, and the light source-holding member 29 and the back chassis 31 are fixed to each other with the screw B2.

In performing the operation of replacing the linear light source 28, the screw B2 is removed through the opening 21a of the bezel 21 disposed above the screw B2, as shown in FIG. 28B. Thereby the back chassis 31 and the reflecting composite member 30 can be removed from the light source-holding member 29. In this way, the linear light source 28 can be removably mounted on the liquid crystal display. Since the light source-holding member 29 remains fixed by the screw B3, the optical sheet group 32 is supported by the light source-holding member 29. Thus the optical sheet group 32 can be prevented from being disassembled. The other constructions are similar to those of the above-described embodiments. Thus they are denoted by the same reference numerals as those of the above-described embodiments and description thereof is omitted herein.

Figure 29A:
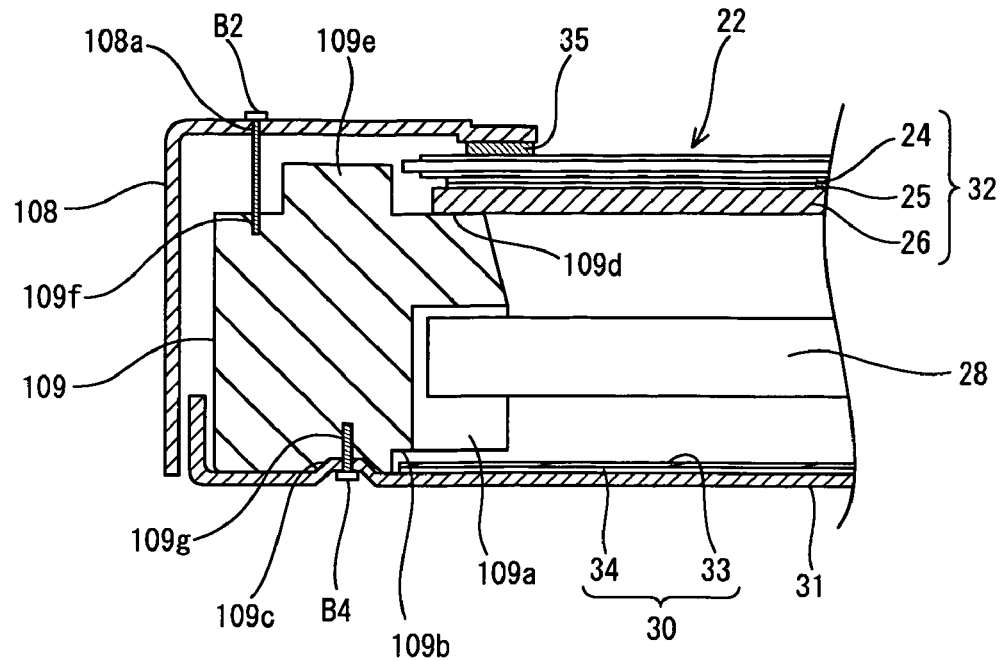
FIG. 29A is a sectional view showing main parts of a liquid crystal display of a 27th embodiment.
Figure 29B:
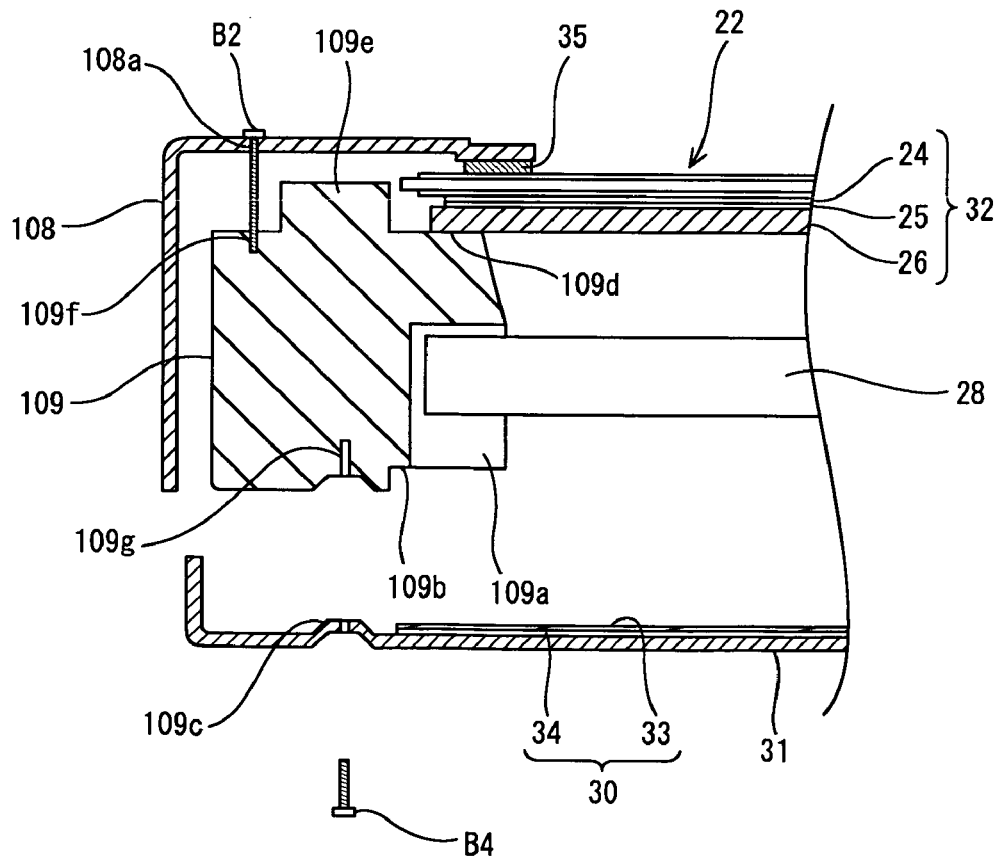
FIG. 29B is a sectional view showing the disassembled liquid crystal display of the 27th embodiment when a light source-replacing operation is performed.

FIGS. 29A and 29B show the 27th embodiment.

In the 27th embodiment, the front chassis is not used. The back chassis 31 is fixed to a light source-holding member 109 with the screw B4 threaded upward into screw holes formed on the rear surfaces thereof.

The lower end of the inner side surface of light source-holding member 109 is cut out to form light source insertion portions 109a. A cut-out portion 109b for positioning an end of the reflecting composite member 30 is formed at the lower end of the light source-holding member 109. A concave portion 109c for positioning the light source-holding member 109 on the back chassis 31 is formed on the lower surface of the light source-holding member 109. A screw hole 109g is formed in penetration through the concave portion 109c. On the upper surface 109d of the light source-holding member 109, there are formed a projected portion 109e and a screw hole 109f into which the screw B2 is threaded.

The bezel 108 is frame-shaped and has a sectional shape of an inverted L. The bezel 108 has a screw hole 108a, formed on its surface, into which the screw B2 is threaded.

In performing the operation of replacing the linear light source 28, the screw B4 is removed toward the rear side of the liquid crystal display, as shown in FIG. 29B. Thereby the back chassis 31 and the reflecting composite member 30 are removed from the light source-holding member 29. In this way, the linear light source 28 can be replaced. Since the light source-holding member 109 remains fixed by the screw B2, the optical sheet group 32 is supported by the upper surface 109d of the light source-holding member 109. Thus the optical sheet group 32 can be prevented from being disassembled. The other constructions are similar to those of the above-described embodiments. Thus they are denoted by the same reference numerals as those of the above-described embodiments and description thereof is omitted herein.

Figure 30A:
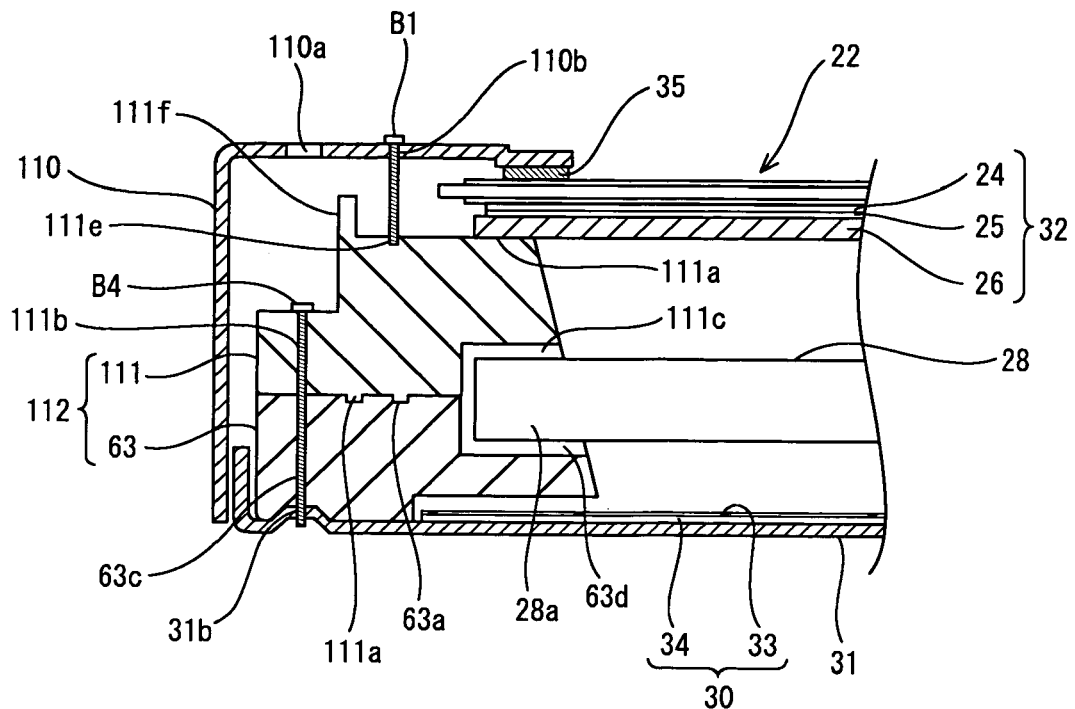
FIG. 30A is a sectional view showing main parts of a liquid crystal display of a 28th embodiment.
Figure 30B:
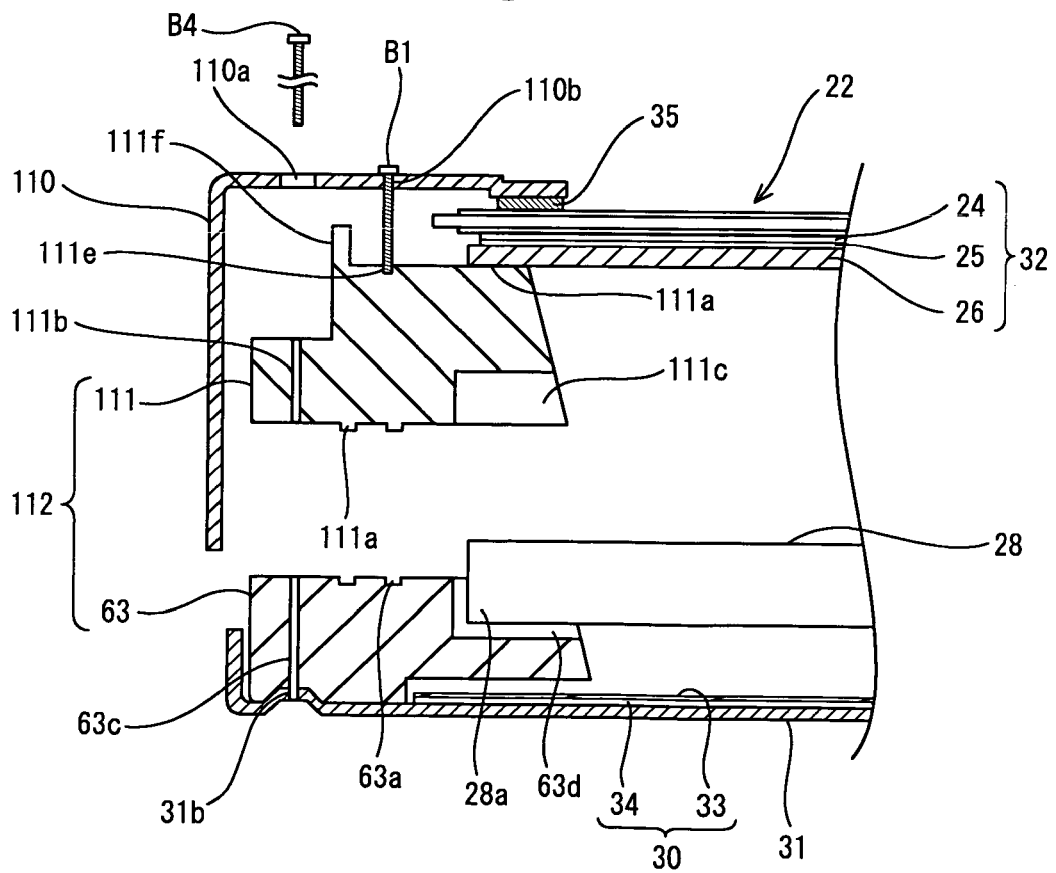
FIG. 30B is a sectional view showing the disassembled liquid crystal display of the 28th embodiment when a light source-replacing operation is performed.

FIGS. 30A and 30B show the 28th embodiment.

In the 28th embodiment, the front chassis is not used. A light source-holding member 112 is constructed of a rear receiving member 63 and a front hold-down member 111.

A bezel 110 is frame-shaped and has a sectional shape of an inverted L. The bezel 110 has a screw hole 110b, formed on its surface, into which the screw B1 is threaded and has an opening 110a, formed on its surface, through which the screw B4 is inserted.

The front hold-down member 111 has a convex portion 111a, formed on its lower surface, which fits in the concave portion 63a of the rear receiving member 63. The front hold-down member 111 has a cut-out portion 111c, formed on the lower end of its inner surface, which matches the groove 63d of the rear receiving member 63. The front hold-down member 111 has a screw hole 111e, formed on its upper surface, into which the screw B1 is threaded and has a projected portion 111f. The front hold-down member 111 has a screw hole 111b formed in the range from a stepped horizontal outer upper surface thereof to the lower surface thereof.

The front hold-down member 111 is placed on the rear receiving member 63 with the end portion 28a of the linear light source 28 mounted on the groove 63d of the rear receiving member 63. The convex portion 111a is fitted in the concave portion 63a. The screw B4 is inserted downward into the matched insertion hole 63c and the convex portion 111b and is fixed to the screw hole 31b of the back chassis 31. The bezel 110 and the light source-holding member 112 are fixed to each other with the screw B1 threaded downward into the screw hole 111e through the screw hole 110b.

In performing the operation of replacing the linear light source 28, as shown in FIG. 30B, by taking out the screw B4 upward through the opening 110a, the linear light source 28 disposed on the groove 63d can be taken out to the front side of the liquid crystal display. Since the front hold-down member 111 remains fixed by the screw B2, the optical sheet group 32 is supported by the upper surface 111a of the light source-holding member 112. Thus the optical sheet group 32 can be prevented from being disassembled. The other constructions are similar to those of the above-described embodiments. Thus they are denoted by the same reference numerals as those of the above-described embodiments and description thereof is omitted herein.

Figure 31A:
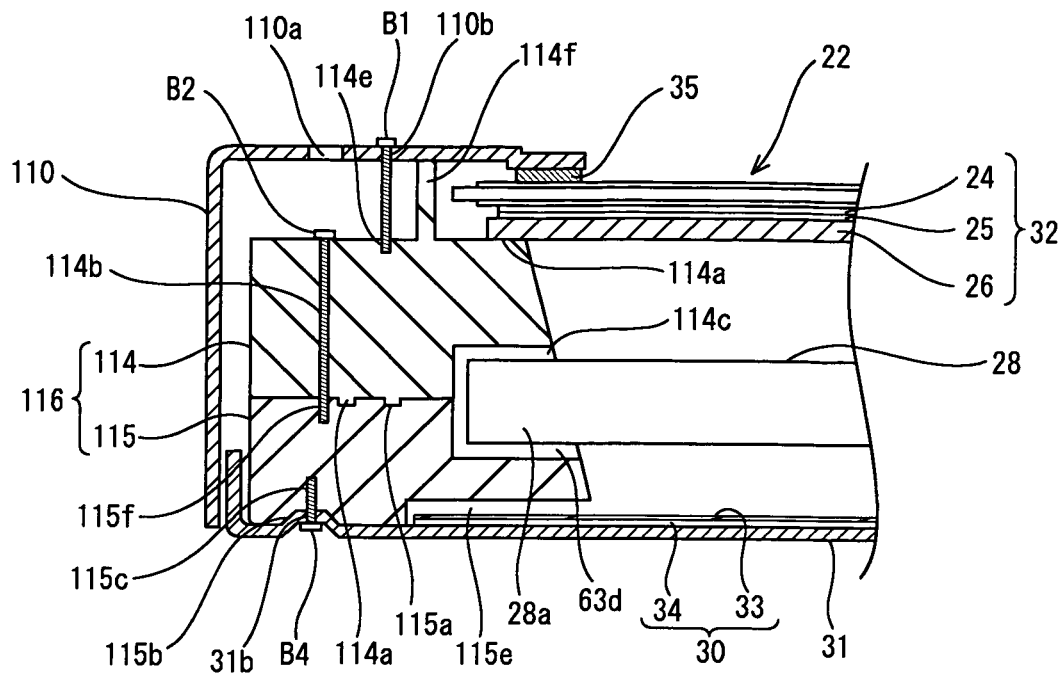
FIG. 31A is a sectional view showing main parts of a liquid crystal display of a 29th embodiment.
Figure 31B:
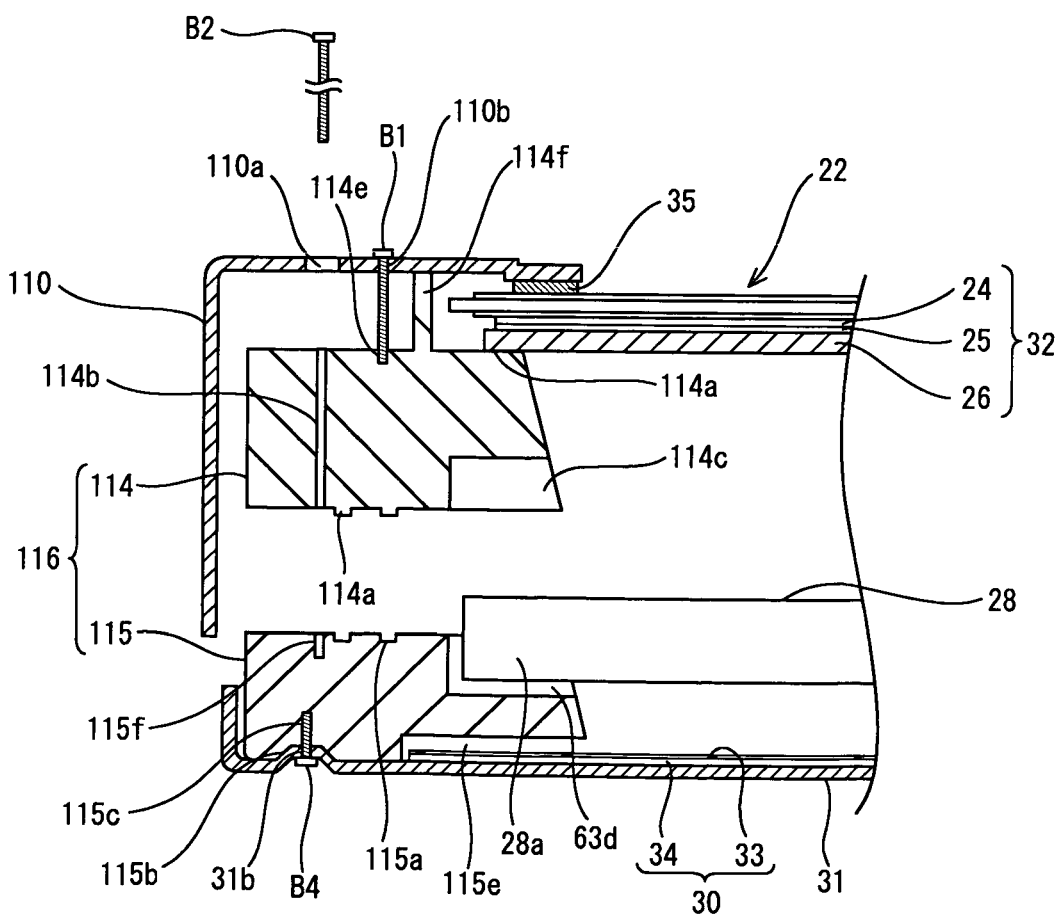
FIG. 31B is a sectional view showing the disassembled liquid crystal display of the 29th embodiment when a light source-replacing operation is performed.
Figure 32:
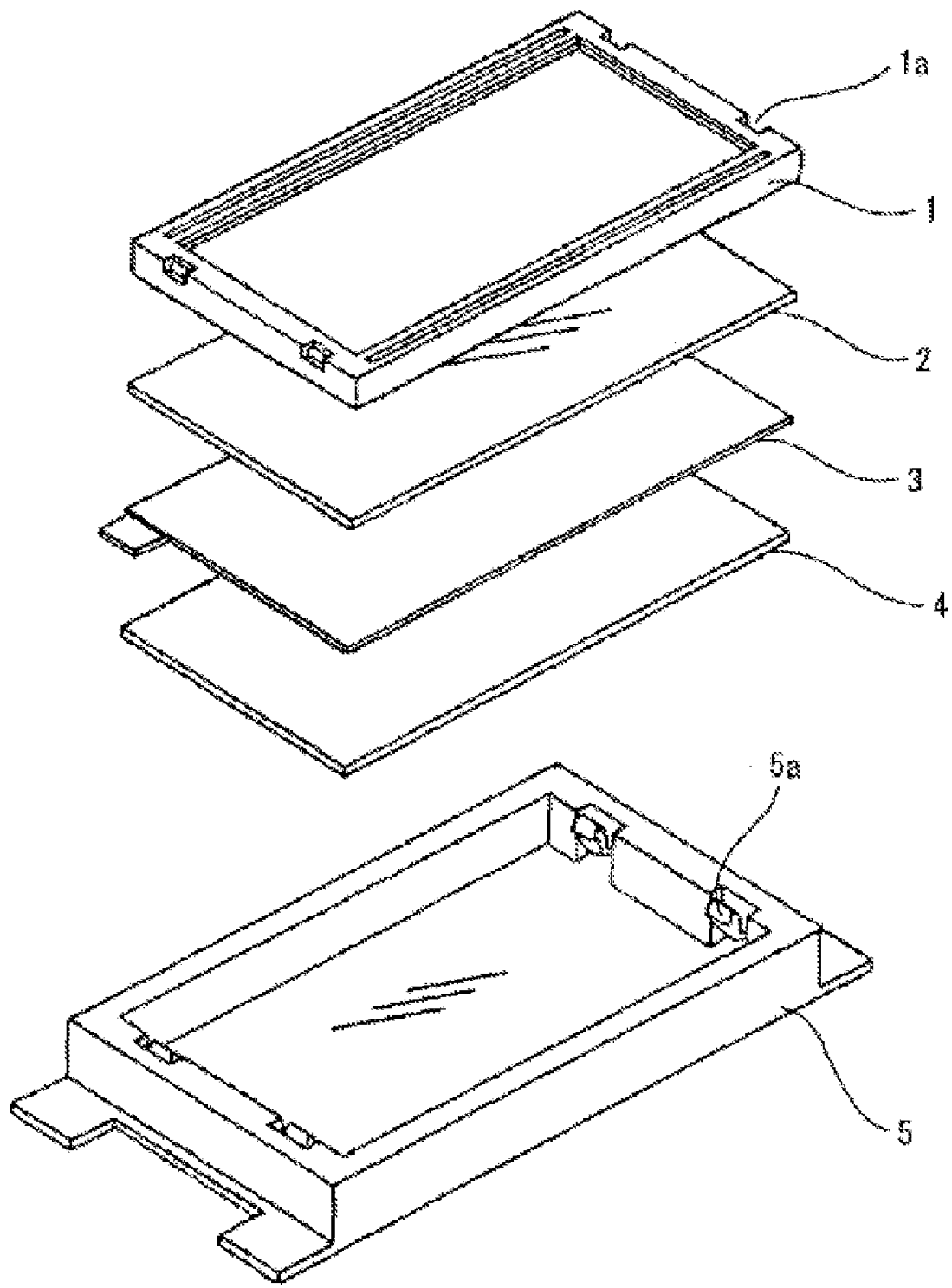
FIG. 32 shows a conventional art.
Figure 33:
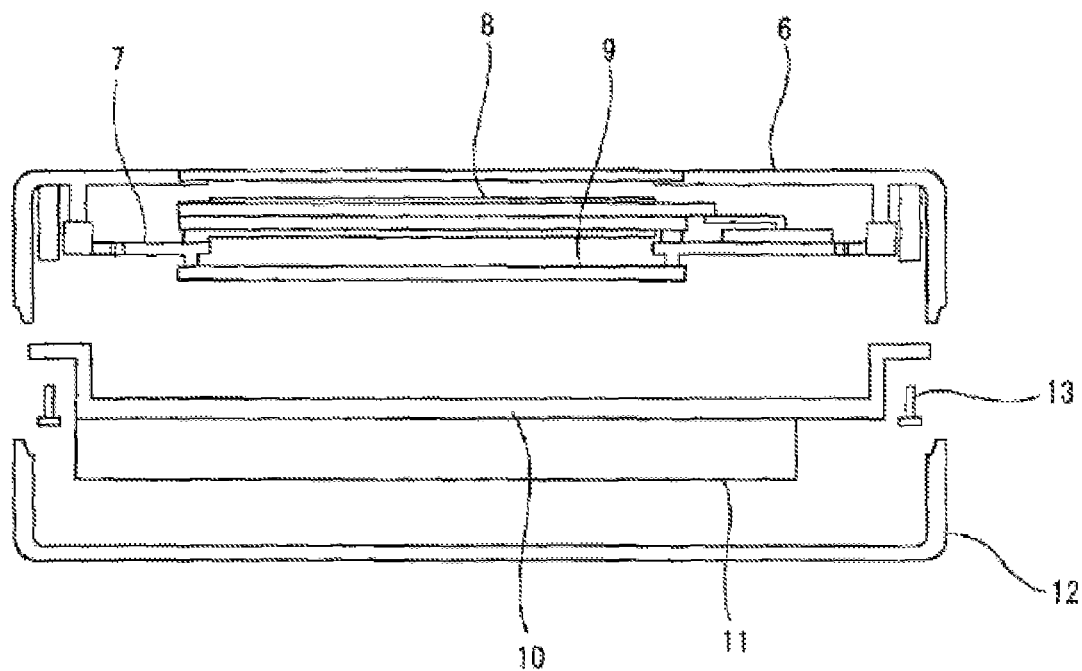
FIG. 33 shows another conventional art.

FIGS. 31A and 31B show the 29th embodiment.

In the 29th embodiment, the front chassis is not used. The back chassis 31 is fixed to a rear receiving member 115 with the screw B4 threaded upward into screw holes formed on the rear surfaces thereof.

The rear receiving member 115 has a concave portion 115a, formed on its upper surface, into which the lower surface of the front hold-down member 114 is fitted and a screw hole 115f into which the screw B2 is threaded. The upper end of the inner side surface of the rear receiving member 115 is cut out to form a groove 115d on which an end portion 28a of the linear light source 28 is mounted. A cut-out portion 115e for holding down the reflecting composite member 30 is formed at the lower end of the inner side surface of the rear receiving member 115. The rear receiving member 115 has a concave portion 115b, formed on its lower surface, for placing the rear receiving member 115 in position. A screw hole 115c is formed in penetration through the concave portion 115b.

The front hold-down member 114 has a convex portion 114a, formed on its lower surface, which fits in a concave portion 115a of the rear receiving member 115. The front hold-down member 114 has a cut-out portion 114c, formed on the lower end of its inner surface, which matches the groove 115d. Formed on the upper surface 114a of the front hold-down member 114 are a projected portion 114f, a screw hole 114e into which the screw B1 is threaded, and a screw hole 114b formed downward to the lower end thereof.

In performing maintenance for replacing the linear light source 28, as shown in FIG. 31B, by taking out the screw B2 upward through the opening 110a, the linear light source 28 disposed on the groove 115d can be taken out to the front side of the liquid crystal display. The front hold-down member 114 remains fixed to the bezel 110 with the screw B1. Thereby the optical sheet group 32 is supported by the upper surface 114a of the front hold-down member 114. Thus the optical sheet group 32 can be prevented from being disassembled. The other constructions are similar to those of the above-described embodiments. Thus they are denoted by the same reference numerals as those of the above-described embodiments and description thereof is omitted herein.

What is claimed is:

1. A liquid crystal display comprising:
   a liquid crystal panel;
   a group of optical sheets disposed rearward from said liquid crystal panel;
   a light source disposed rearward from said group of said optical sheets;
   a light source-holding member including:
      a rear receiving member having a groove where said light source is mounted; and
      a front hold-down member mounted on said rear receiving member at a front side thereof and holding said light source in position;
   a front frame disposed forward from at least said group of said optical sheets;
   a back chassis disposed rearward from said light source and directly or indirectly connected to said front frame; and
   a sheet-holding chassis fixed to said front frame and integrally holding said group of said optical sheets in position; wherein
   at least two members selected from said front frame, said sheet-holding chassis, said light source-holding member, and said back chassis are fixed with fasteners penetrated therethrough in a direction from a front side of said liquid crystal display;
   each of said fasteners is mounted on a member to be fixed by penetrating each of said fasteners through a through-hole formed in an unfixed member, which is disposed at a side forward from said member to be fixed, such that no portion of each of the fasteners is surrounded by the through-holes formed in the unfixed member; and when said back chassis and said front frame are unfixed from each other, said group of said optical sheets is held in position by said front frame, and said light source disposed on said groove of said rear receiving member can be taken out from the front side thereof.

2. The liquid crystal display according to claim 1, wherein said sheet-holding chassis holding said group of said optical sheets includes a sheet-holding chassis having a substantially vertical portion projecting from a peripheral edge of a substantially flat portion on which a peripheral edge of a rear side of said group of said optical sheet is placed; and when said front frame and said back chassis are unfixed from each other, said group of said optical sheets remains fixed to said front frame.

3. The liquid crystal display according to claim 2, wherein said light source-holding member is fastened to said front frame and to said back chassis with a fastener; or said light source-holding member and said front frame are fastened to each other with a fastener, and said light source-holding member and said back chassis are fastened to each other with another fastener.

4. The liquid crystal display according to claim 3, wherein said light source is composed of a plurality of linear light sources arranged in parallel; and light source insertion portions are formed by cutting out a lower end of said light source-holding member; said linear light sources are positioned at said light source insertion portions respectively; and an opening formed at a lower end of each of said light source insertion portions is closed with said back chassis.

5. The liquid crystal display according to claim 1, wherein said front hold-down member is fixed to said front frame with a fastener; and said rear receiving member is fixed to said back chassis.

6. The liquid crystal display according to claim 1, wherein said front hold-down member has a locking portion; and said rear receiving member has a to-be-locked portion; and wherein said front hold-down member is fixed to said rear receiving member by locking said to-be-locked portion to said locking portion.

7. The liquid crystal display according to claim 3, wherein each of said back chassis and said light source-holding member is provided with a positioning means for placing said light source-holding member and said back chassis in position.

8. The liquid crystal display according to claim 7, wherein said positioning means has a convex portion formed on a lower surface of said light source-holding member and a concave portion or a fit-in hole formed on said back chassis at a position corresponding to a position of said convex portion; or said positioning means has a concave portion formed on said lower surface of said light source-holding member and a convex portion formed on said back chassis at said position corresponding to said position of said convex portion; and wherein said convex portion and said concave portion are engaged each other to place said back chassis and said light source-holding member in position.

9. The liquid crystal display according to claim 3, wherein said light source-holding member and said back chassis are fixed to each other with a fastener mounted thereon in a direction from a rear side thereof.

10. The liquid crystal display according to claim 1, wherein said front frame comprises a frame-shaped bezel holding a periphery of a front side of said liquid crystal panel or/and a frame-shaped front chassis holding a periphery of a rear side of said liquid crystal panel.

11. The liquid crystal display according to claim 1, wherein sheets constituting said group of said optical sheets include a diffusing plate, a prism sheet, a diffusing sheet, an ITO sheet, PET sheet, a light-guiding plate, or/and a selective reflecting sheet.

12. A liquid crystal display comprising:
a liquid crystal panel;
a group of optical sheets disposed rearward from said liquid crystal panel;
a light source disposed rearward from said group of said optical sheets;
a light source-holding member including:
a rear receiving member having a groove where said light source is mounted; and
a front hold-down member mounted on said rear receiving member at a front side thereof and holding said light source in position;
a front frame disposed forward from at least said group of said optical sheets;
a back chassis disposed rearward from said light source and directly or indirectly connected to said front frame; and
a fastener fixing at least a rearmost sheet of said group of said layered optical sheets to said front frame; wherein
at least two members selected from said front frame, said rearmost sheet of said group of said optical sheets, said light source-holding member, and said back chassis are fixed with fasteners penetrated therethrough in a direction from a front side of said liquid crystal display;
each of said fasteners is mounted on a member to be fixed by penetrating each of said fasteners through a through-hole formed in an unfixed member, which is disposed at a side forward from said member to be fixed, such that no portion of each the fasteners is surrounded by the through-holes formed in the unfixed member; and
when said back chassis and said front frame are unfixed from each other, said group of said optical sheets is held in position by said front frame, and said light source disposed on said groove of said rear receiving member can be taken out from the front side thereof.

13. The liquid crystal display according to claim 12, wherein said light source-holding member is fixed to a rearmost sheet of said group of said optical sheets with a fastener.

14. The liquid crystal display according to claim 13, wherein said light source is composed of a plurality of linear light sources arranged in parallel; and light source insertion portions are formed by cutting out a lower end of said light source-holding member; said linear light sources are positioned at said light source insertion portions respectively; and an opening formed at a lower end of each of said light source insertion portions is closed with said back chassis.

15. The liquid crystal display according to claim 12, wherein said front hold-down member is fixed to said front frame with a fastener; and said rear receiving member is fixed to said back chassis.

16. The liquid crystal display according to claim 12, wherein said front hold-down member has a locking portion; and said rear receiving member has a to-be-locked portion; and wherein said front hold-down member is fixed to said rear receiving member by locking said to-be-locked portion to said locking portion.

17. The liquid crystal display according to claim 13, wherein each of said back chassis and said light source-holding member is provided with a positioning means for placing said light source-holding member and said back chassis in position.

18. The liquid crystal display according to claim 17, wherein said positioning means has a convex portion formed on a lower surface of said light source-holding member and a concave portion or a fit-in hole formed on said back chassis at a position corresponding to a position of said convex portion; or
said positioning means has a concave portion formed on said lower surface of said light source-holding member and a convex portion formed on said back chassis at said position corresponding to said position of said concave portion; and
wherein said convex portion and said concave portion are engaged each other to place said back chassis and said light source-holding member in position.

19. The liquid crystal display according to claim 13, wherein said light source-holding member and said back chassis are fixed to each other with a fastener mounted thereon in a direction from a rear side thereof.

20. The liquid crystal display according to claim 12, wherein said front frame comprises a frame-shaped bezel holding a periphery of a front side of said liquid crystal panel or/and a frame-shaped front chassis holding a periphery of a rear side of said liquid crystal panel.

21. The liquid crystal display according to claim 12, wherein sheets constituting said group of said optical sheets include a diffusing plate, a prism sheet, a diffusing sheet, an ITO sheet, PET sheet, a light-guiding plate, or/and a selective reflecting sheet.

22. A liquid crystal display comprising:
a liquid crystal panel;
a group of optical sheets disposed rearward from said liquid crystal panel;
a light source disposed rearward from said group of said optical sheets;
a front frame disposed forward from at least said group of optical sheets;
a back chassis disposed rearward from said light source and directly or indirectly connected to said front frame;
a light source-holding member including:
a rear receiving member having a groove where said light sources is mounted; and
a front hold-down member mounted on said rear receiving member at a front side thereof, where the front hold-down member holds said light source in position and supports a periphery of a rear side of said group of said optical sheets by its upper surface; and
a fastener fixing said light source-holding member to said front frame; wherein
at least two members selected from said front frame, said light source-holding member, and said back chassis are fixed with fasteners penetrated therethrough in a direction from a front side of said liquid crystal display;
each of said fasteners is mounted on a member to be fixed by penetrating each of said fasteners through a through-hole formed in an unfixed member, which is disposed at a side forward from said member to be fixed, such that no portion of each of the fasteners is surrounded by the through-holes formed in the unfixed member; and
when said back chassis and said front frame are unfixed from each other, said group of said optical sheets is held in position by said front frame, and said light source disposed on said groove of said rear receiving member can be taken out from the front side thereof.

23. The liquid crystal display according to claim 22, wherein said front frame comprises a frame-shaped bezel holding a periphery of a front side of said liquid crystal panel or/and a frame-shaped front chassis holding a periphery of a rear side of said liquid crystal panel.

24. The liquid crystal display according to claim 22, wherein said light source is composed of a plurality of linear light sources arranged in parallel; and
light source insertion portions are formed by cutting out a lower end of said light source-holding member; said linear light sources are positioned at said light source insertion portions respectively; and an opening formed at a lower end of each of said light source insertion portions is closed with said back chassis.

25. The liquid crystal display according to claim 22, wherein said front hold-down member is fixed to said front frame with a fastener; and said rear receiving member is fixed to said back chassis.

26. The liquid crystal display according to claim 22, wherein said front hold-down member has a locking portion; and said rear receiving member has a to-be-locked portion; and
wherein said front hold-down member is fixed to said rear receiving member by locking said to-be-locked portion to said locking portion.

27. The liquid crystal display according to claim 22, wherein each of said back chassis and said light source-holding member is provided with a positioning means for placing said light source-holding member and said back chassis in position.

28. The liquid crystal display according to claim 27, wherein said positioning means has a convex portion formed on a lower surface of said light source-holding member and a concave portion or a fit-in hole formed on said back chassis at a position corresponding to a position of said convex portion; or
said positioning means has a concave portion formed on said lower surface of said light source-holding member and a convex portion formed on said back chassis at said position corresponding to said position of said concave portion; and
wherein said convex portion and said concave portion are engaged each other to place said back chassis and said light source-holding member in position.

29. The liquid crystal display according to claim 22, wherein sheets constituting said group of said optical sheets include a diffusing plate, a prism sheet, a diffusing sheet, an ITO sheet, PET sheet, a light-guiding plate, or/and a selective reflecting sheet.

30. The liquid crystal display according to claim 22, wherein said light source-holding member and said back chassis are fixed to each other with a fastener mounted thereon in a direction from a rear side thereof.

* * * * *